(12) United States Patent
Petrovic et al.

(10) Patent No.: US 8,811,655 B2
(45) Date of Patent: Aug. 19, 2014

(54) CIRCUMVENTION OF WATERMARK ANALYSIS IN A HOST CONTENT

(75) Inventors: Rade Petrovic, San Diego, CA (US); Babak Tehranchi, San Diego, CA (US); Joseph M. Winograd, San Diego, CA (US); Kanaan Jemili, San Diego, CA (US)

(73) Assignee: Verance Corporation, San Diego, CA (US)

( * ) Notice: Subject to any disclaimer, the term of this patent is extended or adjusted under 35 U.S.C. 154(b) by 10 days.

(21) Appl. No.: 13/603,077

(22) Filed: Sep. 4, 2012

(65) Prior Publication Data
US 2013/0007462 A1 Jan. 3, 2013

Related U.S. Application Data

(63) Continuation of application No. 13/247,586, filed on Sep. 28, 2011, now Pat. No. 8,340,348, which is a continuation of application No. 11/115,990, filed on Apr. 26, 2005, now abandoned.

(51) Int. Cl.
*G06K 9/00* (2006.01)
*H04L 9/32* (2006.01)

(52) U.S. Cl.
USPC .......................................... 382/100; 713/176

(58) Field of Classification Search
USPC ......... 382/100, 232; 380/20, 28, 54; 713/176, 713/179, 181
See application file for complete search history.

(56) References Cited

U.S. PATENT DOCUMENTS

| 3,406,344 | A | 10/1968 | Hopper |
| 3,842,196 | A | 10/1974 | Loughlin |

(Continued)

FOREIGN PATENT DOCUMENTS

| CA | 2276638 A1 | 1/2000 |
| EP | 282734 A1 | 9/1988 |

(Continued)

OTHER PUBLICATIONS

Xinyuan Wang , Douglas S. Reeves, Robust correlation of encrypted attack traffic through stepping stones by manipulation of interpacket delays, Proceedings of the 10th ACM conference on Computer and communications security, Oct. 27-30, 2003, Washington D.C., USA.*

(Continued)

*Primary Examiner* — Andrae S Allison
(74) *Attorney, Agent, or Firm* — Perkins Coie LLP; Donald L. Wenskay

(57) ABSTRACT

Methods and devices are provided to thwart analysis of a watermarking system by preventing analysis of watermarks in a host content. Upon receiving a content at a watermark embedding device, the content is analyzed to ascertain whether one or more test features are present in at least a first portion of the received content. When the analysis reveals that one or more test features are present, embedding of watermarks in at least the first portion of the received content is disabled. The test features of interest include a temporal, a spatial and/or a frequency characteristic such that, if a region of the content that includes test feature is embedded with a watermark, at least one characteristic of the embedded watermark is detectable upon analysis of that region. The test feature can, for example, approximate an impulse signal, a step function signal or a pure sinusoidal signal.

28 Claims, 20 Drawing Sheets

(56) References Cited

U.S. PATENT DOCUMENTS

| | | |
|---|---|---|
| 3,885,217 A | 5/1975 | Cintron |
| 3,894,190 A | 7/1975 | Gassmann |
| 3,919,479 A | 11/1975 | Moon et al. |
| 3,973,206 A | 8/1976 | Haselwood et al. |
| 4,048,562 A | 9/1977 | Haselwood et al. |
| 4,176,379 A | 11/1979 | Wessler et al. |
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A * | 9/1998 | Girod et al. ............... 380/202 |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A * | 3/2000 | Isnardi et al. ............ 375/240.21 |
| 6,044,156 A | 3/2000 | Honsinger et al. |
| 6,061,793 A | 5/2000 | Tewfik et al. |

(56) References Cited

U.S. PATENT DOCUMENTS

| | | |
|---|---|---|
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 * | 4/2003 | Kurowski ............... 382/100 |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,908 B1 | 6/2004 | Vogel |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,823,455 B1 | 11/2004 | Macy et al. |
| 6,829,368 B2 | 12/2004 | Meyer et al. |
| 6,829,582 B1 | 12/2004 | Barsness |
| 6,834,344 B1 | 12/2004 | Aggarwal et al. |
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 | 9/2005 | Epstein |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |

(56) References Cited

U.S. PATENT DOCUMENTS

| | | |
|---|---|---|
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,389,421 B2 | 6/2008 | Kirovski et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,788,684 B2 | 8/2010 | Petrovic et al. |
| 7,788,693 B2 | 8/2010 | Robbins |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,055,013 B2 | 11/2011 | Levy et al. |
| 8,059,815 B2 | 11/2011 | Lofgren et al. |
| 8,155,463 B2 | 4/2012 | Wong et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,346,532 B2 | 1/2013 | Chakra et al. |
| 8,467,717 B2 | 6/2013 | Croy et al. |
| 8,589,969 B2 | 11/2013 | Falcon |
| 2001/0001159 A1 | 5/2001 | Ford |
| 2001/0021926 A1 | 9/2001 | Schneck et al. |
| 2001/0022786 A1 | 9/2001 | King et al. |
| 2001/0044899 A1 | 11/2001 | Levy |
| 2001/0051996 A1 | 12/2001 | Cooper et al. |
| 2001/0054146 A1* | 12/2001 | Carro et al. ............... 713/171 |
| 2002/0007403 A1 | 1/2002 | Echizen et al. |
| 2002/0012443 A1 | 1/2002 | Rhoads et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1* | 12/2002 | Hayashi ............... 713/176 |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0056213 A1 | 3/2003 | McFaddin et al. |
| 2003/0061489 A1 | 3/2003 | Pelly et al. |
| 2003/0063747 A1 | 4/2003 | Petrovic |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2005/0008190 A1 | 1/2005 | Levy et al. |

(56) References Cited

U.S. PATENT DOCUMENTS

| | | |
|---|---|---|
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0228733 A1 | 9/2008 | Davis et al. |
| 2008/0273861 A1 | 11/2008 | Yang et al. |
| 2008/0298632 A1 | 12/2008 | Reed |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0034513 A1 | 2/2010 | Nakano et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |
| 2012/0203556 A1 | 8/2012 | Villette et al. |
| 2012/0265735 A1 | 10/2012 | McMillan et al. |
| 2012/0300977 A1 | 11/2012 | Petrovic et al. |
| 2013/0011006 A1 | 1/2013 | Petrovic et al. |
| 2013/0031579 A1 | 1/2013 | Klappert |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1 | 5/2013 | Lee et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0283402 A1 | 10/2013 | Petrovic |
| 2013/0339029 A1 | 12/2013 | Petrovic et al. |
| 2014/0029786 A1 | 1/2014 | Winograd |

FOREIGN PATENT DOCUMENTS

| | | |
|---|---|---|
| EP | 372601 A1 | 6/1990 |
| EP | 581317 A2 | 2/1994 |
| EP | 2166725 | 3/2010 |
| GB | 2260246 A | 4/1993 |
| GB | 2292506 A | 2/1996 |
| GB | 2363027 A | 12/2001 |
| JP | 10-150548 A | 6/1998 |
| JP | 11-086435 A | 3/1999 |
| JP | 11-284516 A | 10/1999 |
| JP | 11-346302 A | 12/1999 |
| JP | 2000-069273 A | 3/2000 |
| JP | 2000083159 A | 3/2000 |
| JP | 2000-174628 A | 6/2000 |
| JP | 2000163870 A | 6/2000 |
| JP | 2000216981 A | 8/2000 |
| JP | 2001022366 A | 1/2001 |
| JP | 2001-119555 A | 4/2001 |
| JP | 2001175270 A | 6/2001 |
| JP | 2001-188549 A | 7/2001 |
| JP | 2001-216763 A | 8/2001 |
| JP | 2001-218006 A | 8/2001 |
| JP | 2001245132 A | 9/2001 |
| JP | 2001257865 | 9/2001 |
| JP | 2001-312570 A | 11/2001 |
| JP | 2001-527660 A | 12/2001 |
| JP | 2001339700 | 12/2001 |
| JP | 2002-010057 A | 1/2002 |
| JP | 2002-024095 A | 1/2002 |
| JP | 2002-027223 A | 1/2002 |
| JP | 2002-091465 A | 3/2002 |
| JP | 2002091712 A | 3/2002 |
| JP | 2002100116 | 4/2002 |
| JP | 2002125205 | 4/2002 |
| JP | 2002135557 A | 5/2002 |
| JP | 2002-165191 A | 6/2002 |
| JP | 2002176614 A | 6/2002 |
| JP | 2002-519916 A | 7/2002 |
| JP | 2002-232693 A | 8/2002 |
| JP | 2002232412 A | 8/2002 |
| JP | 2002319924 A | 10/2002 |
| JP | 2002354232 A | 12/2002 |
| JP | 2003-008873 A | 1/2003 |
| JP | 2003-039770 A | 2/2003 |
| JP | 2003-091927 A | 3/2003 |
| JP | 2003-230095 A | 8/2003 |
| JP | 2003-244419 A | 8/2003 |
| JP | 2003-283802 A | 10/2003 |

(56) References Cited

FOREIGN PATENT DOCUMENTS

| | | |
|---|---|---|
| JP | 2003316556 A | 11/2003 |
| JP | 2003348324 | 12/2003 |
| JP | 2004-023786 A | 1/2004 |
| JP | 2004070606 A | 3/2004 |
| JP | 2004-163855 A | 6/2004 |
| JP | 2004173237 A | 6/2004 |
| JP | 2004-193843 A | 7/2004 |
| JP | 2004194233 A | 7/2004 |
| JP | 2004-328747 A | 11/2004 |
| JP | 2005051733 A | 2/2005 |
| JP | 2005-094107 A | 4/2005 |
| JP | 2005525600 A | 8/2005 |
| JP | 20080539669 | 11/2008 |
| JP | 20100272920 | 12/2010 |
| JP | 5283732 | 7/2013 |
| KR | 20100009384 | 1/2010 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 01-55889 | 8/2001 |
| WO | 0197128 A1 | 12/2001 |
| WO | 02023883 A2 | 3/2002 |
| WO | 0249363 A1 | 6/2002 |
| WO | 02095727 | 11/2002 |
| WO | 03052598 A1 | 6/2003 |
| WO | 03102947 | 12/2003 |
| WO | 2005017827 | 2/2005 |
| WO | 2005-027501 | 3/2005 |
| WO | 2006051043 A1 | 5/2006 |
| WO | 2006116394 A2 | 11/2006 |
| WO | 2010073236 A1 | 7/2010 |
| WO | 2013067439 | 5/2013 |
| WO | 2013090462 | 6/2013 |
| WO | 2013090466 | 6/2013 |
| WO | 2013090467 | 6/2013 |

OTHER PUBLICATIONS

"Advanced Access Content System (AACS), Pre-recorded Video Book," Revision 0.951, Sep. 2009 (86 pages).

"Content Protection—Self Protecting Digital Content," http://www.cryptography.com/technology/spdc/index.html, May 2010 (1 page).

"Microsoft response to CfP for technology solutions to screen digital audio content for LCM acceptance," Microsoft Corporation, May 23, 1999 (9 pages).

"Task AC122—copy protection for distribution services," Http://acad.bg/WISE/english/rd/partners/acts/areal/ac122-t.html, Jul. 1, 1997 (2 pages).

Adelsbach, A., et al., "Proving Ownership of Digital Content," Proc. 3rd Int. Workshop on Information Hiding, 1768:117-133, Sep. 1999.

Aggarwal, A., et al., "Multi-Layer Grid Embeddings," Foundations of Computer Science, 26th Annual Symposium on Foundations of Computer Science, 85:186-196, Oct. 1985.

Aris Technologies, Inc. "Audio Watermarking System to Screen Digital Audio Content for LCM Acceptance," May 1999 (17 pages).

Barreto, P.S.L.M., et al. "Toward Secure Public-Key Blockwise Fragile Authentication Watermarking," IEEE Proceedings Vision, Image, and Signal Processing, 149(2):57-62, Apr. 2002.

Boney, L., et al., "Digital Watermarks for Audio Signals," Dept. of Electrical Engineering, Univ. of Minnesota, Mar. 1996 (4 pages).

Cappellini, V., et al. "Robust Frame-based Watermarking for Digital Video," Proceedings of the 12th International Workshop on Database and Expert Systems Applications, Sep. 2001 (5 pages).

Caronni, G., "Assuring Ownership Rights for Digital Images," Proceedings of reliable IT systems VIS 95, Vieweg Publishing Company, Germany, 1995 (10 pages).

Chen, B., et al., "Quantization index modulation: a class of provably good methods for digital watermarking and information embedding," IEEE Transactions on Information Theory, 47(4):1423-1443 May 2001.

Chou, J., et al., "A Robust Blind Watermarking Scheme based on Distributed Source Coding Principles," Multimedial 2000 Proceedings of the eighth ACM international conference on multimedia, Los Angeles, California, 2000 (8 pages).

Chou, J., et al., "A Robust Optimization Solution to the Data Hiding Problem using Distributed Source Coding Principles," Pro. SPIE, 3971, San Jose, California, Jan. 2000 (10 pages).

Cinea, Inc., "Forensic watermarking deterring video piracy," 2004, (9 pages). [http://www.cinea.com/whitepapers/forensic_watermarking.pdf].

Costa, M., "Writing on Dirty Paper," IEEE Trans. on Info. Theory, 29(3):439-441, May 1983.

Cox, I. J., et al., "Some general methods for tampering with watermarks," IEEE Journal on Selected Areas in Communications, 16(4): 587-593, May 1998.

Coxford, A., et al., "Advanced Mathematics: A Preparation for Calculus, Second Edition," Harcourt Brace Jovanovish, Inc., 1978 (14 pages).

Das, et al., "Distributed Priority Queues on Hybercube Architectures," IEEE, 1996, pp. 620-627.

Davidson, M.F., "Music File Filter," Sony Music, New York, May 23, 1999 (2 pages).

Digimarc Corporation, "Digimarc Watermarking Guide," 1999 (22 pages).

Dittmann, J., "Combining digital watermarks and collusion secure fingerprints for customer copy monitoring," Proc. IEEE Seminar on Secure Images and Image Authentication, Apr. 2000 (6 pages).

Dittmann, J., et al., "Combining digital watermarks and collusion secure fingerprints for digital images," Proc. SPIE 3657:171-182, Jan. 1999 (12 pages).

Epp, L.W., et al., "Generalized scattering matrices for unit cell characterization of grid amplifiers and device de-embedding," IEEE, 2:1288-1291, Jun. 1995.

European Search Report dated Apr. 12, 2012 for European Patent Application No. 07836262.1 filed Jul. 25, 2007 (12 pages).

European Search Report dated Nov. 10, 2010 for European Patent Application No. 03774648.4, filed Oct. 7, 2003 (5 pages).

European Search Report dated Jul. 3, 2012 for European Patent Application No. 12150742.0, filed Oct. 7, 2003 (5 pages).

Furon, T., et al., "An asymmetric watermarking method," IEEE Trans. Signal Processing, 4(51):981-995, Apr. 2003.

Guth, H.J., et al., "Error-and collusion-secure fingerprinting for digital data," Proc. 3rd Int. Workshop on Information Hiding, LNCS 1768:134-145, Sep./Oct. 1999.

Hartung, F., et al., "Digital watermarking of MPEG-2 coded video in the bitstream domain," Proc. IEEE Int. Conf. on Acoustics, Speech and Signal Processing, 4:2621-2624, Apr. 1997.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Heegard, C., et al., "On the capacity of computer memory with defects," IEEE Trans. Info. Theory, 5(IT-29):731-739, Sep. 1983.

International Search Report and Written Opinion dated Apr. 24, 2012 for International Application No. PCT/US2011/051857, filed Sep. 15, 2011 (9 pages).

International Search Report and Written Opinion dated Aug. 14, 1998 for International Application No. PCT/US1998/009587, filed May 12, 1998 (3 pages).

International Search Report and Written Opinion dated Aug. 22, 2007 for International Application No. PCT/US2006/031267, filed Aug. 9, 2006 (2 pages).

International Search Report and Written Opinion dated Feb. 14, 2002 for International Application No. PCT/US2001/026505, filed Aug. 27, 2001 (2 pages).

(56) References Cited

OTHER PUBLICATIONS

International Search Report and Written Opinion dated Jan. 4, 2008 for International Application No. PCT/US2006/015615, filed Apr. 25, 2006 (5 pages).
International Search Report and Written Opinion dated Mar. 28, 2012 for International Application No. PCT/US2011/051855, filed Sep. 15, 2011 (8 pages).
International Search Report and Written Opinion dated May 13, 2008 for International Application No. PCT/US2006/025090, filed Jun. 27, 2006 (2 pages).
International Search Report and Written Opinion dated May 19, 2004 for International Application No. PCT/US2003/031816, filed Apr. 29, 2004 (3 pages).
International Search Report and Written Opinion dated May 29, 2008 for International Application No. PCT/US2006/015410, filed Apr. 21, 2006 (6 pages).
International Search Report and Written Opinion dated Sep. 26, 2008 for International Application No. PCT/US2007/016812, filed Jul. 25, 2007 (6 pages).
Jacobsmeyer, J., et al., "Introduction to error-control coding," Pericle Communications Company, 2004 (16 pages).
Kalker, T., et al., "A security risk for publicly available watermark detectors," Proc. Benelux Info. Theory Symp., Veldhoven, The Netherlands, May 1998 (7 pages).
Kalker, T., et al., "System issues in digital image and video watermarking for copy protection," Proc. IEEE Int. Conf. on Multimedia Computing and Systems, pp. 562-567, Jun. 1999.
Kang, X., et al., "A DWT-DFT composite watermarking scheme robust to both affine transform and JPEG compression," IEEE Transactions on Circuits and Systems for Video Technology, 8(13):776-786 Aug. 2003.
Kim, T.Y., et al., "An asymmetric watermarking system with many embedding watermarks corresponding to one detection watermark," IEEE Signal Processing Letters, 3(11 ):375-377 , Mar. 2004.
Kirovski, D., et al., "Multimedia content screening using a dual watermarking and fingerprinting system," Proceedings of the tenth ACM international conference, pp. 372-381, 2002.
Kirovski, D., et al., "Randomizing the replacement attack," ICASSP, pp. 381-384, 2004.
Bangaleea, R., et al., "Performance improvement of spread spectrum spatial-domain watermarking scheme through diversity and attack characterisation," IEEE Africon, pp. 293-298, 2002.
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
Office Action dated Nov. 26, 2012 for Japanese Patent Application No. 2011-114667 (8 pages).
Office Action dated Nov. 28, 2012 for Japanese Patent Application No. 2011-114666 (8 pages).
Wolfgang, R., et al., "Perceptual watermarks for digital images and video," Proceedings of the IEEE, 87 (7):1108-1126, Jul. 1999.
Kirovski, D., et al., "Multimedia content screening using a dual watermarking and fingerprinting system," Multimedia '02 Proceedings of the tenth ACM international conference on Multimedia, 2002 (11 pages).
Kocher, P., et al., "Self-Protecting Digital Content: A Technical Report from the CRI Content Security Research Initiative," Cryptography Research, Inc. (CRI), 2002-2003 (14 pages).
Kutter, M., et al., "The watermark copy attack," Proc. of the SPIE: Security and Watermarking of Multimedia Content II, 3971:1-10, Jan. 2000.
Kuznetsov, A.V., et al., "An error correcting scheme for defective memory," IEEE Trans. Inf. Theory, 6(4):712-718, Nov. 1978 (7 pages).
Lacy, J., et al., "Intellectual property protection systems and digital watermarking," Proceedings: Information Hiding, Second International Workshop, Portland, Oregon, pp. 158-168, 1998.
Lin, E.T., et al., "Detection of image alterations using semi-fragile watermarks," Proceedings of the SPIE International Conference on Security and Watermarking of Multimedia Contents II, Jan. 2000 (12 pages).
Lin, P.L., et al., "Robust transparent image watermarking system with spatial mechanisms," The Journal of Systems and Software, 50:107-116, Feb. 2000.
Lotspeich, J., "The Advanced Access Content System's Use of Digital Watermarking," MCPS '06, Oct. 28, 2006, pp. 19-21.
Lu, C.S., et al., "Oblivious cocktail watermarking by sparse code shrinkage: A regional-and global-based scheme," IEEE Transactions on Multimedia, 4(2):209-224, Dec. 2000.
Maehara, F., et al., "A proposal of multimedial home education terminal system based on flash-squeak OS," Technical report of the institute of image information and television engineers, 28(43):21-24, Jul. 2004.
Mason, A. J., et al., "User requirements for watermarking in broadcast applications," IEEE Conference Publication, International Broadcasting Convention (BC 2000), Amsterdam, Sep. 8-12, 2000 (7 pages).
Mintzer, F., et al., "If one watermark is good, are more better?," Acoustics, Speech, and Signal Processing, ICASSP, 4:2067-2069, Mar. 1999.
Mobasseri, B.G., et al. "Content authentication and tamper detection in digital video," Image Processing Proceedings, International Conference, 1:458-461, 2000.
Moulin, P., et al., "Detection-theoretic analysis of desynchronization attacks in watermarking," Technical Report MSR-TR-2002-24, Microsoft Corporation, Mar. 2002.
Muranoi, R., et al., "Video retrieval method using shotID for copyright protection systems," Proc. SPIE Multimedia Storage and Archiving Systems III, 3527:245-252, Nov. 1998.
Nikolaidis, N., et al., "Watermark detection: benchmarking perspectives," 2002 IEEE Conference on Multimedia and Expo, 2002 (4 pages).
Office Action dated Mar. 16, 2012 for Japanese Patent Application No. 2008-508985 (8 pages).
Office Action dated Jul. 21, 2011 for Japanese Patent Application No. 2008-508985 (6 pages).
Office Action dated Mar. 18, 2011 for European Patent Application No. 03774648.4 (6 pages).
Office Action dated May 8, 2012 for Japanese Patent Application No. 2009-522802 (4 pages).
Park, J.H., et al., "Robust and fragile watermarking techniques for documents using bidirectional diagonal profiles," Information and Communications Security: Third International Conference, Xian, China, Nov. 2001, pp. 483-494.
Perez-Gonzalez, F., et al., "Approaching the capacity limit in image watermarking a perspective on coding techniques for data hiding applications," Signal Processing, 6(81):1215-1238 Jun. 2001.
Petitcolas, F., et al., "The blind pattern matching attack on watermark systems," IEEE Trans. Signal Processing, Apr. 2003 (4 pages).
Petitcolas, F.A.P., et al., "Attacks on copyright marking systems," Second Workshop on Information Hiding, Lecture Notes in Computer Science, Portland, Oregon, pp. 218-238, Apr. 1998.
Philips Research Liquid Audio Fraunhofer Institute, "Digital Audio Screening Technology for Phased Rollout," Version 1.00, May 1999 (38 pages).
Pytlak, J.,"Anti-piracy coding," URL: http://www.tele.com/pipermail/tig/2003-Nov./003842.html; Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).
Shih, F.Y., et al., "Combinational, image watermarking in the spatial and frequency domains," Pattern Recognition, 36:696-975, May 2002.
Solanki, K., et al., "Robust image-adaptive data hiding: modeling, source coding and channel coding", 41st Allerton Conference on Communications, Control and Computing, Oct. 2003 (10 pages).

(56) References Cited

OTHER PUBLICATIONS

Steinebach, M., et al., "StirMark benchmark: audio watermarking attacks," International Conference on Information Technology: Coding and Computing (ITCC 2001), Las Vegas, Nevada, Apr. 2001 (6 pages).

Tanaka, K., et al., "Secret transmission method of character data in motion picture communication," SPIE Visual Communications and Image Processing '91, 1605:646-649, 1991.

Tsai, M.J., et al., "Wavelet packet and adaptive spatial transformation of watermark for digital image authentication," IEEE Image Processing, 2000 International Conference, 1:450-453, 2000 (4 pages).

Verance Corporation, "Confirmedia," PowerPoint presentation made to National Association of Broadcasters; Apr. 24, 2001 (40 pages).

Xu, C., et al., "Applications of digital watermarking technology in audio signals," Journal of Audio Eng. Soc., 10 (47):805-812, Oct. 1999.

Yeung, M. M., et al., "An invisible watermarking technique for image verification," Image Processing, International Conference Proceedings, 2:680-683, Oct. 26-29, 1997.

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

International Search Report and Written Opinion dated Mar. 25, 2013 for International Application No. PCT/US2012/069302, filed Dec. 12, 2012 (22 pages).

International Search Report and Written Opinion dated Feb. 28, 2013 for International Application No. PCT/US2012/066138, filed Nov. 20, 2012 (11 pages).

International Search Report and Written Opinion dated Mar. 14, 2013 for International Application No. PCT/US2012/069308, filed Dec. 12, 2012 (10 pages).

International Search Report and Written Opinion dated Mar. 18, 2013 for International Application No. PCT/US2012/063431, filed Nov. 2, 2012 (10 pages).

Kirovski, D., et al., "Robust spread—spectrum audio watermarking," IEEE International Conference on Acoustics, Speech, and Signal Processing, 3:1345-1348, 2001.

Seok, J., et al., "A novel audio watermarking algorithm for copyright protection of digital audio," ETRI Journal, 24(3):181-189, Jun. 2002.

European Search Report dated Nov. 8, 2012 for European Patent Application No. 06785709.4, filed Jun. 27, 2006 (5 pages).

Office Action dated May 1, 2013 for Japanese Patent Application No. 2011-114667 (6 pages).

"Civolution's 2nd screen synchronisation solution wins CSI product of the year 2011 award at IBC," IBC Press Release, Hall 2—Stand C30, Sep. 2011 (2 pages).

"Red Bee and Civolution develop companion app for FX UK," http://www.digitaltveurope.net/19981/red-bee-and-civolution-develop-companion-app-for-fx-uk, Jan. 2012 (2 pages).

Spangler, T., "Social Science," http://www.multichannel.com/content/social-science, Sep. 2011 (5 pages).

International Search Report and Written Opinion dated Apr. 8, 2013 for International Application No. PCT/US2012/069306, filed Dec. 12, 2012 (12 pages).

* cited by examiner

| Dimension Index (i) | Description Of Component | Component Key Length ($L_c^i$) | |
|---|---|---|---|
| 1 | Time segment | 16 | |
| 2 | Type of Algorithm | 4 | |
| 3 | Frequency shift | 27 | |
| 4 | PN sequence | 10 | |
| 5 | Frequency band | 25 | Key Length ($L_c$) = 82 bits |

|  | Robustness | Security | Transparency | Computational Expense | False Detections |
|---|---|---|---|---|---|
| Increasing embedding key length | Improves | Improves | Degrades | Increases | Increases |
| Increasing Extraction Key length | Improves | Improves | N/A | Increases | Increases |
| Increasing Watermark Strength | Improves | Somewhat Degrades | Degrades | N/A | N/A |
| Increasing Overlap Between Detection Key Sets | N/A | Degrades | N/A | N/A | Decreases |

FIG. 7

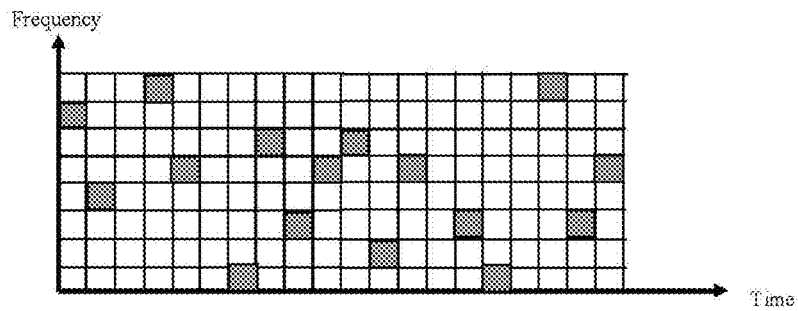

FIG. 9

| | Content #1 | Content #2 | Content #3 | Content #4 | Content #5 | Content #6 |
|---|---|---|---|---|---|---|
| 1 | 11271 | 11271 | 5663 | 4163 | 11271 | 11271 |
| 2 | 13809 | 14063 | 11271 | 11271 | 21023 | 13809 |
| 3 | 14063 | 35207 | 13809 | 19590 | 35720 | 20871 |
| 4 | 31568 | 35720 | 37743 | 37743 | 37743 | 24002 |
| 5 | 35720 | 37743 | 59768 | 50971 | 51658 | 30980 |
| 6 | 37743 | 52668 | 60032 | 60032 | 60032 | 37743 |
| 7 | 46468 | 56720 | 62314 | 63108 | 67214 | 42689 |
| 8 | 48050 | 60032 | 67214 | 67214 | 69166 | 60032 |
| 9 | 60032 | 67214 | 69166 | 69166 | 71333 | 67214 |
| 10 | 67214 | 67978 | 72694 | 72694 | 72694 | 69166 |
| 11 | 69166 | 69166 | 78029 | 78029 | 78029 | 72694 |
| 12 | 69209 | 72694 | 79277 | 79988 | 84627 | 76388 |
| 13 | 72694 | 78029 | 85817 | 99959 | 90467 | 78029 |
| 14 | 74218 | 78847 | 86245 | 105448 | 92737 | 81732 |
| 15 | 78029 | 83796 | 90852 | 118214 | 96293 | 95673 |
| 16 | 82864 | 84627 | 92494 | 137812 | 96348 | 99959 |
| 17 | 84627 | 94271 | 94568 | 143379 | 99959 | 130304 |
| 18 | 94568 | 99959 | 96348 | 149367 | 106612 | 143379 |
| 19 | 99959 | 129792 | 98220 | 152362 | 113817 | 143742 |
| 20 | 105448 | 131136 | 99959 | 159072 | 126920 | 148938 |
| 21 | 132881 | 143379 | 117085 | 160711 | 143379 | 149367 |
| 22 | 143379 | 149367 | 119970 | 167976 | 149367 | 152362 |
| 23 | 148852 | 152362 | 137374 | 170526 | 152362 | 159072 |
| 24 | 149367 | 159072 | 143379 | 172306 | 159072 | 160711 |
| 25 | 152352 | 160010 | 149367 | 194178 | 160711 | 161361 |
| 26 | 152362 | 160711 | 152362 | 195009 | 170526 | 168239 |
| 27 | 159072 | 170526 | 159072 | 201814 | 182391 | 170526 |
| 28 | 160711 | 173505 | 160711 | 205656 | 195009 | 172673 |
| 29 | 170526 | 186921 | 170526 | 213166 | 198459 | 173952 |
| 30 | 187039 | 188239 | 174875 | 231124 | 201094 | 191458 |
| 31 | 194178 | 195009 | 185818 | 231833 | 205656 | 195009 |
| 32 | 195009 | 200352 | 195009 | 238600 | 211093 | 198277 |
| 33 | 198955 | 205656 | 200678 | 245871 | 219890 | 205656 |
| 34 | 205656 | 209130 | 205656 | 253456 | 221726 | 210943 |
| 35 | 209439 | 214700 | 210013 | 253902 | 229452 | 211002 |
| 36 | 228647 | 217669 | 211093 | 255341 | 231833 | 228647 |
| 37 | 231833 | 227069 | 228647 | 268375 | 245871 | 231833 |
| 38 | 232076 | 228091 | 231833 | 280430 | 249497 | 245871 |
| 39 | 238600 | 228336 | 233418 | | 253456 | 253456 |
| 40 | 245871 | 231833 | 245871 | | 255341 | 255341 |
| 41 | 253456 | 245871 | 249841 | | 278485 | 258140 |
| 42 | 255341 | 250153 | 250898 | | 280788 | 261035 |
| 43 | 266893 | 253456 | 253456 | | 282035 | |
| 44 | 268986 | 255341 | 255341 | | 285816 | |
| 45 | | 278485 | 276980 | | 286023 | |

FIG. 10

|    | Extractor #1 | Extractor #2 | Extractor #3 | Extractor #4 | Extractor #5 |
|----|--------------|--------------|--------------|--------------|--------------|
| 1  | 60           | 36239        | *4163*       | *21023*      | 11271    |
| 2  | 3410         | 37743    | 37743    | 37743    | 11811        |
| 3  | 11271    | 38314        | *50971*      | 51658        | *20871*      |
| 4  | 21710        | 58831        | 58831        | 69166    | *24002*      |
| 5  | 22723        | *59768*      | *63108*      | *71333*      | *30980*      |
| 6  | 25656        | 60032    | *72694*      | *90467*      | 37743    |
| 7  | 26727        | *62314*      | 79988        | *92737*      | *42689*      |
| 8  | 27139        | 67214    | 99959    | *96293*      | 57063        |
| 9  | *31568*      | 73080        | *118214*     | 99959    | 64802        |
| 10 | 36239        | 78561        | *137812*     | *106612*     | 69166    |
| 11 | 37743    | *79277*      | 159072   | *113817*     | 72180        |
| 12 | *46468*      | 82940        | 160711   | *126920*     | 73080        |
| 13 | *48050*      | 85817        | *167976*     | *149367*     | 76388        |
| 14 | 54923        | *86245*      | 171088       | 159072   | 100812       |
| 15 | 67214    | *98220*      | *172306*     | 160711   | 105101       |
| 16 | 69166    | 98644        | 178739       | 170526   | 108676       |
| 17 | *69209*      | 101125       | 180459       | 195009   | 115957       |
| 18 | 78029    | 108676       | 182160       | *198459*     | 120585       |
| 19 | 80924        | *117085*     | *201814*     | *201094*     | *130304*     |
| 20 | *82864*      | *119970*     | 211961       | *229452*     | 132783       |
| 21 | 98644        | 132783       | *213166*     | *249497*     | 143379   |
| 22 | 101125       | 159122       | 215119       | 255341   | *143742*     |
| 23 | 111873       | 160711   | *231124*     | 280788       | *152362*     |
| 24 | 125752       | 163196       | 231781       | *282035*     | 160711   |
| 25 | *132881*     | 171088       | 231833   | 285816       | *161361*     |
| 26 | 140173       | 174177       | 253456   | *286023*     | 163196       |
| 27 | 140201       | *174875*     | 253902       |              | 166522       |
| 28 | 144565       | 176215       | 255341   |              | *168239*     |
| 29 | *148852*     | 183264       | *268375*     |              | 170526   |
| 30 | 149367   | 185818       | *280430*     |              | *173952*     |
| 31 | *152352*     | 195009   |              |              | 190886       |
| 32 | 159072   | 198878       |              |              | *191458*     |
| 33 | 159122       | *200678*     |              |              | 194880       |
| 34 | 160711   | *210013*     |              |              | 198277       |
| 35 | 174177       | 211961       |              |              | 199954       |
| 36 | 179065       | 215119       |              |              | 203707       |
| 37 | 193492       | 219927       |              |              | 205656   |
| 38 | *198955*     | 220404       |              |              | 210943       |
| 39 | 209439       | 231781       |              |              | 219536       |
| 40 | 209476       | *233418*     |              |              | 225039       |
| 41 | 216531       | *245871*     |              |              | 253456   |
| 42 | 231833   | *249841*     |              |              | *261035*     |
| 43 | *232076*     | 250898       |              |              | 269327       |
| 44 | *232609*     | *276980*     |              |              | 270329       |
| 45 | 254430       |              |              |              |              |
| 46 | *266893*     |              |              |              |              |

FIG. 11

| | Extractor #1 | Extractor #2 | Extractor #3 | Extractor #4 | Extractor #5 |
|---|---|---|---|---|---|
| 1 | 60 | 36239 | *4163* | *21023* | 11271 |
| 2 | 3410 | *37743* | *37743* | *37743* | 11811 |
| 3 | 11271 | 38314 | *50971* | 51658 | *20871* |
| 4 | *21710* | *58831* | *58831* | 69166 | *24002* |
| 5 | *22723* | *59768* | *63108* | 71333 | *30980* |
| 6 | *25656* | 60032 | *73694* | 90467 | *37743* |
| 7 | *26727* | *62314* | *79988* | 92737 | *42689* |
| 8 | *27139* | 67214 | *99959* | 96293 | 57063 |
| 9 | *31568* | 73080 | *118314* | *99959* | 64802 |
| 10 | 36239 | 78561 | *137812* | *106612* | *69166* |
| 11 | *37743* | 79277 | *159072* | 113817 | 72180 |
| 12 | *46468* | 82940 | *160711* | 126920 | 73080 |
| 13 | *48050* | 85817 | *167976* | 149367 | 76388 |
| 14 | 54923 | *86245* | *171088* | *159072* | 100812 |
| 15 | 67214 | *98220* | *172306* | *160711* | 105101 |
| 16 | 69166 | 98644 | *178739* | 170526 | 108676 |
| 17 | *69209* | 101125 | *180459* | 195009 | 115957 |
| 18 | 78029 | 108676 | *182160* | 198459 | 120585 |
| 19 | 80924 | *117085* | *201814* | 201094 | *130304* |
| 20 | *82864* | *119970* | *211961* | 229452 | 132783 |
| 21 | 98644 | 132783 | *213166* | 249497 | 143379 |
| 22 | 101125 | 159122 | *215119* | *255341* | *143742* |
| 23 | 111873 | 160711 | *231124* | 280788 | 152362 |
| 24 | 125752 | 163196 | *231781* | 282035 | 160711 |
| 25 | *132881* | *171088* | *231833* | 285816 | *161361* |
| 26 | 140173 | 174177 | *253456* | 286023 | 163196 |
| 27 | 140201 | *174875* | *253902* | | 166522 |
| 28 | 144565 | 176215 | *255341* | | 168239 |
| 29 | *148852* | 183264 | *268375* | | *170526* |
| 30 | 149367 | 185818 | *280430* | | *173952* |
| 31 | *152352* | 195009 | | | 190886 |
| 32 | *159072* | 198878 | | | *191458* |
| 33 | 159122 | 200678 | | | 194880 |
| 34 | 160711 | 210013 | | | 198277 |
| 35 | 174177 | *211961* | | | 199954 |
| 36 | 179065 | *215119* | | | 203707 |
| 37 | 193492 | 219927 | | | 205656 |
| 38 | *198955* | 220404 | | | 210943 |
| 39 | *209439* | *231781* | | | 219536 |
| 40 | 209476 | *233418* | | | 225039 |
| 41 | 216531 | 245871 | | | 253456 |
| 42 | *231833* | *249841* | | | 261035 |
| 43 | 232076 | 250898 | | | 269327 |
| 44 | 232609 | *276980* | | | 270329 |
| 45 | 254420 | | | | |
| 46 | *266893* | | | | |

FIG. 12

| Correlation Coefficient Range | Detected Bit Value | Probability Value |
|---|---|---|
| 0.7 to 1.0 | 1 | 0.9 |
| 0.5 to 0.7 | 1 | 0.8 |
| 0.3 to 0.5 | 1 | 0.7 |
| 0.1 to 0.3 | 1 | 0.6 |
| 0 to 0.1 | 1 | 0.55 |
| -0.1 to 0 | 0 | 0.55 |
| -0.3 to -0.1 | 0 | 0.6 |
| -0.5 to -0.3 | 0 | 0.7 |
| -0.7 to -0.5 | 0 | 0.75 |
| -1.0 to -0.7 | 0 | 0.9 |

FIG. 18

CIRCUMVENTION OF WATERMARK ANALYSIS IN A HOST CONTENT

RELATED APPLICATIONS

This patent application is a continuation application of and claims priority to U.S. patent application Ser. No. 13/247,586, filed on Sep. 28, 2011, now U.S. Pat. No. 8,340,348, which is a continuation of U.S. patent application Ser. No. 11/115,990, filed on Apr. 26, 2005, which are incorporated herein by reference in their entirety for all purposes.

BACKGROUND OF THE INVENTION

The present invention relates generally to embedding and detection of watermarks into and from digital multi-media content and more specifically to systems, methods and devices for thwarting circumvention attempts directed to preventing proper detection of embedded watermarks.

Digital watermarks are substantially imperceptible signals embedded into a host signal The host signal may be any one of audio, still image, video or any other signal that may be stored on a physical medium, transmitted or broadcast from one point to another or received and exhibited using a variety of display means such as monitors, movie screens, audio speakers or print medium. Digital watermarks are designed to carry auxiliary information without substantially affecting fidelity of the host signal, or without interfering with normal usage of the host signal. For this reason, digital watermarks are sometimes used to carry out covert communications, where the emphasis is on hiding the very presence of the hidden signals. The main applications of digital watermarks include prevention of unauthorized usage (i.e., duplication, playing and dissemination) of copyrighted multi-media content, proof of ownership, authentication, tampering detection, broadcast monitoring, transaction tracking, audience measurement and triggering of secondary activities such as interacting with software programs or hardware components.

The above list of applications is not intended to be exhaustive as many other present and future systems can benefit from co-channel transmission of main and auxiliary information. An example of such a system is one that utilizes a digital watermarks to carry auxiliary informational signals; these signals may convey spatial coordinates (e.g., GPS coordinates) of an apparatus, or timestamps indicating the exact time of generation and/or transmission of the composite host and watermark signals or any other information related or unrelated to the host signal. Alternatively, digital watermarks may carry information about the content, such as caption text, full title, artist name, and instructions on how to purchase the content. Other applications of watermarks include document security and counterfeit prevention for printed materials. In such applications, the presence of hard to re-produce (e.g., hard to copy) watermarks establishes authenticity of the printed material.

There is a considerable amount of prior art describing various digital watermarking techniques, systems and applications. Watermarking techniques described in the literature include methods of manipulating the least significant bits of the host signal in time or frequency domains, insertion of watermarks with an independent carrier signal using spread spectrum, phase, amplitude or frequency modulation techniques, and insertion of watermarks using a host-dependent carrier signal such as feature modulation and informed-embedding techniques. Most embedding techniques utilize psycho-visual or psycho-acoustical analysis (or both) of the host signal to determine optimal locations and amplitudes for the insertion of digital watermarks. This analysis typically identifies the degree to which the host signal can hide or mask the embedded watermarks as perceived by humans.

In most digital watermarking applications, the embedded watermarks must be able to maintain their integrity under various noise and distortion conditions that may affect the multimedia content. These impairments may be due to various signal processing operations that are typically performed on multimedia content such as lossy compression, scaling, rotation, analog-to-digital conversion, etc., or may be due to noise and distortion sources inherently present in the transmission and/or storage channel of multi-media content. Examples of this type of noise include errors due to scratches and fingerprints that contaminate data on optical media, noise in over-the-air broadcasts of audio-visual content, tape noise in VHS tapes, everyday handling of currency notes, and the like. Typically, increased robustness of embedded watermarks may be obtained at the expense of reduced transparency of the watermark.

The security of digital watermarks is another aspect of watermarking systems. In certain applications such as proof of ownership, source authentication, piracy tracing, access control of copyrighted content, and the like, it is essential that embedded watermarks resist intentional manipulations aimed at detecting the presence of watermarks, deciphering the data carried by the watermarks, modifying or inserting illegal values (forgery), and/or removing the embedded watermarks. To this end, many watermarking systems employ a secret key to enable embedding and subsequent extraction of the watermarks. These systems should be distinguished from cryptographic systems where a secret key is used to prevent unauthorized access and/or modification of the information but are not designed to prevent the detection of the presence or the removal of the encrypted information. Such cryptographic systems, depending on the length of the key and the complexity involved in breaking the key, could theoretically guarantee security of encrypted digital data for most practical situations. Indeed cryptography can be used to protect against unauthorized reading or forgery of watermark data, but it fails to provide protection against other types of attacks that are aimed at preventing the legitimate users from detecting or extracting the embedded watermarks altogether. By the way of example and not by limitation, these attacks include synchronization attacks, replacements attacks and noise attacks that modify the composite host and watermark signal in such a way to obscure or damage the embedded watermarks beyond recognition. More details on possible attacks will be presented below.

Designing a watermarking system requires reaching the proper balance between transparency (imperceptibility), robustness and security requirements of the system. A fourth requirement is the watermark payload capacity. This requirement depends on the specific application of the watermarking system. Typical applications range from requiring the detection of only the presence of watermark (i.e., single-state watermark) to requiring a few tens of bits of auxiliary information per second. In the latter case, the embedded bits may be used to carry identification and timing information such as serial numbers and timestamps and metadata such as captions, artists names, purchasing information, and the like.

A fifth factor in designing practical watermarking systems is computational costs of the embedding and/or extraction units. This factor becomes increasingly important for consumer electronic devices or software utilities with limited silicon real estate or computational capabilities. This factor is strongly related to the application at hand. For example, watermarks for forensic tracing of piracy channels, such as those that embed different codes in each copy of content distributed over the Internet, may require a simple embedder but a complex and costly forensic extractor. On the other hand, copy control systems designed to prevent unauthorized access to multimedia content, for example, in consumer electronic devices, may tolerate a sophisticated embedder but require a simple and efficient extractor.

The sixth important factor in designing a practical watermarking system is the probability of false detections. Again, this requirement varies depending on the application at hand. In certain applications, such as copy control, the probability of false detections must be very low since executing a restrictive action on a legally purchased content is bound to frustrate users and have negative implications for device manufacturers and/or content providers. On the other hand, in broadcast monitoring systems where the frequency of broadcast content is measured to generate royalty payments or popularity charts, much higher false detection rates may be tolerated since the presence of a few false detections may have very little effect on the final outcome of the counts.

The prior art systems, at best, use an ad-hoc approach for designing watermarking systems that happen to have certain collection of features, which are then mapped onto various applications in search of a good match. These systems also fail to systematically analyze security threats and provide answers to different threat scenarios. For example, U.S. Pat. No. 5,889,868 (Moskowitz, et. al.) discusses randomizing the insertion locations of watermarks within the content signal as well as varying the embedding algorithm throughout the content. But there are no enabling embodiments that describe how this randomization may take place and how this would affect a watermarking system's design parameters. This reference also merely states that at any given location of a content one or another embedding technique may be used but it fails to discuss simultaneous utilization of embedding technologies. It also fails to discuss joint configuration of embedders and extractors in order to vary levels of robustness/security/transparency/cost. In another prior art system as disclosed by D. Kirovski, et. al., in "Multimedia Content Screening Using a Dual Watermarking and Fingerprinting System", Tech. Rep. MSR-TR-2001-57, Microsoft Research (June 2001) discloses a technique in which the host content is embedded in a conventional way (e.g., using a spread spectrum technique) using a secret watermarking key (SWK). The detection key for each detector, however, is different from SWK. The individualized detection key is generated by adding noise to SWK. Since detection is done via correlation, the noise-contaminated detection key should still produce the desired correlation value if there are no other significant (additional) impairments present. To build up immunity against additional impairments and more aggressive attacks, the length of the spreading sequence may be increased to compensate for the robustness penalty incurred due to non-optimum detection key. The techniques discussed in this prior art, however, are different from the present invention in many ways. First, the embedding is done in a conventional way so the variations in embedding space as well as the relative size of embedding space to the detection space are not considered. Second, detection keys constitute a degraded version of the embedder key; this produces a degraded correlation value during the detection process. In the present invention, however, individual detection keys are not generated by adding noise to the embedder key and the correlation value in the detection process is not degraded. Further, this reference also fails to discuss how the robustness/security/transparency needs of the watermarking system can be addressed using a systematic design approach that is suitable for a multitude of applications and needs.

These and other shortcomings of the prior art systems are addressed by the methods and apparatus of the present invention.

SUMMARY OF THE INVENTION

It is an object of the present invention to provide methods for design and implementation of digital watermarking systems that overcome various deficiencies of the prior art systems. It is another object of the present invention to provide systematic methods for designing watermarking systems that are arbitrarily secure, robust, transparent to the user, reliable, and cost effective. It is also an object of this invention to anticipate circumvention attempts against the disclosed watermarking systems and render such attempts ineffective. It is another object of the present invention to provide secure methods for generation and distribution of watermarking stego keys. It is a further object of the present invention to provide methods for designing watermarking systems with renewable stego keys. It is also the object of the invention to achieve all of the above without the need to establish a communication link between watermarking embedders and extractors.

The present invention provides methods and apparatus for embedding digital watermarks into a digital host content. In exemplary methods in accordance with the invention, a digital host content is received, e.g., at a receiver or other device incorporating a receiver. One or more watermark embedding technologies is selected. Multiple embedding opportunities are identified within the host content. A subset of the identified embedding opportunities is selected. A multiplicity of digital watermarks are then embedded into the host content in accordance with the selected subset of embedding opportunities utilizing the one or more selected watermark embedding technologies.

The host content may comprise one of multimedia content, audio content, video content, audiovisual content, image content, or the like.

The selecting of the subset of embedding opportunities may be adapted to provide at least one of optimum robustness, optimum security and optimum transparency of the watermark. Further, the selecting of the subset of embedding opportunities may be adapted to provide a desired tradeoff between levels of robustness, security, and transparency of the watermark.

A plurality of watermarking embedding technologies may be selected and used in the embedding step. For example, at least two different watermarking embedding technologies may be selected and used in the embedding step.

The embedding opportunities may be identified in accordance with characteristics of the host content. These characteristics may comprise at least one of temporal frequency, spatial frequency, duration, peak amplitude, luminance, chrominance, masking capability of the content, or the like. The embedding opportunities may also be identified in accordance with parameters of the watermark embedding technologies.

These parameters may comprise at least one of autocorrelation delay, frequency shift, PN sequence, quantization index, strength of embedding, chip rate, embedding bit rate, or the like. The embedding opportunities may be identified in accordance with both characteristics of the host content and parameters of the watermark embedding technologies.

The embedding opportunities may comprise a multi-dimensional space. The dimensions of the space may be comprised of at least two of: temporal frequency band, spatial frequency band, time segment, spatial extent, time delay, frequency shift, PN sequence, or embedding algorithm type.

The multiplicity of watermarks may be embedded using the same selected watermark embedding technology but with different embedding parameters. The extent of the selected embedding opportunities may be determined in accordance with at least one of desired transparency, robustness, or security of the system. A different subset of the identified embedding opportunities may be selected for embedding each host content.

The different subsets may have no common elements. Alternatively, the different subsets may have at least one common element. Further, different subsets of embedding opportunities may be selected for embedding different copies of the same host content. The different subsets used for the different copies of the host content may have no common elements. Alternatively, the different subsets may have at least one common element.

The subset of embedding opportunities may be selected at random. A different number of embedding opportunities may be produced for different implementations of an embedding device. A pattern of selected embedding opportunities may uniquely identify each embedding device. Further, a pattern of selected embedding opportunities may uniquely identify each embedding.

The subset of the identified embedding opportunities may be adaptable in response to observed or anticipated attacks. For example, the selecting of the subset of the identified embedding opportunities may comprise selecting at least one type of attack available against the selected watermark embedding technology, and producing a first set of embedding opportunities that may be adapted to be transformed into a second set of embedding opportunities in the presence of the attack.

A corresponding apparatus for embedding digital watermarks into a digital host content is also provided by the present invention. The embedding apparatus may comprise a receiver for receiving a digital host content, means for selecting one or more watermark embedding technologies, identification means for identifying multiple embedding opportunities within the host content, a selector means for selecting a subset of the identified embedding opportunities, and an embeddor for embedding a multiplicity of digital watermarks into the host content in accordance with the selected subset of embedding opportunities utilizing the one or more selected watermark embedding technologies. The embedding apparatus may be configured to carry out the features of the embedding methods described above.

The present invention also includes method and apparatus for extracting digital watermarks from a digital host content. In an exemplary method for extracting digital watermarks, a digital host content containing the embedded watermarks is received, e.g., at a receiver or other device incorporating a receiver. At least one stego key is selected from a collection of stego keys. The embedded watermarks can then be extracted from the host content in accordance with the selected stego key(s).

The selecting of the at least one stego key may be adapted to produce at least one of optimum robustness, security, and computational efficiency for the extraction of watermarks embedded in the host content. Further, the selecting of the at least one stego key may be adapted to produce a desired tradeoff between levels of robustness, security, and computational efficiency for the extraction of watermarks embedded in the host content.

The selecting of the at least one stego key comprises selecting the at least one stego key in a random fashion.

The collection of stego keys may comprise one stego key, at least two stego keys, or pairs of stego keys. The collection of stego keys may further comprise at least a pair of stego keys with no common elements, or at least a pair of stego keys with at least one common element.

The presence and value of extracted watermarks may be reported (e.g., to a particular user or device) at pre-determined time intervals.

The selecting of the one or more stego keys may be adapted in accordance with a desired false positive detection rate. The selecting of the one or more stego keys may be adapted to produce a desired probability of successful extractions. Further, the selecting of the one or more stego keys may be adapted to produce a desired computational complexity for the extraction of watermarks. Additionally, the selecting of the one or more stego keys may be adapted to anticipate transformations of the host content. Such transformations of the host content may modify watermark characteristics of the embedded watermarks. For example, the transformations may alter the appearance of at least one watermark that is embedded with a first embedding stego key such that the at least one embedded watermark appears to have been embedded with a second embedding stego key.

The size of a selected stego key may vary from one host content to another. A size of the collection of stego keys may vary in accordance with a type or value of the host content. Further, the size of a selected stego key may vary in accordance with a type or value of the host content.

The collection of stego keys may comprise a subset of all possible extraction stego keys. The collection of stego keys may be adapted in accordance with an observed or anticipated attack. Further, the collection of stego keys may be adapted in accordance with an expiration date.

A corresponding apparatus for extracting digital watermarks from a digital host content is also provided in accordance with the present invention. The extraction apparatus may include a receiver for receiving a digital host content, a memory device for storing a collection of stego keys, a selection means for selecting at least one stego key from the collection of stego keys, and an extraction device for extracting the embedded watermarks from the host content in accordance with the selected stego key(s). The extraction apparatus may be configured to carry out the features of the extraction methods described above.

The present invention also includes methods and systems for embedding and extracting of digital watermarks from digital host content. In an exemplary method for embedding and extracting digital watermarks, the digital host content is first received, e.g., at a receiver or other device incorporating a receiver. Multiple embedding opportunities are then identified within the host content. A first subset of the identified embedding opportunities within the host content is selected. A multiplicity of digital watermarks are then embedded into the host content in accordance with the selecting of the first subset to produce a composite host content. The composite host content can then be transmitted to one or more reception means. The composite host content is received at the one or more reception means. At least one stego key is selected from a collection of stego keys. The embedded watermarks can then be extracted from the composite host content in accordance with the at least one stego key.

The selecting of the first subset of identified embedding opportunities may be conducted in a pseudo-random fashion. Further, the selecting of the at least one stego key may be conducted in a pseudo-random fashion.

The selecting of the subset of identified embedding opportunities and the selecting of the at least one stego key for extraction of the embedded watermarks may be adapted to produce at least one of optimum security, robustness, transparency, and computational efficiency at a given false positive extraction rate. Further, the selecting of the subset of identified embedding opportunities and the selecting of the at least one stego key for extraction of the embedded watermarks may be adapted to produce a desired tradeoff between levels of robustness, security, and computational efficiency for the embedding and extraction of watermarks. In addition, the selecting of the subset of identified embedding opportunities and the selecting of the at least one stego key for extraction of the embedded watermarks may be adapted to optimize at least two of: security, robustness, transparency, computational efficiency, or false positive extraction rate.

Extraction of a subset of all originally embedded watermarks may be enabled in accordance with the at least one stego key. Alternatively, extraction of all possibly embedded watermarks may be enabled in accordance with the at least one stego key.

An exemplary system for embedding and extracting of digital watermarks from digital host content is also provided in accordance with the present invention. The system may include a receiver for receiving digital host content and identification means for identifying multiple embedding opportunities within the host content. A selector means may be provided for selecting a first subset of the identified embedding opportunities within the host content. An embedder may be provided for embedding a multiplicity of digital watermarks into the host content in accordance with the selecting of the first subset to produce a composite host content. A transmitter may be provided for transmitting the composite host content to one or more reception means. Reception means may be provided for receiving the composite host content. A selector means may be provided for selecting at least one stego key from a collection of stego keys.

Extraction means may be provided for extracting the embedded watermarks from the composite host content in accordance with the at least one stego key.

These methods and systems may also include the features of the individual embedding and extracting embodiments described above.

Other features provided by the present invention include:
Security enhancements via:
  Masking;
  Embedding avoidance of special signals;
  Protocol attack prevention;
  Masking; and
  Detection reporting delay;
Robustness improvement via Weight Accumulation Algorithm (WAA) combined with time diversity and soft decision decoding;
Capabilities for forensic tracking of content;
Preventing fraudulent access to content and enabling authentication of content via provision of multiple watermarks.

BRIEF DESCRIPTION OF THE DRAWINGS

The present invention will hereinafter be described in conjunction with the appended drawing figures, wherein like reference numerals denote like elements, and:

FIG. 7 is an example of a table describing the relationships between the system characteristics and stego keys;

FIG. 9 is an example of a time-frequency diagram used for illustrating the concepts described in Example 1;

FIG. 10 is an example of a table describing embedder stego key distribution related to Example 1;

FIG. 11 is an example of a table describing extractor stego key distribution related to Example 1;

FIG. 12 is an example of a table describing the effects of extractor circumvention related to Example 1;

FIG. 18 is an example of a table describing an example of soft decision parameters;

DETAILED DESCRIPTION OF THE INVENTION

Figure 1:
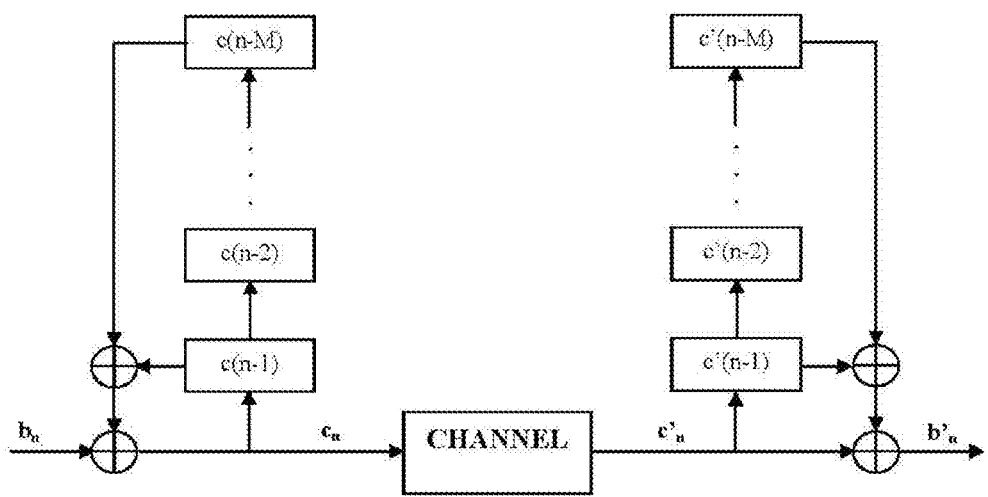
FIG. 1 illustrates an example embodiment of a self synchronizing scrambler.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims. Further, the concepts that are described herein are generally and specifically applicable to all systems comprising methods and apparatus for embedding and/or extracting digital watermarks.

The invention described herein provides guidelines for design of watermarking systems that can be easily adapted for various applications. The transparency (a.k.a. imperceptibility, or fidelity) of embedded watermarks may be a critical design element for many multimedia applications. This is especially true for certain applications where significant creative and financial resources have been utilized to produce just the right audio-visual experience. In such cases, any noticeable artifacts due to the insertion of watermarks may alter the intended effects of the audio-visual content and is simply unacceptable. For other applications, however, the transparency requirements may be somewhat less stringent. For example, prior to reaching the intended audience in a typical consumer electronic environment, the multimedia content may undergo several signal processing operations, such as compression, A/D and D/A conversions, equalization, broadcasting, etc., that introduce processing artifacts into the multimedia content. In such cases, it may suffice for the watermark-induced artifacts not to exceed the ones produced by such signal processing operations.

Watermark robustness is also a very important requirement for multimedia applications. Generally, watermark robustness refers to immunity against standard processing of the host signal, such as perceptual data compression, A/D and D/A conversions, resampling, standard content editing, etc. Robustness is also closely related to the restrictions imposed on probability of false detections. False detections may occur in two different ways. First, for any watermark extraction system, there is a small, but finite, probability of falsely detecting a watermark in an unwatermarked content. SDMI and DVD-audio requirements specify a false positive probability of less than $10^{-12}$ per 15-second detection interval. This means that the average time between false positives is 476 thousand years of continuous monitoring of unwatermarked content. A second type of false detection occurs when a watermarked content is being examined and a particular watermark value is falsely recognized as a different watermark value. This type of false detection, normally called a mis-detection, can produce unwanted outcomes. For a properly designed watermarking system, the rate of mis-detections should be roughly the same order of magnitude as the rate of false detections described above.

Another important factor in designing a watermarking system is the computational complexity of watermark extractors. This requirement can be stated as maximum Millions of Instructions Per Second (MIPS) value, maximum gate count, maximum ROM and RAM size, etc. In principle, the watermark extractor cost should be a small fraction of the cost of the device, or its processing load should amount to a small fraction of the processing load of the host software module.

The most challenging aspect of a proper watermarking system design involves the fulfillment of security requirements. Designing such systems may be particularly difficult for multimedia content applications since a watermark embedder and/or extractor may be readily available to (or may be acquired by) an attacker of the system. The attacker may then discover circumvention techniques that include altering, disabling or eliminating all or some of the embedded watermarks. These circumvention techniques may published, distributed or even implemented as "black box" hardware or software modules that are sold to the general public. It is further possible for this breach to become permanent since it may be very difficult to provide security upgrades (e.g., improved watermarking embedding or detection algorithms) to devices that have already been deployed. Another limitation that further constrains the design of these systems is that it is often required to implement inexpensive embedding and/or extraction designs that fit into environments with limited computational capabilities.

Watermark Technologies

Two classes of watermark algorithms that have received the most attention in the scientific community are Quantization Index Modulation (QIM) and spread spectrum (SS) based watermarks. In Spread Spectrum systems, the watermark data (bits) are modulated by a "chip sequence" in the form of a pseudo random string of +1 and −1 values. On the extractor side, the received signal is multiplied with the same pseudo random string, in sync with the sequence used in embedder, followed by an "integrate-and-dump" extraction of watermark bits. Typically, the extraction process consists of two steps. In the first step, called sync acquisition, the extractor attempts to match its local chip sequence generator with the embedded chip sequence. Once this is successfully achieved, the extractor switches to a data collection and sync maintenance regime.

The need to achieve synchronization between the embedded chip sequence and the locally generated chip sequence presents a major challenge for the Spread Spectrum watermarks. Many attacks are designed specifically to break down this synchronization; for example, by varying the playback speed of multimedia signal, deleting or repeating randomly selected row and columns in a picture, etc. An alternative technology which overcomes the synchronization issues of Spread Spectrum systems, utilizes a "replica signal", derived from the content itself, in place of the pseudo random string. The replica signal is used to modulate the watermark data prior to embedding, and again, at the receiver, the replica signal is generated and used for demodulation, followed by an "integrate-and-dump" extraction of the embedded data. Any time shifts of audio signal or geometric shifts in images would simultaneously affect the replica and the watermark signals, and their synchronization would be substantially maintained.

Attacks on Watermarks

The security goals of a watermarking system may include providing immunity against forgery, eavesdropping, erasure and modification of watermarks. Proper design of a watermarking system, in accordance with the embodiments of the present invention, includes security features that are designed to thwart all of the above circumvention techniques. These features provide for steganographic embedding of imperceptible watermarks that are difficult to detect, analyze, forge, erase or modify. Thus, the embedded watermarks are immune to a variety of attacks that may be undertaken by an attacker. Some of these attacks will be further described below. Additional techniques, for example, encryption, hashing, generation of digital signatures and other non-watermarking techniques may also be incorporated into the present system to provide additional levels of protection.

In order to design a secure watermarking system and predict its effectiveness, different attack methodologies on watermarking systems must be studied and countermeasures must be developed. The degree of success for each class of attack depends on the particular watermarking technology, particular multimedia content type and the intended use of the multimedia content. While some watermarking algorithms may be inherently immune to one type of attack, they may perform poorly against a different class of attacks. In addition, the resiliency of watermarks that are embedded based on psycho-visual and psycho-acoustical principles depends on the properties of the host content. Thus, it may prove to be more difficult to remove the same watermark from one content than from another. Finally, the usage of the content may set the bar on success or failure of an attack. For example, viewing of a deteriorated multimedia content with no watermarks may be tolerated on a small hand-held device in a noisy setting, such as an airport, but the viewing of the same content may not be acceptable on a home theatre HDTV screen.

Blind Attacks

In the case of a blind attack, an attacker does not have, and does not try to obtain, any information about the watermarking technology and its secret parameters (a.k.a. stego key). The attack is performed by applying different signal distortions to the content and finding one that removes the watermark with the least amount of damage to the host signal. Many blind attacks appear in the form of "benchmark" software packages like Stirmark, Certimark, Checkmark, etc. Detailed description of these test benchmarks can be found in many published documents.

Some blind attacks are more sophisticated than simple application of various distortions. For example, the blind pattern matching attack, described in Kirovski et al., is based on automatic detection and swapping of similar fragments in watermarked content. It is argued that most multimedia content is comprised of repetitive segments that can be swapped with each other. This action would disrupt the continuity of embedded watermarks but would maintain an acceptable perceptual quality due to the similarity of swapped segments. This underlying assumption requires the presence of similar segments throughout the content. While this may be true for a limited subset of multimedia content, this type of attack is not likely to be effective in every type of content. It is anticipated that in some types of content it would be unlikely to find enough similar segments for swapping while maintaining a reasonable audio-visual quality and at the same time, removing all embedded watermarks.

Informed Attacks

It is generally assumed that some knowledge of the watermark embedding and extraction methodology is beneficial in devising more efficient attacks for circumventing the system. In other words, an attacker with partial knowledge of the watermarking algorithms and parameters may be able to devise a successful attack that produces a smaller amount of perceptible distortion compared to its blind counterpart. The simplest form of informed attack is to determine the source of watermarks within the components of the multimedia content. In such cases, the multimedia content may be separated into audio and video portions and each type may be tested separately or decomposed into further components to determine the source of embedded watermarks. Obviously, this method may not be useful if all multimedia components contain watermarks. Most informed attacks are more sophisticated. These attacks are discussed below.

Differential Analysis and Attack

For some watermarking systems, it may reasonable to assume that the original, unwatermarked content (in addition to the watermarked version) is available to the attacker. By comparing the two versions, an attacker may discover certain facts about the embedding technology as well as certain secret parameters about the embedded watermarks. This knowledge may be sufficient to undo the watermarking, or to overwrite it with a different message, or simply select an attack that is most damaging against the particular algorithm and its now-discovered parameters.

The procedure for conducting a differential attack includes subtracting the watermarked content from the unwatermarked signal and analyzing the result. It should be noted that other techniques for generating a "difference signal" may examine the ratio of watermarked to unwatermarked signal (or its inverse). It is further possible to first align the two signals in order to compensate for possible signal distortions and then generate the difference signal in some of the ways described above. This alignment may be performed in time domain as the two versions of the multimedia content are manipulated so that salient points (i.e., portions of the multimedia content with distinctive features such as waveform peaks in audio signals, certain color components, scenes and/or frames in video and image signals) are aligned with each other. Obviously, similar alignment procedures and/or difference signal generation can be carried out in temporal or spatial frequency domains. The alignment procedure could require linear or non-linear amplitude, time domain or frequency domain scaling, as well as rotation, cropping and other geometrical manipulations. Once proper alignment is achieved, analysis of the difference signal may yield valuable information regarding embedding techniques and/or its secret parameters.

By the way of example and not by limitation, such analysis may include examination of the frequency range of the difference signal, the amplitude of the difference signal, the energy of the difference signal, the phase of the difference signal, the absolute value of the difference signal, the sign of the difference signal, the periodicity of the difference signal and any combination of the above in relation to certain attributes or features of the host content. For instance, it may be discovered that when the auto-correlation of the host signal over a certain time segment crosses a certain threshold, some characteristic of the difference signal (e.g., its energy, sign, mean, etc.) changes in a particular way. In general, relationships between the activities in the difference signal and the host content attributes and features can be used to discover other aspects of the watermarking technology.

Alternatively, the original and watermarked signals may be transformed into frequency domain, wavelet domain, or some other 'transformed' domains, and then the difference between transformed signals may be observed. This would be useful, for example, if the watermarking system contains a linear transformation and by analyzing the difference signal in frequency domain it may be discerned whether this transformation includes phase or magnitude changes or both.

It is further possible to determine whether the presence of the host signal is required for extraction of watermarks by trying to extract the watermark from the difference signal or a modified version of the difference signal. Such analysis could bear fruit if a foreign, additive or multiplicative carrier signal is used to carry the watermark information. In basic spread spectrum systems, for example, the embedded watermarks may be extracted from either the composite host and watermark or just from the difference signal. In feature modulation techniques, on the other hand, the presence of host is required for the recovery of the embedded watermarks, i.e. the difference signal only cannot be used to extract the watermarks.

Collusion Attacks

In this case, the attacker may obtain several copies of the same content containing different watermarks. Again, the attacker may attempt to perform differential analysis on a multiplicity of difference signals in order to discover certain details of the watermarking algorithm and/or its secret parameters. On the other hand, in the case where all watermarks convey the same message (e.g., the same ID number), one simple analysis would entail determining whether or not the multiplicity of difference signals are identical or whether or not there is a simple relationship, such as a time shift, between the various difference signals. This may indicate the presence of additional information, such as forensic information, fingerprints, etc., or may indicate that embedding of the individual copies is done separately, with a different set of parameters.

In a different collusion attack scenario, an attacker may obtain several completely different contents containing the same watermark and produce an averaged signal. If the host contents are mutually independent random variables and there is a large number of samples, the result of averaging should be approximately a constant (DC) signal. If watermarks are identical and signal independent, it would be superimposed onto this DC component and ready for further analysis.

In a different scenario where copies of the same content with different watermarks (i.e., different ID numbers) are available, the attacker can employ alternative collusion strategies for removal or obscuration of the embedded watermarks. For example, the attacker can generate a single copy of the content by averaging several copies that contain different watermarks. The averaging process should not appreciably deteriorate the perceptible quality of the host content but could generate enough "noise" in the watermark signal to interfere with reliable detection of the embedded watermarks. Further enhancements of this technique may require weighted and/or non-linear averaging schemes. Other variations of the collusion attack could involve cutting each copy of the content into small pieces, and then assembling a new copy by concatenating the different pieces together in either a deterministic or random (or pseudo-random) way. For example, attacker may select a segment with minimum, median or maximum energy, and include in output copy.

Oracle Attack

In the presence of a watermark extractor that provides only two states—watermark detected or not detected—it is possible to design procedures to estimate the embedded watermarks. This estimate can be used for watermark removal, overwriting, analysis, etc. The procedure consists of bringing the host content just outside the watermark detection region by iteratively adding distortion to the content in small steps, e.g. by adding small amounts of noise. Next the attacker would make small changes in various places and note those changes that switch the watermark detector on again. The collection of those changes represents an estimate of the watermark.

Embedder Based Attacks

It may be a reasonable to expect the attackers to gain access to one or more watermark embedders. In such cases, two types of attacks on the watermarking system may be expected: Overwriting Attack and Analysis attack. Overwriting attack is an attempt to embed a different (and perhaps more permissive) watermark in place of the originally embedded watermark. With this type of attack, there is no need to analyze the watermarking technology or its secret parameters. Effectiveness of this type of attack depends on the particular watermark embedding technology and its implementation. For example, this type of attack may be effective against a spread-spectrum watermarking system that uses the same carrier signal for embedding all watermarks. However, if several different carrier signals are employed at random to effect embedding, the attackers attempts at overwriting may introduce additional watermarks without erasing the original. Even if the same PN sequence is used to carry different data bits, overwriting attacks require more or less perfect synchronization between the original embedding and the overwriting attempt in order to completely obliterate the original watermark. This condition is also true for feature modulation techniques where misalignment of the two watermarking layers could result in the extraction of two distinct watermarks, albeit one layer may be stronger than the other.

Another type of attack that may be launched by having access to an embedding device is a form of denial-of-service attack. An attacker may intentionally embed a second set of watermarks to confuse and/or mislead the watermark extraction unit and inconvenience and frustrate legitimate users of the content. For example, in a copy control application, a more restrictive state, such as "do not copy" may be inserted into a content originally containing "copy freely" watermarks. Upon the detection of both watermark values, a recording device may decide to act in accordance to the usage rules of the more restrictive of the pair and disable the recording of the content. Similarly, in a broadcast monitoring application, a content may be originally embedded with the content owner's name and a serial number. An attacker may attempt to add a new set of names and serial numbers to the content prior to the broadcast of the segment. In this case, the presence of two or more conflicting set of watermarks may result in inaccurate reporting of broadcast monitoring information.

An "Analysis Attack" is similar to the type of attack described in the context of differential attacks, except that in the presence of an embedder, an attacker has the option of using specially designed test signals in order to extract secret parameters of the watermarking technology. Examples of such test signals include, but are not limited to, impulse signals, sinusoidal signals, flat image signals, edge image signals, step functions, signals with specific temporal or frequency characteristics and other specially formulated mathematical functions. An attacker may be able to, for example, determine the transfer function of the watermarking system (applicable for linear systems only) by analyzing the impulse response of the system. Analysis of the embedded signals of finite time duration or limited frequency range could also provide information regarding the minimum duration of watermarks, their frequency range, etc. In short, it may be possible to generate specially designed test signals of arbitrary complexity, embed them with watermarks and analyze them to gain some knowledge about the watermarking system.

Protocol Attacks

This type of attack forgoes attacking the watermark altogether in order to convert a compliant device into a noncompliant device. For example, it may be possible to disable the communication link between a watermark extractor and device control circuits, either by hardware or software modifications. It may be further possible to generate dummy signals (i.e., spoof signals) to deceive a compliant device into providing access to an otherwise restricted content.

Alternatively, it is possible to design a signal modifier that would transform the watermarked content in such a way that the host signal and/or the embedded watermarks are not recognizable by detection devices. The modified content may escape scrutiny by the compliant device since 1) it may not contain a watermark in recognizable form and/or 2) it may not be recognized as an audio-visual signal by the device. Once the modified content is loaded into the compliant device, it may be transformed back to its original form and accessed for further use. It is particularly simple to design a digital scrambler that would perform a random permutation of an input bit stream so that it does not resemble the original signal. By the way of example and not by limitation, the following self-synchronizing scrambler can adequately do this job. The scrambling of input bit stream $b(n)$, $n=1, 2, 3, \ldots$ (n represents the sequential bit number) into output bit stream c(n), n=1, 2, 3, . . . can be achieved by the following operation:

$$c(n)=b(n)\oplus c(n-1)\oplus c(n-M) \quad \text{Equation (1)}$$

where operator $\oplus$ represents modulo 2 addition, c(n)=0 for n<1 and M is a positive integer greater than or equal to 2. This operation is perfectly reversible and the original bit stream can be recovered using formula:

$$b(n)=c(n)\oplus c(n-1)\oplus c(n-M) \quad \text{Equation (2)}$$

Note that $c(n-1)\oplus c(n-1)=0$, as well as $c(n-M)\oplus c(n-M)=0$, while $b(n)\oplus 0=b(n)$ and commutation and association rules are valid with respect to modulo 2 addition. FIG. 1 illustrates the scrambling and descrambling carried out in accordance to Equations 1 and 2. In the absence of any channel distortions, the signal stream $b'_n$ should be identical to the original bit stream $b_n$. As noted above, the scrambling algorithm described above provides only an example of many possible signal modification techniques which may be used in this type of attack. In general, any reversible algorithm that modifies the signal in a way to obscure the presence of embedded watermarks, and/or the host content, may be employed. Furthermore, perfectly reversible signal modifications/transformations may not be required as long as 1) the modified signal escapes detection by compliant devices and 2) the signal retains reasonable perceptual quality subsequent to its transformation back to the original format.

It is also possible to do similar signal modifications in such a way that descrambling can be done in the analog domain. An efficient and effective method is based on multiplication (modulation) of original data with a foreign function. In the case where analog signal is a time function s(t), signal modification can be done by multiplying it with a foreign function $f(t)$, to obtain scrambled signal c(t):

$$c(t)=s(t)f(t) \quad \text{Equation (3)}$$

The descrambling can be done by multiplying the scrambled signal with $f(t)$ followed by Low Pass Filtering (LPF):

$$s'(t)=\text{LPF}(c(t)f(t))=\text{LPF}(s(t)f(t)^2) \quad \text{Equation (4a)}$$

Note that $f(t)^2$ is expected to have a strong DC component, which would multiply c(t) to provide the original signal s(t). Depending on selection of function $f(t)$ there may be some other components that would affect output signal quality. For example, an estimate of the original signal may be obtained by calculating the mean value of $f(t)^2$ according to the following:

$$s'(t)=\text{mean}(f(t)^2)s(t)+n(t) \quad \text{Equation (4b)}$$

With proper selection of $f(t)$, the noise n(t) can be minimized. For example, in the case of an audio signal with upper cutoff frequency $f_c$, multiplication with $f(t)=\cos(2\pi/f_c t)$ would invert the spectrum of the input signal, while descrambling (another multiplication with $\cos(2\pi f_c t)$) would restore the original spectrum. The noise signal would appear in frequency domain above $f_c$, which would be filtered out by a low pass filter, or may be left alone as an insignificant (substantially imperceptible) noise.

Design Principles

It is often possible to redundantly embed many watermarks within a single content. In most applications, a successful attack has to be able to remove the majority of embedded watermarks from a multimedia content. In some applications, a successful attack must eliminate all embedded watermarks since even a single watermark extraction could trigger a restrictive action. The embedded watermarks may be embedded in a variety of domains. For example, if a movie lasts for one-and-half hours and a watermark lasts for one second, there will be 5,400 potential time intervals for the insertion and subsequent extraction of the watermarks within this content. Similarly, for an audio signal that spans a frequency spectrum of 16 kHz and a watermark that spans 200 Hz, there will be 80 different frequency bands that can be used for watermark insertion and subsequent extraction. In the case of a video signal, the watermark may be embedded only in a fraction of the screen area. For example, if the screen contains 1024×768 pixels, and the watermark requires an 8×8 pixel area, then there will be (1024×768)/(8×8)=12,288 different places where a watermark can be hidden. If, further, multiple domains are used, e.g. the frequency, space, and time domain watermark embedding, the attacker will have the daunting task of removing watermarks from a very large number of possible hiding places.

Emulation of Cryptographic Systems

Before describing the design principles for a secure watermarking system, it is necessary to review some of the related concepts associated with cryptographic systems. Typically, a successful attack on a crypto-system requires the knowledge of two entities: the encryption algorithm and the encryption key. Assuming that such algorithms are perfectly secure (i.e., there are no back doors), the problem of attacking the system becomes the problem of finding the correct encryption key value. The description of different types of stego-systems is well documented in many scientific texts and articles. Encryption algorithms can generally be categorized into two groups: symmetric systems and asymmetric systems. The different between the two categories is in the usage and complexity of encryption and decryption operations. In symmetric systems, the same encryption key is used for both the encryption (encoding) and the decryption (decoding) and the two operations generally mirror each other. In asymmetric systems, encryption keys of different lengths are used for encoding and decoding operations, and typically, the two operations differ in complexity. Regardless of the classification of the crypto-system, launching a successful attack on an encryption system may contain the following four steps:

Step 1: obtain a plaintext (i.e. original content),

Step 2: obtain a ciphertext (i.e., encrypted version of the plaintext),

Step 3: select an encryption key value, and

Step 4: decrypt the ciphertext and compare it to the plaintext.

This is referred to as the known-plaintext attack. There are several other types of cryptanalysis techniques, such as, the ciphertext-only attack, chosen-plaintext attack, adaptive-chosen-plaintext attack, chosen-ciphertext attack, chosen-key attack, etc. The object of all these attacks is to recover the correct encryption key value (or a methodology to recover the encryption key value) in order to decrypt all other messages that are encrypted by the same key. There are other methods for obtaining the encryption key that are listed in the literature, some of which include bribing or coercing individuals to reveal secrets of the encryption system. These types of attacks are very effective and pose a serious threat to the security of cryptographic systems. It is a further object of the present invention to design a watermarking system to greatly reduce the success of attacks that rely on any individual's knowledge of the system.

The most basic attack against the encryption key space is the brute force approach where, based on the knowledge of the encryption algorithm, the attacker repeats steps 1 through 4 above $2^n$ times in order to guarantee the recovery of an n-bit encryption key (on average, $(2^n)/2$ iterations are sufficient). Thus, the difficulty of a successful brute-force attack grows exponentially with key length. There are certainly more efficient algorithms for attacking the encryption key space but they usually require advanced knowledge of the cryptographic system. Future quantum computing techniques may also render the current cryptographic systems obsolete, altogether. Currently, for a symmetric encryption system with no back doors, a key length of at least 128 bits is considered sufficiently large for withstanding different types of attacks.

In order to further increase the security of crypto-systems, it is possible to divide the content that is being protected into several segments and use a different encryption key and/or algorithm for each segment. The cost associated with this approach is increased complexity of key generation and management. That is, several decryption keys must be communicated to the receiver via an auxiliary communication channel, and synchronization between the transferred keys and the appropriate segments of the content must be maintained or regenerated at the receiver.

Attack analysis on a system containing watermarks shares certain similarities with the crypto-system analysis described above. For example, if an attacker is able to recover the secret embedding or extraction parameters (i.e., the stego key) of the watermarking system, he/she may be able to insert new watermarks or remove or jam existing watermarks. There are notable differences between the stego key in the context of watermarking systems and the encryption key described above. A detailed description of the stego key will be provided in the subsequent sections but for now the stego key can be assumed to comprise all the information necessary to embed and/or to extract a watermark from a host content.

The concept of security in watermarking systems also takes on a different meaning than what is typically envisioned by encryption systems. The main purpose of encryption is to prevent deciphering of a message without the presence of an encryption key. The main design goal of a watermarking system, in the context of present invention, is to thwart unauthorized removal or jamming of the embedded watermarks. These types of attacks typically involves obtaining information about the watermarking algorithm and its parameters (i.e., determining the stego key) and subsequently removing or jamming the embedded watermarks without degrading the perceptual quality of the host content.

Stego Key—Watermark Embedding

The term steganography means "covered writing" and it is derived from Greek word "stego" that means roof or cover and "graphy" that means writing. In other words, steganography is a technique of hiding messages or signals within a host content. The hiding place is generally described through a "stego key" that is used both in embedding and in extracting procedures. Generally, it is assumed that the hiding algorithm is public, but the parameters used in a particular hiding process are secret, and comprise the stego key. This is also known as Kerckhoff's principle, which states that the security of a cryptosystem shall not be based on keeping the algorithm secret but solely on keeping the key secret. This is based on the idea that eventually the algorithm will be discovered and peer review of the algorithm is only going to benefit the security, design and acceptance of the algorithm.

In the context of the present invention, the stego key comprises all relevant information that is used to embed and/or extract a particular watermark within multimedia content. According to this generalized definition, watermarking algorithms should also be considered part of the stego key. The Kerckhoff's principle is correct only if the technology selection is fixed and only one technology is implemented in extraction devices that are distributed to the public. According to the embodiments of the present invention, multiple distinct technologies are implemented in the extraction apparatus, and the selection among them in any particular communication attempt is kept secret, i.e. it is part of the stego key. For example, embedding and extraction devices may be equipped with at least one of spread spectrum, quantization index modulation, peak-amplitude modulation, echo hiding or a combination of these technologies.

However, it is not necessary for every embedder and/or extractor to contain all possible watermarking technologies. The objective is to keep results of an attack inconsistent, unpredictable, and confusing both to the attacker and to the user of pirated content. For example, it may be desirable to lead the attacker to believe that an attack is successful, and to distribute his results, and then to find out that this is not the case, resulting in the attacker's loss of credibility. Similarly, it may be desirable to make the pirates invest time and effort to find a procedure, or a 'black box' that enables piracy only to discover that it works only for special cases.

In the case of embedders, it may be advantageous to reserve some of the embedding technologies for future use, as attacks on already deployed watermarks grow more sophisticated and more successful. Generally, the selection of watermarking technologies in the embedder must be as flexible and as dynamic as possible. This could mean that the selection of particular embedding technologies could be done in accordance with the degree of success or failure of piracy attacks on already released content.

Similarly, not all watermarking technologies may be implemented in each extraction device. This would simplify implementation of extractors in consumer devices and reduce silicon area and processing load. It will also make extractor performance unpredictable, as extraction results would differ from one device to another, making attacks inconsistent and frustrating to casual pirates.

It is important to note that different watermarking techniques may have different robustness profiles, e.g. one technology may produce better immunity to lossy compression and corruption by noise, while another may exhibit superior immunity to synchronization attacks. Therefore, by embedding and extracting watermarks using multiple algorithms and technologies, one can increases the overall range of distortions and attacks that can be tolerated (i.e. it may require multiple simultaneous distortions in order to disable watermark detection). Multiple technologies may require a multi-dimensional search for a weakness, while a single technology may require a one-dimensional search. Exact selection of the technologies that should be bundled together depends on the individual features of each technology. Generally, it is desirable to combine together disparate technologies with non-overlapping security weaknesses. For example, watermarks embedded using time-domain, spread-spectrum technology, which may be prone to synchronization attacks, may coexist with replica modulation watermarks to alleviates this weakness. It should be also noted that simultaneous embedding of watermarks with multiple technologies complicates differential analysis and may mislead and confuse the attackers. For this purpose, it is desirable that watermarks generated by different algorithms overlap in time, space, and frequency domains.

In many watermarking applications of the prior art, multiple watermarks are embedded using the same stego key but at different time intervals. This redundant embedding of watermarks is typically done to improve the chances of correct detection of watermarks. For example, the stego key for a spread spectrum watermarks may comprise the seed for a random number generator. In such systems, the same seed may be used to repeatedly embed the same watermark throughout the content. In the system of present invention, different watermarking technologies are employed during different time intervals so that the time interval for a particular embedding is also considered to be part of a stego key.

In addition, in typical watermarking applications of the prior art, watermark strength is decided solely based on a robustness vs. transparency tradeoff. In the system of the present invention, watermark strength may be incorporated as a security feature of the system since the success of many blind attacks, as well as jamming and overwriting attacks, strongly depends on watermark strength. Therefore, in the context of the present invention, the watermark strength is also part of embedder stego key. Note that for many watermarking technologies, such as spread spectrum or replica modulation, the watermark strength does not affect the extractor operation (other than changing the robustness of detection in the presence of channel impairments), while for others, such as peak amplitude modulation or distributed feature quantization, extraction parameters do change in accordance with the strength of embedded watermarks. In the latter cases, changing the embedding strength must be conveyed to the extraction device as part of the extractor key set.

Selection of watermark strength certainly affects the transparency requirement, i.e. the stronger the watermark, the more perceptible is its presence. However, the perceptibility of watermarks also depends strongly on the masking capability of the content itself. For example, content that is more noise like, such as recording of a live rock concert, may be more tolerant to increased watermark strength than a more structured content, such as string quartet music. Similarly, for still and moving images, it may be preferable to embed watermarks in regions within a certain range of luminance/chrominance values or spatial frequencies. Therefore, variations of watermark strength should be made in tune with content properties, either by some automatic method, or by human selection. In any case, the algorithm for varying watermark strength may be kept secret so that an attacker cannot determine these variations by analyzing the content.

The strength of embedding can also be modified in accordance to the value of the content that is being protected and the application of the content. In some cases, the additional distortion introduced in the content due to stronger watermarks may be negligible compared to the distortions introduced by the transmission channel (e.g., FM or AM channel broadcasts). In such cases, increasing the strength of embedding may be acceptable. In other cases, such as theatrical or DVD releases of motion pictures, higher fidelity requirements may not allow such overall increases in watermark strength. Alternatively, the strength of watermark may be locally adjusted for only portions of the multimedia signal of special interest. These portions may comprise climactic scenes or key audio portions in a movie or may be randomly distributed throughout the multimedia content.

In the presence of watermark strength variations, the attacker has two options. The first option is to apply enough distortion and/or noise throughout the content, which would guarantee that even the strongest watermark is removed. For a properly designed watermarking system, this action is expected to degrade the quality of the content beyond acceptable levels. It should be noted that the amount of distortion and/or noise required to remove the strongest watermarks may vary from content to content. The strength of embedding can also be adjusted dynamically in accordance to the degree of success or failure of piracy attacks on previously released material. For example, future releases of a multimedia content may be embedded with stronger watermarks to make any previously developed attacks ineffective.

Alternatively, an attacker may try to identify the watermark strength in each particular content, and apply just enough distortion to each of them. This is a very difficult task in the presence of multiple technologies and other security features disclosed herein. Many of the security features disclosed below are designed to prevent this type of analysis.

Figures 2, 3:
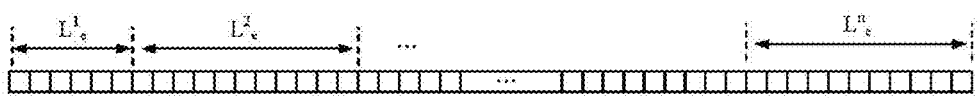
FIG. 2 illustrates an example embodiment of a stego key.
FIG. 3 is a table describing an example of various constituents of an embedding stego key.

The watermarking stego key of the present system is comprised of many components where each component may be considered one dimension of an n-dimensional stego key space. The constituents of the n-dimensional space may vary depending on the nature and type of the host content or the specific application of watermarking system. For example, the number and type of stego key components for still image watermarking may differ from those corresponding to video or audio watermarking. In addition, the stego keys for embedding and extraction are generally of different lengths and may span different dimensions in the stego key space. In general, an embedding stego key of length $L_e$ may be represented as:

$$L_e = \Sigma L^i_e = L^1_e + L^2_e + L^3_e + \ldots + L^n_e \qquad \text{Equation (5)}$$

Where n is the dimension of stego key space and $L^i_e$ represents the length of each component, i, for $1 \leq i \leq n$, as shown in FIG. 2. In accordance with an example embodiment of the present invention, for each embedding session, a stego key is selected and used for embedding the content. The selection of the embedding stego key can be a random selection process or may be done in accordance with a pre-determined selection scheme.

The stego key components for an audio watermarking system, for example, may be constructed using a 6-dimensional key space. FIG. 3 provides an example of an embedding stego key for an audio watermarking system. The first component of the stego key (Dimension 1) may represent the particular time slot within the multimedia content that is targeted for embedding. In this example, using 16 bits allows selection of 65536 different time slots. The second component (Dimension 2) allows the selection of one or more embedding algorithms. Components 3 and 4 (Dimensions 3 and 4) respectively represent frequency shift and PN sequence lengths that are associated with each embedding algorithm. Component 5 (Dimension 5) corresponds to the number of distinct frequency segments in the content that is targeted for embedding. Note that the granularity of time and frequency components may vary according to the desired level of watermark capacity, security, transparency and robustness in accordance with system performance requirements and particular embedding algorithm. In addition, the duration of time slots and/or the spectral width of frequency bands may not be held constant throughout the content. These variations may be based on a pre-calculated variation pattern, a random variation pattern or may be in accordance to the characteristics of the host content. It is also entirely possible to have different time/frequency granularities for different embedding algorithms. Incorporation of such additional features would result in an even longer stego key.

Note that the stego key illustrated in FIG. 3 only provides an example of a 5-dimensional stego key space. In practice, some dimensions may be added (or removed) to achieve the desired system performance. The illustrated configuration allows embedding of the same time/frequency/spatial segment of the content with one or more watermarking algorithms. Of course, the number and strength of overlapping watermark layers/bands must not produce perceptible artifacts as mandated by the transparency requirements of the system. System performance requirements greatly vary from one application to another. Similar tables may also be constructed for other forms of multimedia content such as texts, still images or video streams. For example, a watermarking stego key for a feature film may comprise additional spatial and temporal frequency dimensions corresponding to video portions of the motion picture, as well as spatial extent of watermarks corresponding to individual frames of the motion picture.

Computational efficiency may also play a role in selecting the extent of embedding stego key, especially in real-time applications such as embedding of the content right before broadcast, embedding during tape-to-tape transfers, data-to-film transfers or rip-embed-transmit procedures. In such cases, it may be required to select the extent of stego key in accordance to cost/time limitations of the embedding application. For example, only a limited set of embedding opportunities may be utilized or a limited number of embedding algorithms may be selected. The limitations due to current technical constraints, however, are expected to be less prohibitive in the future as improvements in speed/cost of computational resources take place.

Although multimedia content management systems based on watermarks are not generally anticipated to produce cryptographically secure systems, it is instructive to compare the stego key analysis of the present watermarking system with the encryption key analysis described above. Most encryption key space attacks involve trying different permutations of a binary sequence until the encryption key value is revealed. Similar brute force attacks on the stego key space of the present watermarking system involves more than manipulation of a binary sequence. In fact, attacking the watermarking stego key involves attacking multiple binary sequences in n different dimensions where each attack may involve a different set of computationally expensive operations, such as filtering, convolution, correlation, etc. The complexity of attacks is believed to be sufficient to thwart and discourage unauthorized usage of the watermarked content.

Figure 4:
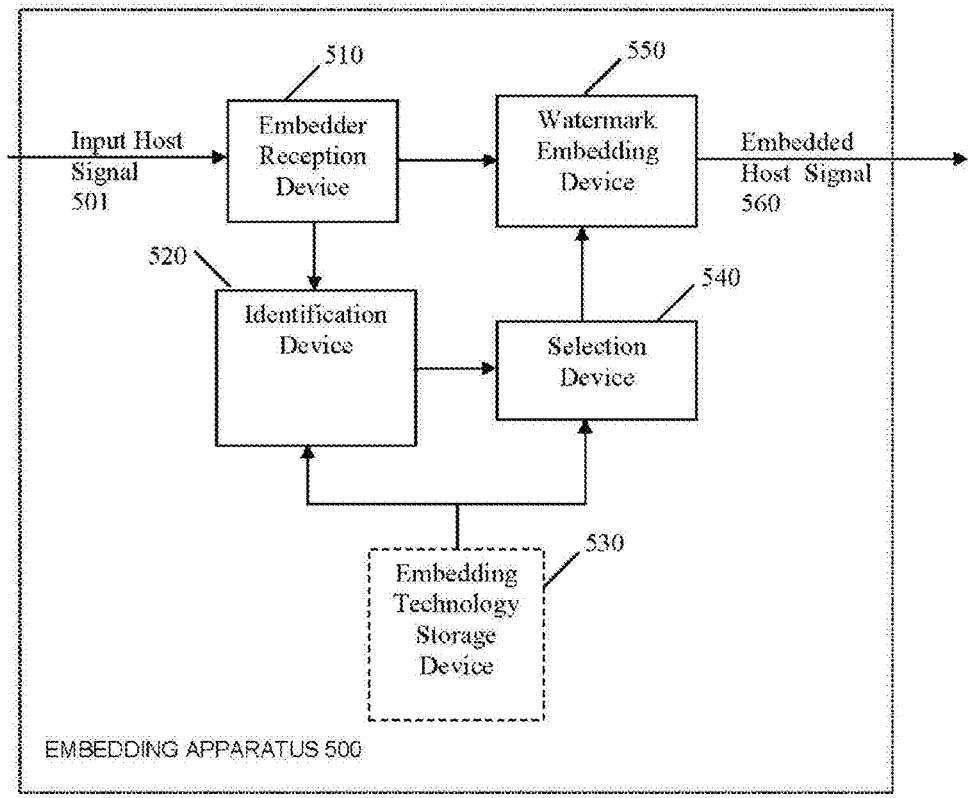
FIG. 4 is a block diagram showing an example embodiment of an Embedding Apparatus in accordance with the present invention.

FIG. 4 shows a block diagram of an Embedding Apparatus 500 in accordance with an exemplary embodiment of the present invention. The incoming host signal 501 containing the digital host content is received by a receiver or other device incorporating a receiver (e.g., Embedder Reception Device 510 of the Embedding Apparatus 500). As the input host content signal 501 may be in a variety of formats and may comprise several audio, video, multimedia, or data signals, it is necessary for the Embedder Reception Device 510 to appropriately condition the incoming host signal 501 into the proper form that is recognizable by other components of the embedding apparatus 500. This conditioning may comprise signal processing steps, such as, for example, demodulation, decompression, de-interleaving, decryption, descrambling, resampling, A/D conversion, re-formatting, filtering, or the like. It is also understood that some of the required signal conditioning steps may be carried out in other sections of the embedding apparatus such as the Watermark Embedding Device 550. The conditioned (or partially conditioned) signal is then processed by the Identification Device 520 in order to identify multiple embedding opportunities or locations within the host signal. All possible embedding opportunities may be identified. Alternatively, the identification of the embedding opportunities may be performed in accordance with all or some of the embedding technologies that may be used for embedding watermarks. A Selection Device 530 then selects a subset of the identified embedding opportunities. An optional Embedding Technology Storage Device 540 may be provided in order to store available embedding technologies. The Storage Device 540 may be regularly upgraded to contain up-to-date versions of the embedding technology parameters, algorithms or settings. It should be understood that the presence of a separate storage device may not be necessary, as other components of the embedding apparatus such as the Selection Device 540 or the Watermark Embedding Device 550 may contain the appropriate information related to the available embedding technologies and/or contain upgradeable memory modules that can be utilized for this purpose. The Selection Device 540 may also select one or more watermark embedding technologies from the Storage Device 530 (or other storage location). Once the appropriate embedding opportunities and the one or more watermark embedding technologies have been selected, the Watermark Embedding Device 550 embeds the watermarks in accordance with the selected watermark embedding technologies at the locations corresponding to the selected subset of embedding opportunities in the host content to produce an embedded host signal 560. The embedded host signal 560 may then be further processed, stored or transmitted.

The digital host content contained in the incoming host signal 501 may comprise one of multimedia content, audio content, video content, audiovisual content, image content, or the like.

The Selection Device 540 may select the subset of embedding opportunities to provide at least one of optimum robustness, optimum security and optimum transparency of the watermark. Further, the Selection Device 540 may select the subset of embedding opportunities to provide a desired tradeoff between levels of robustness, security, and transparency of the watermark.

A plurality of watermarking embedding technologies may be selected from the Storage Device 530 by the Selection Device 540 and used by the Watermark Embedding Device 550. For example, at least two different watermarking embedding technologies may be selected and used by Watermark Embedding Device 550.

The embedding opportunities may be identified by the Identification Device 520 in accordance with characteristics of the host content. These characteristics may comprise at least one of temporal frequency, spatial frequency, duration, peak amplitude, luminance, chrominance, masking capability of the content, or the like. The embedding opportunities may also be identified in accordance with parameters of the watermark embedding technologies. These parameters may comprise at least one of autocorrelation delay, frequency shift, PN sequence, quantization index, strength of embedding, chip rate, embedding bit rate, or the like. The embedding opportunities may be identified in accordance with both characteristics of the host content and parameters of the watermark embedding technologies.

The embedding opportunities may comprise a multi-dimensional space. The dimensions of the space may be comprised of at least two of: temporal frequency band, spatial frequency band, time segment, spatial extent, time delay, frequency shift, PN sequence, or embedding algorithm type.

The multiplicity of watermarks may be embedded by the Watermark Embedding Device 550 using the same selected watermark embedding technology but with different embedding parameters. The extent of the selected embedding opportunities may be determined in accordance with at least one of desired transparency, robustness, or security of the system. A different subset of the identified embedding opportunities may be selected by the Selection Device 540 for embedding each host content. The different subsets may have no common elements. Alternatively, the different subsets may have at least one common element.

Further, different subsets of embedding opportunities may be selected by the Selection Device 540 for embedding different copies of the same host content (as discussed in detail below in connection with FIG. 10). The different subsets used for the different copies of the host content may have no common elements. Alternatively, the different subsets may have at least one common element.

The subset of embedding opportunities may be selected by the Selection Device 540 in a random or pseudo-random fashion.

A different number of embedding opportunities may be produced for different implementations of an embedding device 500. A pattern of selected embedding opportunities may uniquely identify each embedding device. Further, a pattern of selected embedding opportunities may uniquely identify each embedding.

The subset of the identified embedding opportunities may be adaptable in response to observed or anticipated attacks. For example, the selecting of the subset of the identified embedding opportunities may comprise selecting (e.g., by the Selection Device 540 or other component of the Embedding Apparatus 500) at least one type of attack available against the selected watermark embedding technology, and producing a first set of embedding opportunities that may be adapted to be transformed into a second set of embedding opportunities in the presence of the attack.

It should be understood that the Embedding Apparatus 500, as shown in FIG. 4, may comprise a variety of digital, analog, optical or acoustical components. For example, the Embedding Apparatus may be implemented using a digital signal processing (DSP) unit, FPGA and ASIC devices, or may be implemented in a computer or hand-held device. It should also be understood that while the Embedding Apparatus 500 of FIG. 4 may be implemented as a single embedding unit, it is also possible to break-up its constituent components to form a distributed embedding device. For example, it is entirely possible to place the Watermark Embedding Device 550 at one physical location while the remainder of the embedding apparatus is placed at another physical location or multiple physical locations. The distribution of the embedding components may be done in accordance with the computational requirements of each component and the availability of computational resources at each location. The various components of such distributed apparatus may be interconnected using a variety of connectivity means, such as, for example, the Internet, dedicated phone lines, various wired or wireless computer networks, or even physical media such as portable storage devices.

Stego Key—Watermark Extraction

In order to successfully extract the embedded watermarks, an extraction stego key set must be present at the extraction device. The communication of the extraction key set is usually accomplished by permanently storing the extraction key set in the receiver apparatus, or communicating the extraction stego key set via an additional communication channel (e.g., smart card, internet connection, phone line, etc.), or carrying the extraction stego key set via the same communication channel (e.g., as part of the file header, on non-data carrying portions of CD's and DVD's, as part of the embedded watermarks, etc.). The disadvantage of the systems where the key set is permanently stored at the receiver is in their vulnerability to key space attacks. That is, if the extraction key set is stolen or revealed, the entire system may be compromised. This is especially true if a large number of extraction devices with the same extraction key set have been distributed and security updates are not feasible (e.g., in consumer electronic devices such as CD and DVD players). Key delivery using an auxiliary channel, although proven effective in certain cases such as set top box applications, have the disadvantage of relying on an additional communication channel. Such auxiliary channels may not be cost effective, may be susceptible to interception and jamming and may not be available in certain applications (e.g., analog recording devices).

Before describing the details of key exchange and key management of the present watermarking system, some characteristics of the extraction technique must be described. The present system, in most general cases, uses an asymmetric stego key approach for extracting the watermarks. In the absence of channel distortions, where content is delivered in pristine condition to its destination, it may be sufficient to know the exact embedding algorithms and the specific embedding parameters in order to extract the watermarks from the received content (i.e., use a symmetric stego key approach). However, in the presence of channel distortions, which may be the result of intentional or unintentional processing or attacks, the exact version of the embedding stego key may not be successful in extracting the distorted watermarks. This is due to the fact that the embedded watermarks may appear to have been embedded with a different set of parameters. For example, for a watermark that is hidden in an audio signal in the frequency band 4,000 Hz to 4,200 Hz, a pitch-shift processing that increases pitch by 5%, would move the embedded region to the band 4,200 Hz to 4,410 Hz. A properly designed extractor must search for the presence of watermarks not only in the original 4,000-4,200 Hz band but also in 4,200-4,410 Hz band (or, approximately, in 4,200-4,400 Hz band) in anticipation of probable channel impairments. Similarly, for an image with an 8×8 watermarked pixel area, if the screen size is transformed from 16:9 into 4:3 aspect ratio, the 8×8 watermarked pixel area would become an 8×6 pixel area. An extraction stego key set that is configured for both the 8×8 and 8×6 pixel areas would successfully extract watermarks in the presence (or absence) of this type of distortion.

In the system of present invention, the embedder key space may include as many keys as possible to account for all possible transformations. However, it is not necessary to incorporate all possible transformations of the stego key into the embedder key space. Furthermore, the extractor key space is not necessarily limited to embedder key space. It may not only include the entire embedder key space, so that each embedded watermark has a chance of being detected in clear channel, but it may also include a substantial number of stego keys that are generated by transformations outside embedder key space.

Figure 5A:
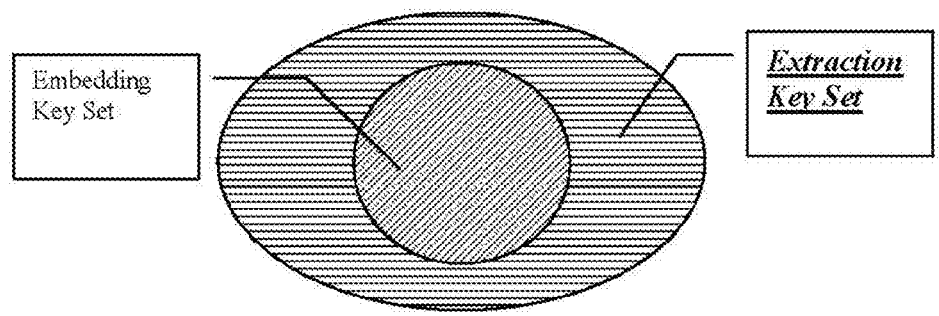
FIG. 5a is an example pictorial representation of an embedding stego key set and an extraction stego key set in the absence of distortions.
Figure 5B:
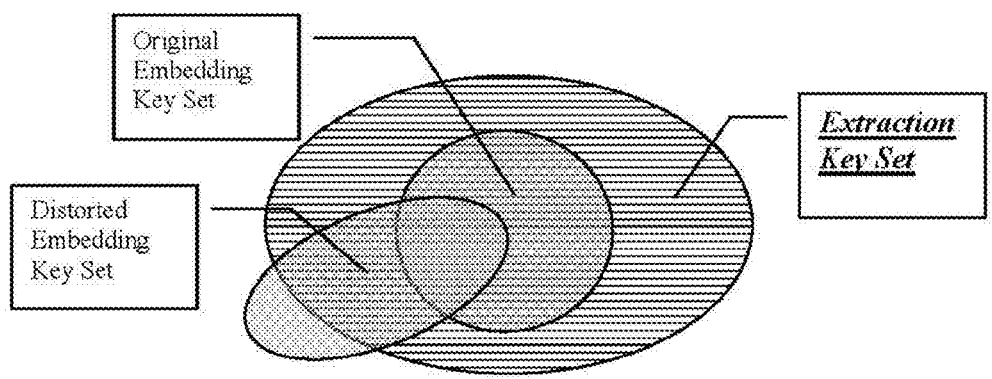
FIG. 5b is an example pictorial representation of an embedding stego key set and an extraction stego key set in the presence of distortions.

This concept of asymmetric embedding and extraction key sets is shown pictorially in FIGS. 5a and 5b. In FIG. 5a, the small circle represents an embedding stego key set and the large oval represents a set of extraction key values. The fact that the embedding key set completely lies within the larger extraction key set indicates that all embedded watermarks (in the absence of channel distortions) may be extracted from the content. This also indicates that some extraction attempts (the ones that look for embedded watermarks outside the embedded regions) are necessarily futile but this additional processing is a small price to pay for achieving enhanced security and improved robustness performance. In FIG. 5b, the same set of extraction keys are used for extraction in the presence of channel distortions that have altered the appearance of the embedding key set. As illustrated in FIG. 5b, the distorted embedder key set may fall partly outside the extractor key set that is utilized in a particular extractor, indicating that it is not necessary to capture all watermarks. In general, in the presence of channel distortions some portions of the embedder key set may remain unchanged or stay within the original embedding key space (i.e., overlap area between the original and distorted key sets in FIG. 5b) while other portions of the embedder key set may move to the areas outside the original embedding key space but within the extractor key space. Yet, other portions of the embedder key set may completely move outside the extractor key space. This illustrates the fact that it is possible and advantageous to select the embedder key set in such a way that it includes many 'transformed' stego keys (i.e., the stego keys that can be converted from one to the other through regular signal processing or through an attack). In addition, this figure illustrates that having a larger extractor key space produces an increased chance of successful watermark detection in presence of distortions. Finally, this figure illustrates the fact that it is not necessary to make the extractor key space large enough to cover all possible transformed embedder keys. It is quite acceptable to have some watermarks lost due to signal processing and/or attacks. The selection of the extractor key space is governed by the tradeoff between probability of stego key being transformed into a certain region, and the burden on extractors (in terms of processing power and probability of false detections) incurred for searches in those regions in accordance to the security requirements of the system.

Stego Key Design

One of the goals of the present watermarking system is to embed each multimedia content with a different stego key set, not to communicate the specific embedding key set to the extraction device, and yet be able to extract the embedded watermarks in the presence of potential channel impairments with acceptable reliability. Two factors facilitate the design of such system. First, there are typically many opportunities for insertion of watermarks in most multimedia content (e.g., a typical movie is 2 hours long whereas a typical audio watermark is only a few seconds in duration). Second, in many applications of watermarking systems it is not necessary to extract all embedded watermarks and in many cases, such as content management applications, the extraction of only a few embedded watermarks produces the desired outcome. On the other hand, in order to for an attacker to defeat the system, all or most embedded watermarks need to be removed from the content. Furthermore, in order to develop a successful attack that can be distributed to unsophisticated users, the attack must be successful for substantially all types of content that utilize the watermarking system, including the presently available content and future releases. The combination of these factors are advantageously used in the present system to eliminate the need for exchange of watermarking extraction keys and achieve a security level that approaches cryptographic systems.

One way of achieving this goal is to embed a content with at least one embedding key set, selected at random or based on a pre-determined algorithm, from the set of all possible embedding keys and at the receiver device, perform an exhaustive search of the entire extractor key space. With the proper design of extractor key space the probability of success can be made arbitrarily high. This task may be feasible if the length of the extractor stego key is small or only a small subset of all possible stego keys are utilized in the extractor. For longer stego keys however, such as the exemplary stego key illustrated in FIG. 3, this task is too computationally expensive for practical implementations. In addition, an exhaustive search may increase the rate of false watermark detections beyond an acceptable limit.

An alternative way of achieving this goal is to use every possible embedding stego key set for embedding the content and, on the extractor side, perform at least one extraction attempt, randomly selected from embedder key space. This approach would indeed simplify task of watermark extractors, but at the expense of compromising content quality and embedding complexity. Therefore, it is apparent that the optimum design may be somewhere in between—with multiple watermarks being embedded and multiple searches being executed at the extractor, but neither all embedding opportunities nor all extraction opportunities are exhausted. From the security point of view it is desirable to have as many embedded watermarks as possible and execute as many extraction attempts as possible. However, the number of embeddings and extractions attempts are limited by transparency and processing requirements of the system. Therefore, it is desirable to know the relationship between selected number of embedding and extracting key sets, and the probability of successful detection, which will be the subject of analysis below. Further, from security point of view it is very important how those keys are selected, not only how many.

Figure 6A:
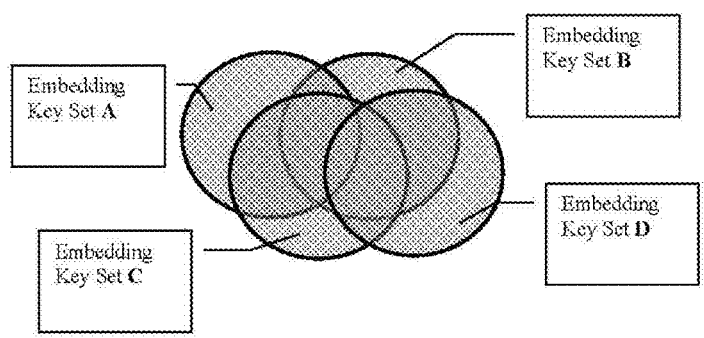
FIG. 6a is an example pictorial representation of multiple embedding stego key sets.

The concept of stego key selection is presented pictorially in FIG. 6. In FIG. 6a, four different embedding stego key sets belonging to four different embedding devices are represented as sets A, B, C and D. FIG. 6a indicates a non-zero intersecting area between all four keys. This is not a requirement of the system and is only presented in FIG. 6 to facilitate the understanding of the disclosed concepts; it is entirely possible to have embedding key sets that are non-overlapping and/or with no common intersection area. The presence of non-overlapping or part-overlapping embedding key sets indeed improves the security of the systems since if one key set is compromised other key sets may still be used.

FIG. 6a can also be used to illustrate key sets used by the same embedding device but for four different contents. The particular stego key set(s) assigned to each embedder, or the particular subset of such keys selected for each embedding session, may be done randomly or selected in a non-random fashion. For example, the assignment/selection of embedding stego keys may be done in different stages to maximize the lifespan of the deployed system; early embedders and embedder runs may use a limited set of watermarking technologies, and limited watermarking strengths, while later versions may deploy more sophisticated technologies and/or stronger watermarks that are tailored to thwart circumvention attempts which may have already been deployed by attackers. Similarly, one set of stego keys may be used for embedding relatively low-value content (e.g., a TV commercial) while another set may be used to embed a higher value content (e.g., a feature film).

In yet another variation of the above technique, the entire embedding stego key space may be partitioned into different sections and each section may be assigned to a different geographical region, to a different group of customers, or a particular type of multimedia. This type of partitioning of the embedding key space would allow forensic tracking of the embedded content. For example, once a suspect content is received and examined for the presence of watermarks, the origins of the content may be traced back to the stego key (or the partition) that allowed successful extraction of the embedded watermarks. It should be noted that the above discussion does not preclude the existence of overlapping partitions (or sections) of the embedding stego key space. In such cases, the origins of an embedded content may be traced back by determining the particular stego key that produces the best detection results (e.g., produces the largest number of detections or the most reliable detections). This result would indicate the origins of the embedded content with maximum likelihood.

Figure 6B:
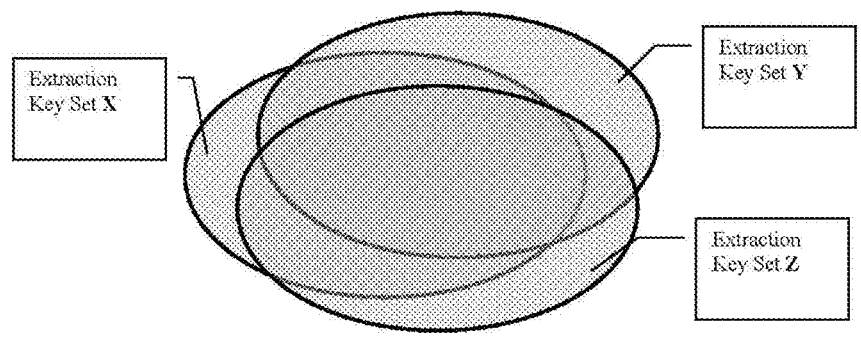
FIG. 6b is an example pictorial representation of multiple extracting stego key sets.

FIG. 6b, represents the extraction key sets for three different extractor devices, X, Y and Z. These keys can be assigned at random to the corresponding extraction devices, but also can be assigned in view of extraction device properties. For example, if the extractor resides in a camcorder that may be used for theater piracy, the extractor key set doesn't need to include transform keys obtained through speed up or slow down of the content. Similarly, if extractor resides in a software module that has expiration date, upon which new software must be downloaded, then it would be advantageous to make phased distribution of extractor keys similar to that proposed for embedders.

The most important feature illustrated in FIG. 6b is that different extractors have distinct sets of extractor keys, so that if a single (or a few) of the key sets are compromised, other key sets may still be used. In addition, FIG. 6b can be used to illustrate key sets used by a single extractor in different runs. An important property in this case is that the behavior of the extractor is not deterministic, i.e. the outcome of different runs may not be the same. It should also be noted that in FIG. 6, all embedding stego key sets (as well as all extraction key sets) appear to be the same size. This is not necessarily true and is only done to facilitate the understanding of the concepts. In fact, in accordance to the present invention, it may be preferable for different embedding and extraction key sets to be of different sizes. Similar to the embedding stego keys, there is not a strict requirement for all extraction key sets to have an overlapping area but such overlapping areas may be necessary to produce the desired performance reliability. In addition, it may be desirable for each extractor to contain several sets of non-overlapping (and perhaps unused) extraction key sets to make it possible to periodically switch to a new set of extraction keys or to permanently retire a particular set of extraction keys.

Figure 6C:
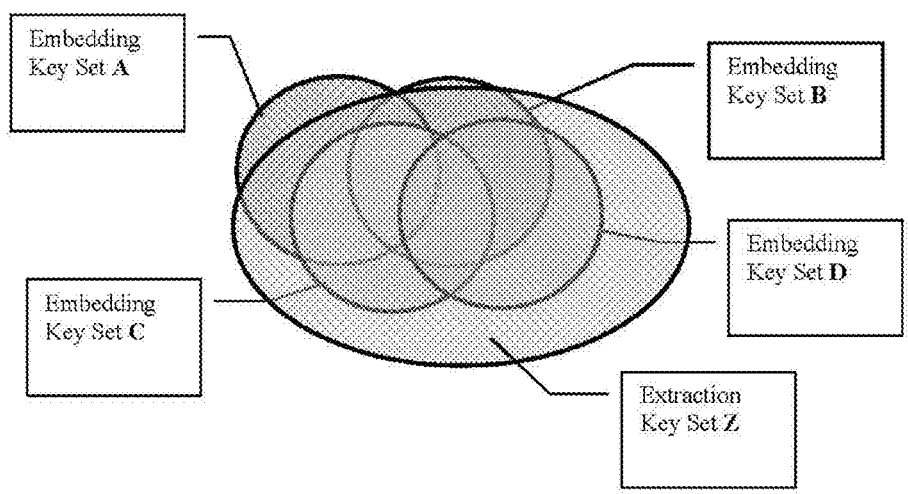
FIG. 6c is an example pictorial representation of multiple embedding and extraction stego key sets.

FIG. 6c shows the extraction key set, Z, that is capable of extracting watermarks that are embedded using any one of the embedding key sets A through D. Note that some portions of sets A and B reside outside the detection region of extractor Z and thus may not be able to extract all embedded watermarks in contents A or B. On the other hand, since watermarks are embedded redundantly throughout the content, such extraction failures may not be of any consequence. The stego key system architecture shown in FIG. 6 provides for each embedding to occur with a different stego key and each extraction device to contain a different set of extraction keys. As long as there is some overlap between an embedding key set and an extraction key set, watermark recovery is possible. Furthermore, a successful attack on one embedded content or one particular extractor does not result in successful removal of watermarks from other embedded contents using other extraction devices. Different embedding stego key sizes may be used to produce variable levels of transparency, security and robustness. For example, a content that is embedded redundantly with three different embedding algorithms may produce better security but lower transparency compared to a content that is embedded using one embedding algorithm. Similarly, an extractor set with a smaller key set may provide reduced robustness performance but better computational efficiency. The framework of the present architecture provides for a flexible system design structure where security, robustness, transparency and computational cost tradeoffs can take place. An example of how stego key length may affect different requirements is shown in the table of FIG. 7. This table is presented here to illustrate the complex interrelationships between system requirements and system parameters. For example, according to the table of FIG. 7, assuming a fixed payload capacity, increased length of embedding stego key may produce a more secure system at the expense of reduced transparency.

The length of embedding and extraction stego keys, the number of different extraction key sets as well as the degree of overlap between the different extraction key sets can be used to make the present watermarking system optimally secure, transparent, reliable and computationally inexpensive. These parameters can be adjusted according to the value and type of the content that is being protected and the type of extraction device that is being used. For example, a more secure implementation of extractors may be selected for hand-held camcorders (to guard against movie piracy in theatres) than for portable MP3 players.

Figure 8:
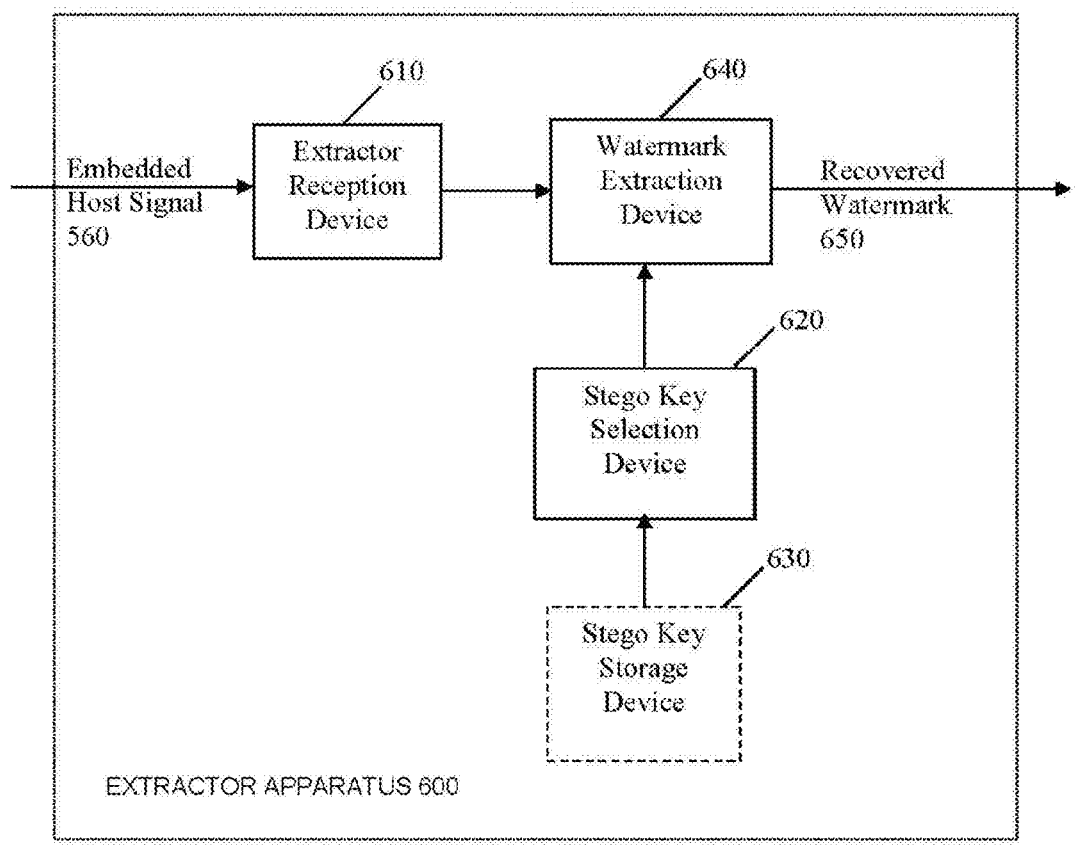
FIG. 8 is a block diagram showing an example embodiment of an Extractor Apparatus in accordance with the present invention.

FIG. 8 shows a block diagram of an Extractor Apparatus 600 in accordance with an exemplary embodiment of the present invention. The incoming embedded host signal 560 (e.g., produced by the Embedding Apparatus 500 of FIG. 4) is received at a receiver or other device incorporating a receiver (e.g., Extractor Reception Device 610 in the Extractor Apparatus 600). Similar to the conditioning operations discussed in relations to the Embedder Reception Device 510 of FIG. 4, the Extractor Reception Device 610 may appropriately condition the incoming embedded host signal 560. A Stego Key Selection Device 620 then selects at least one stego key from a collection of stego keys that are stored in Stego Key Storage Device 630. The selected stego keys are subsequently used by the Watermark Extraction Device 640 to recover the embedded watermarks from the embedded host signal 560 to provide the recovered watermarks 650.

The Stego Key Selection Device 620 may select the at least one stego key to produce at least one of optimum robustness, security, and computational efficiency for the extraction of watermarks embedded in the host content. Further, the Stego Key Selection Device 620 may select the at least one stego key to produce a desired tradeoff between levels of robustness, security, and computational efficiency for the extraction of watermarks embedded in the host content.

The Stego Key Selection Device 620 may select the at least one stego key in a random or pseudo-random fashion.

The collection of stego keys stored in the Stego Key Storage Device 630 may comprise one stego key, at least two stego keys, or pairs of stego keys. The collection of stego keys may further comprise at least a pair of stego keys with no common elements, or at least a pair of stego keys with at least one common element.

The presence and value of extracted watermarks 650 may be reported (e.g., to a particular user or device) at pre-determined time intervals.

The selecting of the one or more stego keys by the Selection Device 620 may be adapted in accordance with a desired false positive detection rate. The selecting of the one or more stego keys may be adapted to produce a desired probability of successful extractions. Further, the selecting of the one or more stego keys may be adapted to produce a desired computational complexity for the extraction of the watermarks. Additionally, the selecting of the one or more stego keys may be adapted to anticipate transformations of the host content. Such transformations of the host content may modify watermark characteristics of the embedded watermarks. For example, the transformations may alter the appearance of at least one watermark that is embedded with a first embedding stego key such that the at least one embedded watermark appears to have been embedded with a second embedding stego key.

The size of a selected stego key may vary from one host content to another. A size of the collection of stego keys may vary in accordance with a type or value of the host content. Further, the size of a selected stego key may vary in accordance with a type or value of the host content.

The collection of stego keys in the Storage Device 630 may comprise a subset of all possible extraction stego keys. The collection of stego keys may be adapted in accordance with an observed or anticipated attack. Further, the collection of stego keys may be adapted in accordance with an expiration date.

Extraction of a subset of all originally embedded watermarks may be enabled by the Watermark Extraction Device 640 in accordance with the at least one stego key. Alternatively, extraction of all possibly embedded watermarks may be enabled in accordance with the at least one stego key.

The Extractor Apparatus 600 may be implemented using the same or similar technology as the Embedding Apparatus 500 discussed above. Further, like the Embedding Apparatus 500, the Extractor Apparatus 600 may be implemented as either a single unit or as a distributed device consisting of several discrete components at the same or different physical locations.

It should also be appreciated that the Embedding Apparatus 500 described in connection with FIG. 4 may be used in connection with the Extractor Apparatus 600 described in connection with FIG. 8 to form a system for embedding and extracting digital watermarks.

Presence of Additional Watermark Layers

The disclosed embedding and extraction concepts are equally applicable to many watermarking applications that require additional watermark layers. The presence of these additional layers may be used, for example, to extend the payload capacity of the existing watermarks, provide tiered security (and access) architecture or provide forensic/or transactional capabilities. For example, a multimedia content may contain both a copy control watermark, with a 3-bit payload, and one or more forensic or transactional watermarks with 50-bit payloads. The payload of the second set of watermarks may be used to carry identification, ownership and/or origination information, including, but not limited to, the time and date of origination, purchase or distribution of the content, the name or credentials of the recipients (e.g., movie theatre, retail store, individual, etc.) or the time of date of presentation of the content. Such information may be later used to unravel the origins and distribution paths of the multimedia content.

Furthermore the second set of watermarks may be used to convey information regarding the identity and authenticity of the transmission channel of the host signal. The transmission channel, in general terms, may comprise any origination, storage, or transmission device, channel, or medium, such as physical storage media, devices that are used to transmit, broadcast or relay the multimedia content, and the like. Examples of the identity information of the transmission channel may include ID or serial numbers that reside on today's most optical and magnetic memory devices, IP addresses, URL's, email addresses, or any other information that uniquely identifies all or part of the transmission channel components. In order to prevent fraudulent creation of such identification information, cryptographic or non-cryptographic techniques may be used to ensure authenticity of the embedded information. Examples of these technique include, but are not limited to, the use of digital signatures, hash functions, digital certificates, encryption algorithms, and the like, which may or may not include the participation of a trusted third party. These and other authentication techniques are well known to those skilled in the art. The identification information carried within a second set of watermarks, may be extracted and authenticated at a reception device; if authenticity is successfully verified, access/copy control information that resides within the first set of watermarks may be extracted and acted upon. This could include allowing the user to playback, record or transmit the content. Using this technique, any content lacking proper credentials may not be accessible or may be subject to a different set of usage rules.

DESIGN GUIDELINES AND EXAMPLES

Example 1

Some of the concepts of the present invention may be illustrated using the following example. This example provides embedding of a monophonic sound track of a 2-hour motion picture. One simple method of embedding would be to first, divide the sound track into a finite number of time-frequency segments and then embed watermark bits into randomly selected time-frequency segments (the details of how the actual watermark bits are embedded are not very important for this example, as any one of several algorithms described in the systems of prior art may be utilized). This technique, which resembles a Frequency Hopped Spread Spectrum technique, is shown in FIG. 9. In this figure, the specific time-frequency bins containing watermark bits are highlighted.

In order to further illustrate some of the features of present invention using this example, the following parameters may be assumed:

Available bandwidth for embedding=16 KHz
Frequency bin size=200 Hz
Number of distinct frequency bins (hops)=16,000/200=80
Total length of audio track=120 minutes
Time slot size (i.e., one bit duration)=20 ms
Number of distinct time slots=120 (min)×60 (sec/min)/20 (ms)=360,000
Number of distinct time-frequency segments=360,000× 80=28,800,000
Number of bits in each Watermark packet=100 bits
Number of watermark packets that can be accommodated=288,000

Example 1

Embedding

Watermark packets may be embedded into one or more of the possible 288,000 available locations. In theory, it suffices to embed in only one location and subsequently detect the embedded watermark with an extractor device. But in practical systems, usually a large number of watermark packets are embedded into the content. This is done to improve the reliability of detections in the presence of, for example, channel impairments, intentional attacks or standard multimedia processing steps which may interfere with the detection of embedded watermarks. In addition, not all potential embedding locations may be suitable for the placement of watermarks. For instance, due to the nature of the multimedia content and the particular embedding algorithm, certain locations within the content may not be able to meet the transparency/robustness/security requirements of the system. In such cases, the embedding of watermarks at certain locations may have to be skipped altogether or be done at reduced strength levels.

According to the present invention, each copy of a particular multimedia content may contain a different number of watermark packets that are embedded in different locations. In the context of present example, there are 288,000 possible locations within the audio track that can accommodate the embedding of watermarks. FIG. 10 provides an example of embedded watermark locations for 6 audio tracks. Specifically, content #1 contains 44 watermarks that are embedded in locations 11271, 13809, . . . , 268986, content #2 contains 45 watermarks embedded in locations 11271, 14063, . . . , 278485, etc. Examination of FIG. 10 reveals that only 159 unique watermark locations have been used to embed contents 1 through 6, with exactly 20 common locations between all embeddings. The underlined numbers in FIG. 10 correspond to watermark locations that are common between all 6 audio tracks. As stated above, there is no requirement for having common embedding locations between all embedded content; their presence in the present example merely facilitates the understanding of the underlying concepts.

The different contents listed in FIG. 10 may represent 6 different embeddings of the same audio content (e.g., prepared for distribution of a movie to customers) or 6 distinct audio tracks (e.g., 6 different movies). The locations of embedded watermarks shown in FIG. 10 were selected pseudo-randomly using a random number generator, although it may be desirable to select some or all embedding locations deterministically to a be able to meet robustness/security/transparency requirements of watermarking system for each particular content.

Example 2

Detection

One detection technique may to be to examine all 159 locations (or even all 288,000 possible locations) in search of the embedded watermarks. Another detection technique may be to examine only the 20 common locations in search of the embedded watermarks. A preferred technique, however, is to search an arbitrary number of watermark locations which includes all or some of the "common" locations. This approach is illustrated in FIG. 11. The underlined search locations in FIG. 11 comprise a subset of "common" embedding locations previously discussed (recall that 20 common watermark locations existed between the 6 embedded content; the extractors of FIG. 11 contain at most 9 of these locations). Thus, in the absence of major channel impairments that interfere with the detection of watermarks, the extractor devices of FIG. 11 are guaranteed to detect embedded watermarks from all 6 content.

In addition to the common detection locations, there are several other locations within each extractor set, shown with bold-italic font in FIG. 11, that produce detections from at least one embedded content. There are also several other locations within each extractor (excluding extractor #4) that produce no detections from any of the embedded content. These locations, however, may produce detections from one or more of the embedded content in the presence of channel distortions or intentional processing. It has to be noted that these particular extractors only provide an example embodiment of the present invention and other variations are certainly possible. In particular, all 5 extractors of FIG. 11 are shown to have a number of common elements (i.e., the underlined numbers). This, in general, is not a requirement of the present invention as it suffices for each detector to have at least one location in common with each embedded content.

The extractors, numbered 1 through 5, may represent five different detection devices or five different sets of detection stego keys contained within a single extractor device. In the latter case, the extractor device may be configured to do one or more of the following:

1. Always search the same detection locations (e.g., the locations labeled "extractor 1"). This technique simplifies the design of extractors but it may not provide adequate security since breaking of a single stego key would render that extractor useless.
2. Search one set of detection locations (e.g., the locations labeled "extractor 1") but switch to a different set of locations after a pre-defined period of time (e.g., 1 year later). The switching of stego keys may occur periodically, randomly and/or repeatedly among all stego key sets available to the extractor.
3. Search one set of detection locations (e.g., the locations labeled "extractor 1") but switch to a different set upon system request (e.g., in case "extractor 1" locations are compromised and are no longer secure). Alternatively, such instructions to switch to a new set of stego keys may be conveyed through the data carried within the embedded watermarks or a different layer of embedded watermarks.
4. Switch between different set of search locations (e.g., randomly select a set of locations at system startup or each time a new content is presented). Such switching may occur in accordance to a uniform or non-uniform probability distribution. The switching may further occur to produce detections in accordance to a new detection algorithm, a new frequency band, a new time slot, an new location with particular masking capabilities or a new location with particular value (e.g., climactic scenes, etc.).
5. Always search using more than one set of search locations.

The above list is not intended to be comprehensive. There are certainly other variations, within the scope of the present invention, that can be readily implemented by a person skilled in the art.

One of the advantages of using the embedding and detection techniques illustrated by this example is that if a single content is attacked and modified in a way that all embedded watermarks are obliterated, the same modifications are not likely to remove all embedded watermarks from a second content. Similarly, circumvention of a single extractor device is not likely to significantly affect the proper operation of all other extractors. This is further illustrated in FIG. 12 where it is assumed that all watermark locations contained within extractor #3 have been compromised (e.g., an attacker has been able to determine how to circumvent the detection of watermarks from all locations listed under extractor #3). The effect of this attack on the remaining extractors is shown in FIG. 12 by using grayed-out numbers to highlight the compromised locations. Particularly, it can be seen that only 4, 7, 5 and 3 locations in extractors 1, 2, 4, and 5, respectively, are compromised. These extractors are still perfectly capable of detecting embedded watermarks from the majority of their constituent search locations.

There are additional features of the present invention that can be illustrated using this example. Particularly, the extractors of FIG. 11 provide different levels of detectability for different embedded content. Specifically, careful examination of search locations in extractor #1 reveals that this device is configured to detect 21 embedded watermarks from content #1 but only 9 embedded watermarks from content #2. This approach produces different levels of detectability (i.e., robustness) for different content-extractor combinations and adds further uncertainty to the exact configuration of embedding/extraction devices. The amount of detection variability can be randomly distributed among all content-extractor combinations or can be tailored to produce desired levels of robustness/security for a particular content-extractor combination. In general, by adjusting the relative number of embedded locations to the number of search locations, desired levels of system robustness, transparency and security may be achieved. Design guidelines for making such adjustments will be presented below.

Additional sets of search locations may also be incorporated in the extractors to account for future attacks on the system. The idea is that if, and when, a set of watermark extraction locations are compromised, those locations may be permanently retired and replaced by a new set of "alternative" embedding locations. The alternative locations may be completely different from the original locations or may contain a few retired locations to retain backward compatibility with the existing multimedia content. Extraction devices that are equipped with external communication capabilities may be easily updated with the new set of search locations. However, the majority of extractors are likely to be operating with no connectivity. Such devices may initially contain both the original and the alternative set of search locations and continually search for all embedded locations (even though no embeddings are yet present in the alternative locations). Another option would be for the extractor to automatically switch to the alternative set of locations after a pre-defined period of time (e.g., switch to a new set of locations every 6 months).

The above example only illustrates a portion of the capabilities and features of the present invention. For instance, in the above example only a single watermarking algorithm was considered. In accordance with the broader scope of the present invention, different embedding algorithms may be used to simultaneously embed different watermark packets into the host content. These packets may overlap with each other in time, frequency or space. In addition, while this example only considers a monophonic audio signal, the general embedding technique may be extended to include multichannel audio signals, video signals and still images.

Design Guidelines:

The following parameters and conventions may be used for the development of generalized design concepts that follow. The assumption is made that the $k^{th}$ embedder has inserted $E_k$ watermarks in a particular content using an embedding key set. It is also assumed that there are $X_0$ stego keys in the extractor key space, and the $j^{th}$ extractor selects $X_j$ keys among them randomly in a particular run, with uniform probability distribution. It is further assumed that when the embedder and extractor keys match, there is a probability, $0 \le p \le 1$ of a successful extraction. The probability of n successful extractions can be calculated according to Binomial distribution:

$$P(n) = \binom{X_j}{n}(pE_k/X_0)^n(1 - pE_k/X_0)^{X_j-n} \quad \text{Equation (6)}$$

Equation 6 governs the tradeoff between the number of embedded watermarks, $E_k$ (which is related to the transparency of the watermarks), the number of extraction attempts, $X_j$ (which is related to the processing load of the extraction), and the number of stego keys, $X_0$ (which is related to the security of the system and robustness of detection). For example, for a design objective that dictates a probability of no extractions equal to $10^{-6}$, the necessary number of extraction attempts may be calculated, by setting n=0 in Equation 6, as:

$$X_j = \frac{-6\ln(10)}{\ln(1 - pE_k/X_0)} \approx \frac{13.8 X_0}{pE_k} \quad \text{Equation (7)}$$

It can also be readily shown that the expected number of extractions is:

$$E(n) = pX_j E_k / X_0 \quad \text{Equation (8)}$$

By substituting $X_j$ obtained from Equation 7 into Equation 8, it can be seen that for the above example approximately 13.8 extractions per content are expected.

If it is further assumed that the attacker knows all possible stego keys (e.g. through a disgruntled employee disclosure), this would enable the attacker to design a 'black box' that would overwrite all watermarks with a garbled message. In this case, the attacker would insert $X_0/E_k = (pX_j/13.8)$ times more watermarks than the original embedding. In a properly designed watermarking system, this should produce unacceptable levels of perceptual artifacts. In order to illustrate this effect, Equations 6 through 8 may be applied to the example of a copy control system for movies based on audio watermarks. If a movie lasts 90 minutes, and the $k^{th}$ embedder inserts, on average, one watermark per second of multimedia content, then $E_k = 5,400$. Based on the current assessment of extraction devices and audio watermarking technologies, it is anticipated that a 5-MIPS extractor can search about 20 watermarks per second, i.e. $X_j = (20 \times 90 \times 60) = 108,000$. In the presence of a sophisticated distortion attack, a probability of success of about p=0.25 may be achieved. Using Equation 8, the calculated value of the extractor key set size may be obtained as $X_0 = pX_j E_k/13.6 \approx 10^7$ stego keys. If an attacker were to overwrite all embedded watermarks, he/she would generate a content distortion equivalent to $X_0/E_k = 1,800$ times the distortion of a single embedder run. This is equivalent to having a jamming-to-signal ratio that is 32 dB worse than watermark-to-signal ratio, which is expected to produce unacceptable signal quality.

In many applications, such as copy management of multimedia content, the success criterion may be specified as extracting at least one watermark in the entirety of a multimedia content. In order to calculate the probability of this occurrence, it is easier to calculate the following: P{success}=1−Probablity{no successful extractions}. Increasing the probability of success (i.e., decreasing the probability of no extractions) results in only modest increase in the value of $X_j$. This relationship will be explored in detail below.

As a side note, that assuming an independent watermark extraction process for now, it can be shown that the Binomial probability distribution can be approximated by a Poisson distribution if the following two conditions are satisfied:
1) $X_j \gg 1$ and 2) $(pE_k/X_0) \ll 1$ such that $E(n) = \mu = pX_j E_k/X_0$ is finite In the case of the present watermarking system, both conditions are satisfied. Therefore the probability distribution of the extracted watermarks may be approximated by:

$$P(n) = (1/n!)(e^{-(pX_j E_k/X_0)})(pX_j E_k/X_0)^n \quad \text{Equation (9)}$$

Calculations involving the Poisson distribution are simpler than the ones for Binomial distribution. It can be shown that the mean and variance of Binomial distribution are equal to each other, and using the parameters described thus far, they are given by the expression $(pX_j E_k/X_0)$.

It is now instructive to look at some limits involving the parameters of the probability functions described above in order to devise further system design guidelines.

The probability p represents the likelihood of extracting a watermark independent of stego-key distribution. The value of this probability, among other factors, depends on the audio content, the strength of watermark embedding, the embedding technology and the amount of channel impairments.

This probability should be close to 1 for an embedded content with no or little impairments. It is not expected to encounter a value much smaller than p=0.1 for an embedded audio content with reasonable quality.

The ratio $r_j=(X_j/X_0)$ is related to the security of the extractors. That is, a smaller $r_j$ produces a more secure system. This ratio is always smaller than or equal to 1, as $X_j$ is a subset of the larger set $X_0$. However, it is desired for $X_j$ to be as large as possible to ensure sufficient overlap with any embedder stego key space. As described above, the limiting factor for the size of $X_j$ is processing load of the extractors; a value of $X_j \sim 10^5$ may be reasonable for a typical motion picture content and today's average processing capabilities. The value of $X_0$ must be large enough to provide sufficient security. For example, $X_0=10^8$ produces $r_j=10^{-3}$. This allows 1,000 distinct extractor key sets to be distributed. Note that even in the limiting case where $X_j \sim X_0$, the extraction system can be made arbitrarily secure for large values of $X_j$.

$E_k$ represents the number of different watermarks embedded in the $k^{th}$ content. $E_k$ is a subset of $E_0$, the total number of possible embedding key sets. In the limiting case, where $E_k \sim E_0$, each content is embedded with all (or close to all) possible watermark combinations, and thus regardless of the ratio $r_j$, a watermark should be extracted with high degree of likelihood. As described above, $X_0 \geq E_0$ in order to accommodate possible channel distortions and key set transformations.

Returning to the analysis of Equation 7, it may be assumed that an arbitrary probability of success is desired (i.e., a desired robustness level). This can be expressed as:

$$1-P\{\text{no extraction}\}=1-10^{-s} \quad \text{Equation (10)}$$

Where s is selected, for convenience, to represent the exponent of target probability of no extractions. Using Equations 7 and 10, the following expression may be obtained:

$$s = \frac{X_j}{X_0} \frac{pE_k}{\ln(10)} \quad \text{Equation (11)}$$

Figure 13:
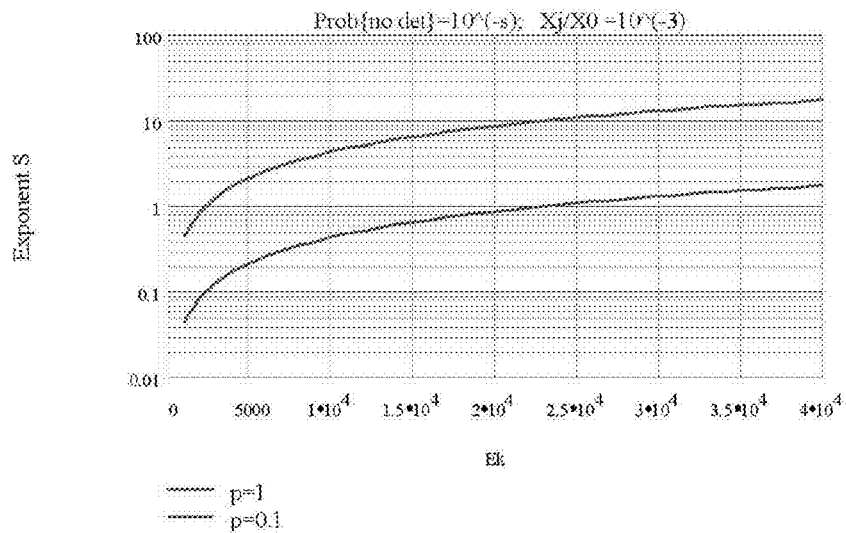
FIG. 13 is a first example graph describing the relationship between various system characteristics.
Figure 14:
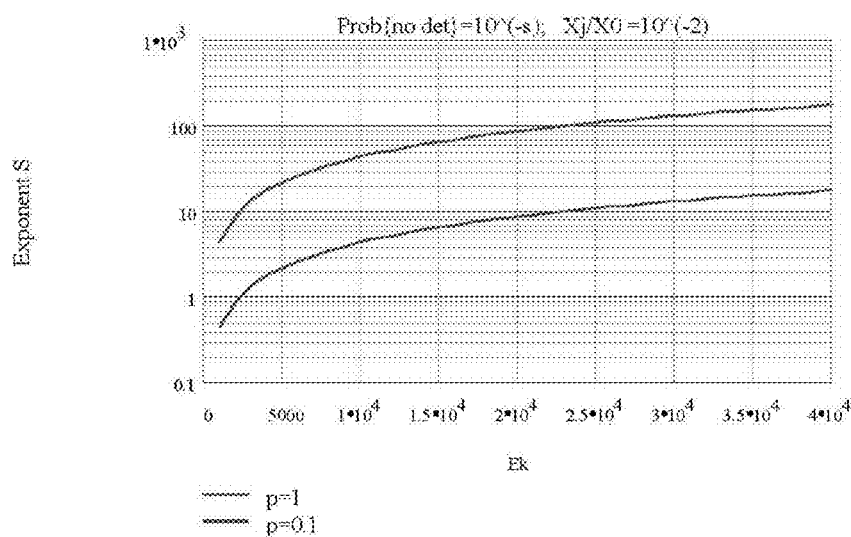
FIG. 14 is a second example graph describing the relationship between various system characteristics.

This equation can be used to study the tradeoffs between the number of embedded watermarks $E_k$ (which directly influences the transparency requirement of the system), the ratio involved in the extractor design, $r_j=(X_j/X_0)$, and the probability of success (i.e., $1-\text{Prob}\{\text{no extraction}\}$). FIGS. 13 and 14 show this relationship graphically. In FIG. 13, the exponent, s, is plotted against $E_k$, ranging from 1,000 to 40,000, for two limiting values of p=0.1 and 1, and $r_j=10^{-3}$. For a $10^{-6}$ (or better) target probability of no extractions (i.e., for s=6), this system requires $E_k$ of about 140,000 (not shown on the plot) to ensure desired performance down to p=0.1. In FIG. 14, with $r_j$ ratio of $10^{-2}$, this target probability is reached when only about $E_k=14,000$ distinct watermarks are embedded. The above example illustrates how the embedder key size can be traded off with desired security and extractor complexity.

Attack Specific Security Enhancements
Protection Against Blind Attacks

Performance of the present invention against some attacks described above warrants some attention. In the case of a blind attack, it is a well-accepted fact that it is always possible to add enough distortion to a watermarked content to render the embedded watermarks unextractable. The objective of a good attack is to put the right kind of distortion at the right place in order to disable watermarks with minimum damage to the host signal. The watermarking system of the present invention makes this task harder because of several security features that are incorporated into the system. Some of these features comprise:

a. Multiple watermarking algorithms may be deployed with different robustness profiles. In order to disable all of them, an attacker must use a combination of attacks, which increases the damage to the host content.
b. Not all potential insertion opportunities are used for embedding the watermarks within the content. If an attacker cannot find the exact location of the watermarks, he must attack all hiding places and thus introduce unnecessary and ineffective distortions.
c. Experiments with an extractor with objective to find minimum necessary distortion that removes watermarks is made difficult because:
   i. Extractors randomly select stego keys in each run, and several detection outcomes of the same content do not necessarily produce the same results.
   ii. Different extractors have distinct stego key sets, so the outcome of experiments with one extractor is not necessarily the same as the outcome with another.
d. Even if an attacker finds a successful attack on a particular content, through a sophisticated and lengthy procedure, e.g., many runs, many extractors, it is not useful for other content, where a different set of hiding places are used.
e. Even if an attacker finds a successful attack on many contents, through a sophisticated and lengthy procedure, and distributes an attack algorithm against them, content owners may adjust embedding parameters (technology selection, watermark strength, etc.) for the next content release in order to thwart existing piracy systems.

The security and robustness of the watermarking system can be further enhanced through additional features of the present invention. These features will be described herein. As described above, any added advantage in one aspect of the watermarking system may be sometimes traded off for other desirable characteristics of the system. For example, an added advantage in watermark robustness may be traded off for reduced computational complexity of the extractors. The concepts that are disclosed herein are described in the context of improving security and robustness characteristics of the system but these advantages may be readily traded off to meet other specific system requirements as mandated by the application, customer requests or the success of circumvention attempts.

Reporting Delay and/or Avoidance

The main object of this security feature is to introduce certain amount of uncertainty in the reporting of watermark detections. To this end, the extractors may randomly discard some detections, or delay the reporting of a detection if the content is a function of time. For example, any particular detection may be discarded (i.e., not reported to the user) with a probability p=0.5. This would effectively reduce the number of watermark detections by 50%, which is acceptable if the number of watermark detections per content is large. This way, an attacker can not be certain about the success of his watermark removal attempt if a single run of the extractor produces no detections. In fact, for the above example and with a target probability of missed watermarks of $10^{-3}$, the attacker needs, on average, to run the extractor at least ten times to correctly assess the result of his attack.

Alternatively, or in addition to the above probabilistic reporting technique, watermark detections may be reported on a time-shifted basis. One approach is to make reports at predefined time intervals. For example, instead of reporting the detection of every watermark separately, detections may be reported simultaneously at 5-minute intervals. Alternatively, the detected watermarks may be reported with a delay that is randomly assigned. For example, the delay for reporting the detected watermarks can be between zero and five minutes with uniform distribution. In certain applications, where the multimedia content is screened for the presence of watermarks prior to being played and/or recorded (e.g., in TIVO applications or any other non-real-time application with considerable buffering), the watermark reporting may be advanced (as well as delayed) so that any reported watermark could correspond to a past, present or future segment of the multimedia content.

Enhanced Watermark Detection by Weight Accumulation Algorithm

A Weight Accumulation Algorithm is developed to combine detection of multiple damaged watermarks in order to make a successful watermark extraction. The algorithm may be best understood by assuming a watermark that is N bits long and comprises a predefined bit pattern. It is further assumed that k strings of bits per second are assembled and compared to a template; if the number of errors (i.e., mismatches between the assembled string and the template) is less than or equal to e, then a watermark is detected. In this case, the probability of false detections per second is:

$$P_f(N, e) = 1 - \left(1 - 2^{-N}\sum_{j=0}^{e}\binom{N}{j}\right)^k \approx 2^{-N}k\sum_{j=0}^{e}\binom{N}{j} \quad \text{Equation (12)}$$

Equation (12) describes the relationship between probability of false detections, watermark packet lengths, number of attempts in extractor (i.e., computational efficiency of extraction) and error tolerance in template matching. If a zero error tolerance is specified (i.e., zero mismatches found), then the minimum packet length may be calculated as:

$$N_{min} = 1 - \text{floor}\left(\frac{\log(P_f(N, 0)/k)}{\log(2)}\right) \quad \text{Equation (13)}$$

Figure 15:
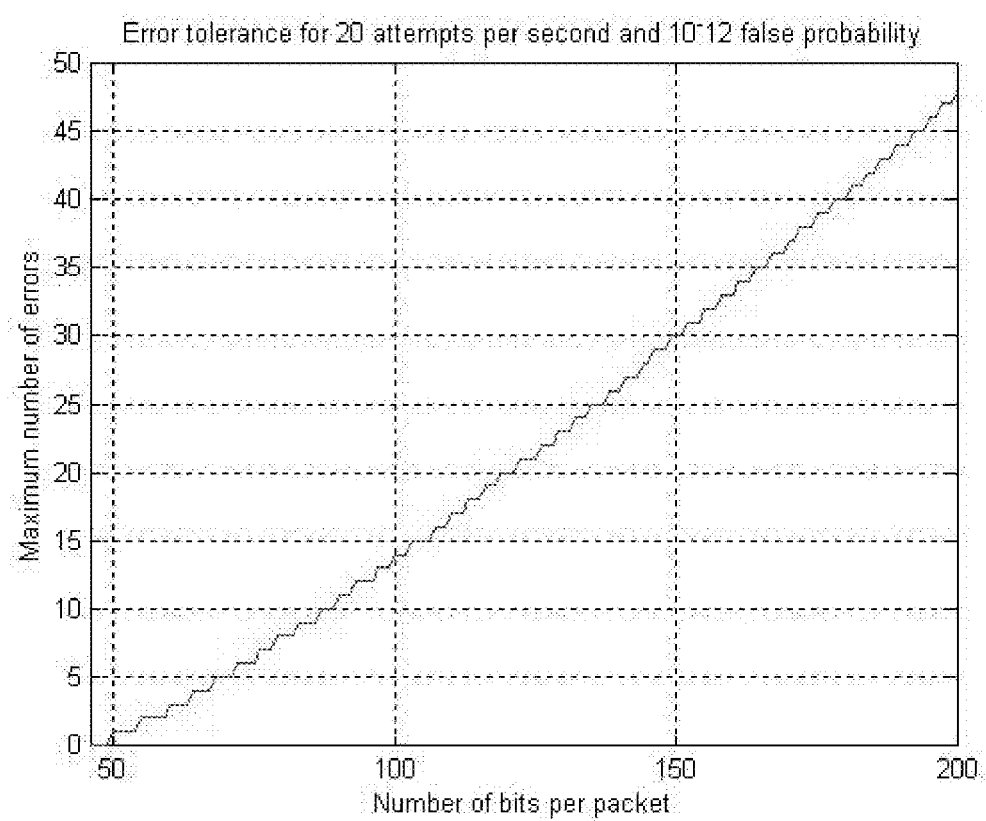
FIG. 15 is a third example graph describing the relationship between various system characteristics.

Obviously, in order to be able to detect watermark packets in the presence of noise and other impairments that may have damaged the embedded watermarks, it is advantageous to increase the number of errors that can be tolerated in each watermark packet while maintaining a desired false positive rate with optimum computational efficiency. Equation 13 may be used to study the tradeoffs between these characteristics and the watermark packet length. For example, for a target probability of false detections per second equal to $10^{-12}$ and for an extractor that performs 20 extraction attempts per second (with zero error tolerance), the minimum number of bits per watermark packet may be calculated to be 46. As the packet length increases, so does the error tolerance, i.e. the number of errors per packet that is acceptable in extractor, as shown in FIG. 15. Alternatively, the ratio between the number of errors per packet and the packet length may be calculated to obtain the error tolerance in terms of percentage of bits that can be in error, as shown in FIG. 16.

Figure 16:
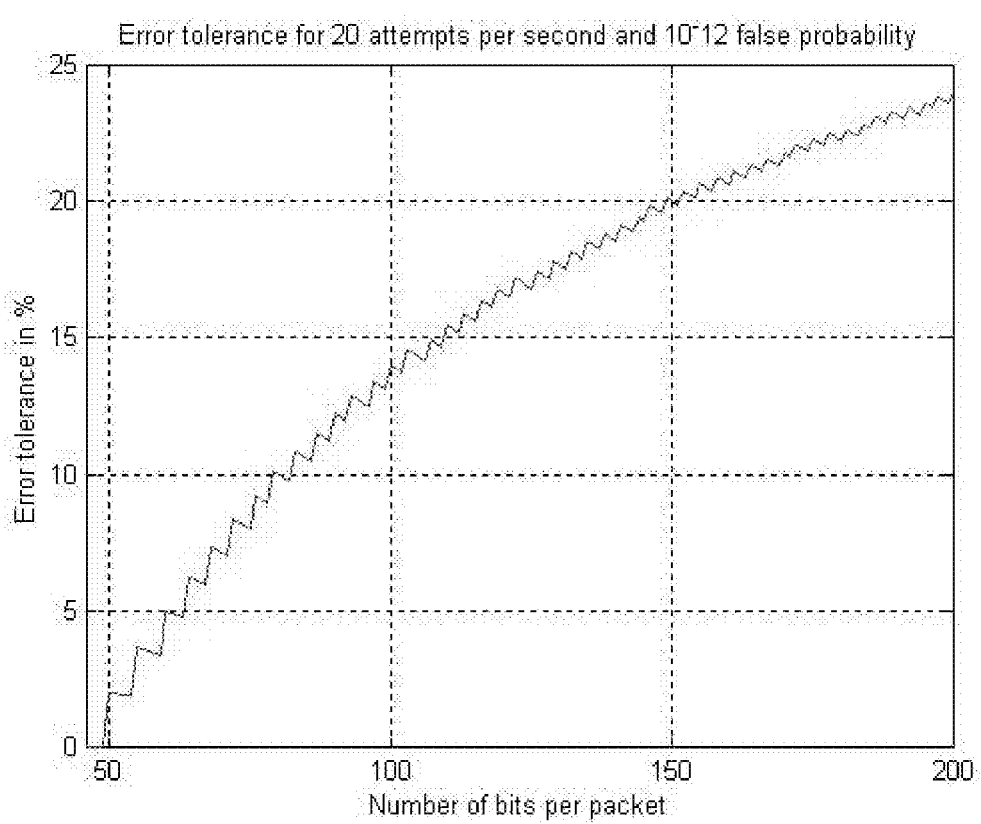
FIG. 16 is a fourth example graph describing the relationship between various system characteristics.

As can be seen from FIG. 15 and FIG. 16, error tolerance may be improved by increasing the packet length. However, increasing the packet length makes the watermark larger, which will reduce the number of watermarks that can fit within a content. In addition, embedding longer packets may introduce additional artifacts within the content, may increase the processing requirements in the extractor, and may increase watermark vulnerability to synchronization attacks. An alternative option to using longer watermark packets is to cumulatively analyze multiple detected watermarks to achieve better error resiliency. One such technique used in the present invention is the Weight Accumulation Algorithm (WAA), disclosed below.

Figure 17:
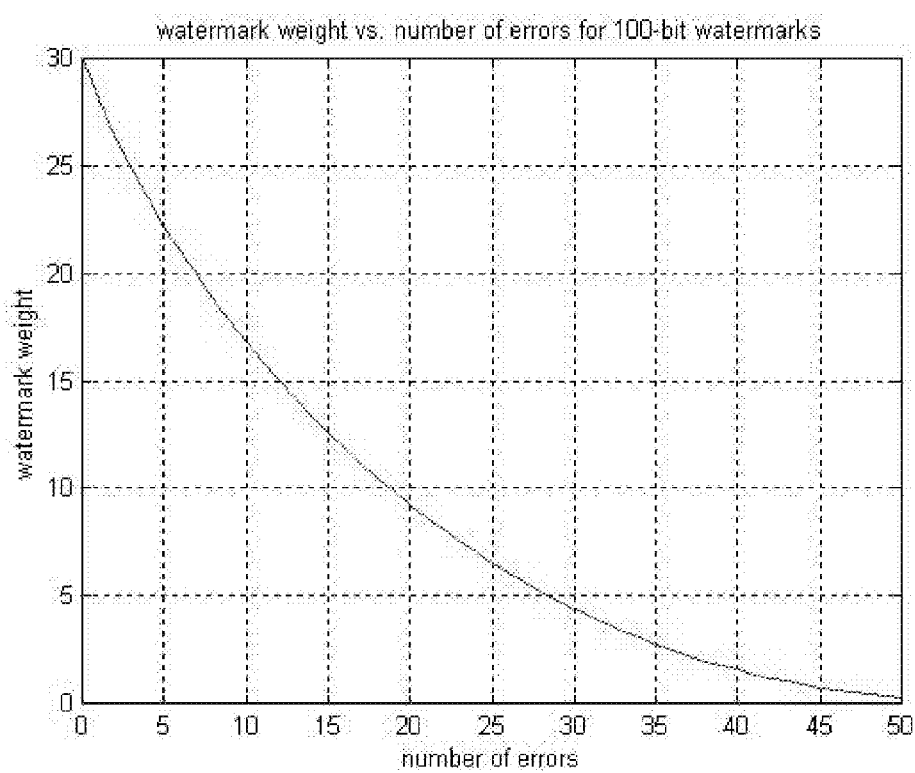
FIG. 17 is a fifth example graph describing the relationship between various system characteristics.

The details of WAA may be better illustrated by considering the detection of a watermark packet consisting of N bits that is contaminated with $e_1$ bit errors. The number of errors in a watermark packet may be determined by comparing bits of the detected packet to a pre-defined template of bits, which represents the error free watermark packet. Alternatively, if Error Correction Codes (ECC), such as Reed-Solomon codes, are used to form the watermark packets, ECC decoding of the watermark packets would produce an error count for the decoded ECC packets. Upon detection of such packet, the number of errors, $e_1$, may be too large to declare a successful watermark extraction with high levels of confidence, but the detected watermark packet may still carry significant information about the presence of the watermark. The significance, or weight, of this information can be expressed as:

$$W(N, e_1) = -\log_{10}\left(2^{-N}\sum_{j=0}^{e_1}\binom{N}{j}\right) \quad \text{Equation (14)}$$

which corresponds to the logarithm of the probability of false detection of a watermark consisting of N bits with up to $e_1$ errors in a single attempt. Obviously, the weight of a detection increases as the number of errors decreases. FIG. 17 illustrates the relationship between the weight of each detection and the number of errors for a 100-bit long watermark packet, in accordance to Equation 14. The plot in FIG. 17 indicates that detected packets with lower error counts have a much larger weight than packets with high error counts.

Next, the conditional probability of detecting another watermark packet consisting of N bits, with up to $e_2$ errors, within a time interval of T seconds after the first watermark detection may be calculated. During T seconds, there will be kT extraction attempts, and the probability that at least one is successful is expressed as:

$$P\{(N, e_2) | (N, e_1)\} = 1 - \left(1 - 2^{-N}\sum_{j=0}^{e_2}\binom{N}{j}\right)^{kT} \quad \text{Equation (15)}$$

$$\approx kT2^{-N}\sum_{j=0}^{e_1}\binom{N}{j}$$

The joint probability of detecting two watermarks with $e_1$ and $e_2$ errors, respectively, within the time interval T, is obtained as the product of probability of the first event and the conditional probability expressed by Equation 15. By applying the logarithm to the product, the total weight of the joint events can be expressed as:

$$W(N,e_1,e_2)=W(N,e_1)+W(N,e_2)-\log(kT) \quad \text{Equation (16)}$$

Extending this result to include a string of detections that occur at instances $t_1, t_2, \ldots, t_m$, with respective error counts $e_1, e_2, \ldots, e_m$, the total weight of this string of events is:

$$W(N, e_1, e_2, \ldots, e_m) = \sum_{j=1}^{m} W(N, e_j) - \sum_{j=2}^{m} \log(k(t_j - t_{j-1})) \quad \text{Equation (17)}$$

If total accumulated weight of the string of watermarks reaches or exceeds a threshold value, it may be concluded that the watermark is present with sufficient confidence, i.e. with sufficiently low probability of false detection.

It should be noted that it may not be desirable to accumulate watermarks that have very low weights since it burdens the processor without contributing significantly to the weight accumulation. Further, it may not be desirable to accumulate watermarks separated by a large time interval since the approximation used in equation (15) is valid only if:

$$kT2^{-N} \sum_{j=0}^{e_1} \binom{N}{j} \ll 1 \quad \text{Equation (18)}$$

For example, assuming k=20 and N=100, with a maximum acceptable number of errors per packet of 26 and maximum time interval between detections of 5 minutes, the left hand side of Equation 18 becomes 0.005, which satisfies the criterion specified by Equation 18.

In the above described WAA example, even watermarks with bit error rates as high as 26% are taken into consideration. Thus, accumulation of weights due to several successive or properly spaced detections would produce reliable detections with high degree of confidence even if individual watermark packets are highly damaged. Further refinements of the WAA algorithm may include utilizing the heart-beat or periodicity of the redundantly embedded watermarks to improve the reliability of detections. Since the same watermark packets may be embedded back-to-back (or with a predefined spacing) throughout the content, only watermark detections with correct separation may be included in the accumulation process. For example, it may be anticipated that the separation between valid watermarks should be a multiple of the duration of the watermarks (plus or minus some small fraction to allow for small deviations due to impairments). This way, the rate of false detections, due to randomly occurring or mis-aligned watermarks may be reduced.

The weight accumulation algorithm described above is particularly effective against blind pattern matching attacks, discussed above. The cutting and swapping algorithm may indeed damage watermarks so that none of them is individually recognizable. However, it will be much more difficult to sufficiently damage all watermarks so that even weight accumulation algorithm is not able to detect them. For example, assuming that the content segments that are swapped have a 50% chance of producing a bit error and further assuming that the system is designed to tolerate bit error rates of up to 26%, the swapping must be done over 52% of the content to bring the chances of individual watermark detections down to 50%. It is expected that swapping such a large percentage of the content would lead to serious degradations in content quality and significantly reduce the value of such content. It is also worth noting that while the above description of the WAA algorithm has been presented by describing multiple watermark packets that are separated in time domain, it is entirely possible to implement this technique for watermark packets that are separated in space, spatial frequency domain, temporal frequency domain or a combination of the above.

Additional countermeasures can also be developed to reduce the effectiveness of the blind pattern matching attack. For example, watermarks with variable bit rates may be embedded within the content. This way, swapping of segments may only disrupt the continuity of watermarks within a limited range of bit rates. For example, for a low bit rate segment of the content, the swapped segments may be much shorter than each bit interval and thus may not play a significant role in determining the value of the embedded bit. On the other hand, for a high bit rate segment of the content, the swapped segments may contain intact watermark packets that are perfectly detectable. Using a system with mixed bit rate values forces the attacker to locate similar content segments of different durations and assess the success of his/her attack in a trial and error approach. This task, if possible, would be extremely time consuming and may never produce a content with acceptable quality.

Embedding with variable bit rates may be accomplished using inter-packet, intra-packet, or a combination of the two, bit rate variations. To illustrate these techniques, it is helpful to consider a watermark that is comprised of N bits. Each watermark packet is typically independently (and redundantly) embedded throughout the host content. In fixed bit rate watermarking protocols, all N bits of every watermark packet occupy the same length of time or spatial dimension within the host content. With the proposed intra-packet bit rate variation scheme, individual bits within each packet may occupy a different time or spatial real estate while maintaining a constant watermark packet rate throughout the content. Alternatively, in the inter-packet bit variation scheme, bit rates may be varied from one packet to another (i.e., variable packet rate) while keeping the bit rate within the packets constant. This way, some packets, as a whole, would potentially survive the swapping of segments and produce the desired detection results. This is in contrast to the intra-packet scheme, where survival of some bits may not be sufficient for the detection of the packet as a whole. In addition, in inter-packet bit variation scheme, each watermark packet maintains a constant duration (or extent), which could facilitate the detection of watermark boundaries. Further, the pattern of bit rate variation can be fixed for all embedded watermarks or may be varied in a pseudo-random fashion. The above concept is readily applicable to frequency domain or spatial domain watermark embedding schemes, as well. In such cases, the number of samples of the host signal that are used to carry watermark bits in the frequency or spatial domains may be varied in accordance to one or all of the above techniques.

Enhanced Watermark Detection by Time Diversity Decoding

Another technique that takes advantage of combining several weaker watermark detections is time-diversity decoding. Using this technique, 3 or more detected watermark packets with unacceptable number of errors, $e_1, e_2, e_3, \ldots$, are collected and bit-averaged to produce a single watermark packet. Bit-averaging is achieved by counting the number of zero and one values for each bit position, and selecting an output bit value that corresponds to a majority of input values. The output packet is again compared to the template and errors (mismatches) are counted. If the result is within an acceptable range of errors, successful detection is declared. The success of this technique is predicated on channel noise being a zero-mean, independent random variable so that after sufficient averaging, the true bit values are revealed. In order to ensure an unambiguous outcome, there needs to be an odd number of detected packets before such averaging can take place (that is, if detected packets contain binary symbol values). Nevertheless, if the averaging is performed when an even number of packets are present, and there are equal number of zeros or ones in a given bit position, either a zero or a one may be selected randomly as the detected bit value.

Methods and apparatus for enhancing the robustness of watermark extraction from digital host content using the WAA and time diversity decoding techniques discussed above may be implemented on the Extractor Apparatus 600 discussed in connection with FIG. 8. For example, in an exemplary embodiment the embedded host signal 560 containing the digital host content is received, e.g., at a receiver or other device incorporating a receiver (such as Extractor Reception Device 610 at Extractor Apparatus 600). The Watermark Extraction Device 610 extracts watermarks from the host content in accordance with a stego key (e.g., from the stego key selection device). In this embodiment, the Watermark Extraction Device 610 may be adapted to:

(a) extract a first watermark;
(b) assess a number of errors in the first extracted watermark; and if the number of errors is above a first pre-determined value;
(c) extract at least a second watermark;
(d) assess a number of errors in at least the second extracted watermark; and If the number of errors in at least the second extracted watermark is above a second pre-determined value, the Watermark Extraction Device 610 may combine the extraction results of steps (a) and (c) to cumulatively assess the validity of the first extracted watermark and at least the second extracted watermark. Note that if number of errors in either the first or the second watermarks do not exceed the respective first and second pre-determined values, the combing of the extraction results does not occur and subsequent extractions and corresponding error assessments may take place in the same manner. Furthermore, the value of either the first or second pre-determined thresholds may remain unchanged throughout the detection of content or may change dynamically in accordance with a deterministic or probabilistic (or pseudo-random) technique. Such variation of threshold values may vary the robustness or enhance the security of the system.

The combining may comprise assigning weights to the first and at least the second extracted watermarks. The assignment of the weights may be done by the Watermark Extraction Device 610 or a separate processor associated therewith (not shown). The weights assigned to the first and at least the second extracted watermarks may be added to obtain an accumulated weight value. The accumulated weight value may be compared to at least a first pre-defined reference value to assess the validity of the extracted watermarks. The assigning of the weights may be adapted in accordance with soft decision information. Such soft decision information may comprise probability values.

The first and at least the second extracted watermarks may be separated by a pre-determined interval. The pre-determined interval may be a function of the duration of the embedded watermarks. The separation may be a multiple of the duration of the embedded watermarks.

The Watermark Extraction Device 610 may combine the results of steps (a) and (c) only if the number of errors in at least the second extracted watermark does not exceed a third pre-determined value. The third pre-determined value may be selected in accordance with at least one of a desired robustness, computational efficiency or false positive rate of the extraction.

The number of errors in the first and at least the second extracted watermarks may be obtained by comparing the detected watermark symbols to a pre-defined template. Alternatively, the number of errors in the first and at least the second extracted watermarks may be estimated by decoding watermark packets that are Error-Correction Code encoded.

The first and the second pre-determined values may be determined in accordance with at least one of a desired robustness, computational efficiency, or false positive rate of the extraction.

The Watermark Extraction Device 610 may extract at least a third detected embedded watermark prior to the combining. The number of errors in at least the third extracted watermark may be assessed. If the number of errors in the third extracted watermark is above a third pre-determined value, symbols of the first, second and at least the third extracted watermarks may be averaged (e.g., at the Watermark Extraction Device 610 or a separate processor associated therewith) to produce a composite watermark packet. The number of errors in the composite watermark packet can be measured to assess the validity of embedded watermarks. The averaging may be adapted in accordance with soft decision information. The soft decision information may comprise probability values associated with individual bits of the first, second and at least the third extracted watermark.

Enhanced Watermark Detection by Soft Decision Decoding

Before describing the enhanced watermark detection via soft decision decoding, it should be noted that while watermark packets have been described as having 'bits', all concepts disclosed in the present invention are equally applicable to watermark packets with non-binary data symbols. The extension of the disclosed concepts of the present invention to the non-binary realm can be easily accomplished by persons of ordinary skills in the art.

In the description of previous decoding enhancement techniques, all detected bits have been represented as having either a '0' or a '1' value without considering any uncertainties in the detection of these bits. The exact method for detection of embedded bits varies from one watermarking technology to another. For example, in the Peak Amplitude Modulation technique described in U.S. Pat. No. 5,828,325, quantized peak values of the host signal are compared to two sets of pre-defined values (one corresponding to embedded zeroes and the other set corresponding to embedded ones) and the pre-defined value closest to the quantized peak is selected to represent the detected bit. In other watermarking techniques, such as in typical Spread Spectrum detectors, the correlation value between the received signal and the carrier sequence is calculated and the sign of correlation peaks, if exceeding a pre-defined threshold, is mapped to detected ones or zeroes. In the above examples as well as in other detection techniques, in addition to specifying the detected bit values, it is also possible to provide a measure of certainty for the detected bit values. This additional information, sometimes referred to as soft information, would represent the likelihood of having detected the correct bit value. For example, in a spread spectrum detector with a detection threshold value of 100, two calculated correlation values of 101 and 5000 may be both decoded into the same binary value without differentiating between the two detections (this is known as hard decision decoding). In other words, the significance of the much larger correlation value is lost.

In soft decision decoding technique of the present information, a probability value is assigned to each detected bit. In the context of above example, the first bit may be detected as having a binary value of say zero, with probability 0.55 while the second bit may be detected as having a binary value of zero, with probability 0.95. In order to illustrate how this may improve decoding of watermark packets, the example of a 100-bit packet with 26 errors may be revisited. In the absence of soft-decision information, an error count of 26 is produced, which may be too high to be considered a successful detection. In the presence of soft-decision information, the probable number of errors may be calculated as:

$$E = \sum_{j=1}^{N} f(p_j) \qquad \text{Equation (19)}$$

Where N is the number of bits per watermark packet, is the soft-decision probability value for the $j^{th}$ bit and $f(p_j)$ is equal to $p_j$, if there is a mismatch with the reference template at $j^{th}$ position, and is equal to $(1-p_j)$, if there is an agreement with the reference template at $j^{th}$ position. Returning to the above example, there are 74 bit positions that match the template values and 26 bit positions that do not. Assuming $p_j=0.9$ for all correctly matched bits and $p_j=0.6$ for all erroneous bits, Equation 19 produces an error count of 23. This value reflects a better assessment of the true number of errors in this packet than the previous count of 26 and can produce extraction results with higher reliability.

Equation 19 only represents one method of incorporating soft information using likelihood measures produced with bit level granularity. Alternative, or additional, techniques may be used to assign likelihood measures with packet level granularity. In spread spectrum systems, for example, the correlation value, depending on the specific implementation details of the system, could represent a detected bit, a group of bits, or a full watermark packet. In general, whenever the detection process involves comparison of some calculated value or function to one or more pre-defined values or functions, soft information representing likelihood measures may be generated and used to produce detections with higher reliability. Such techniques may also be applied to detect synchronization headers and calibration signals which may be present as embedded watermarks. These signals usually comprise fixed, re-occurring bit patterns that are embedded within the host content. Typical detection procedure involves comparing the pattern of extracted bits to the error-free synchronization pattern and assessing the presence of a synchronization signal based on the number of mismatches. This procedure is similar to one described above in the context of watermark packet detection and thus can benefit from soft decision decoding.

The Weight Accumulation Algorithm and Time Diversity decoding techniques, described above, can also benefit from the inclusion of soft information. In these cases, incorporation of probability values in weight accumulation and averaging calculations of the two techniques would produce results that are more likely to represent the true state of embedded watermarks. In the case of the weight accumulation algorithm, soft decision probabilities may be used to produce new error counts (similar to Equation 19), which would then result in new accumulated weight values that are calculated by Equation 16. In the case of Time Diversity decoding, probabilities associated with each bit, as well as the value of the bit, may be averaged over several detected packets to produce a single packet with one set of probability values associated with each bit of the packet. Alternatively, the probability values associated with each bit may be examined prior to the averaging process in order to exclude individual bits (or the collection of all N bits that make up the packet) from the averaging procedure. This way, marginal bits and/or packets that are not detected with high degree of uncertainty (e.g., 0.5<p<0.65) may be excluded from the averaging process. Incorporation of soft information into Time Diversity decoding further enables provides for the decision making to occur in the presence of either an odd or an even number of packets. In such cases, it is still possible to obtain an ambiguous outcome (i.e., when p is exactly equal to 0.5) but this outcome has a very small chance of occurring for either an odd or an even number of packets.

The assignment of probability values to various detections is greatly dependent on the watermarking technology and its parameters as well as the desired levels of system robustness and false positive rates. FIG. 18 exemplifies a set of probability values which may be used in a detection technique that relies on calculating correlation coefficient values for detecting the embedded watermark bits. In order to strike the right balance between the various system requirements, the assignment of soft decision likelihood measures and the various threshold settings in the watermark extraction system often requires experimental fine-tuning and verification.

Soft decision information generated according to the above techniques may also be used to improve the extraction of watermarks that use Error Correction Coding (ECC). In these systems, watermark packets are typically ECC encoded prior to their insertion into the host content. Upon detection of embedded bits, ECC packets are assembled and decoded to produce error-corrected versions of the watermark bits. The use of soft decision information for improved decoding of ECC codes (e.g., BCH and Reed-Solomon Codes) is well known to those skilled in the art of signal processing. Soft decision decoding is especially beneficial if interleaved or product codes are utilized. In these cases, iterative decoding in conjunction with soft decision decoding provides superior error correction capabilities.

Methods and apparatus for enhancing the robustness of watermark extraction from digital host content using the soft decision decoding techniques discussed above may be implemented on the Extractor Apparatus 600 discussed in connection with FIG. 8.

For example, in an exemplary embodiment the embedded host signal 560 containing the digital host content is received, e.g., at a receiver or other device incorporating a receiver (such as Extractor Reception Device 610 at Extractor Apparatus 600). The Watermark Extraction Device 610 extracts watermarks from the host content in accordance with a stego key (e.g., from the stego key selection device). In this embodiment, the Watermark Extraction Device 610 may be adapted to:

(a) decode individual symbols of an embedded watermark in accordance with at least one watermark detection algorithm;

(b) assign discrete symbol values to the decoded symbols;

(c) generate likelihood measures associated with the decoded symbols; and (d) assess the validity of the extracted watermarks in accordance with the discrete symbol values and likelihood measures.

The likelihood measures may comprise probability values.

The Watermark Extraction Device 610 (or a separate processor associated therewith (not shown)) may assess the validity of the extracted watermarks by multiplying each discrete symbol value by the likelihood measure corresponding to the symbol value to produce weighted watermark symbols. The weighted watermark symbols may be arranged in a pre-defined order to form a weighted watermark packet. The number of errors in the weighted watermark packet may be compared to a pre-determined reference value in order to assess the validity of the watermark.

The likelihood measures may be obtained in accordance with a set of pre-defined threshold values. Further, the likelihood measures may be generated in accordance with a distance between the decoded symbols and the threshold values.

The detection algorithm may comprise at least one of spread spectrum, autocorrelation modulation, peak amplitude modulation, or replica modulation techniques. The detection algorithms may be stored at the Watermark Extraction Device 610 or a separate storage device associated therewith (not shown).

Subsequent to the receiving of host content, at least one boundary of the embedded watermarks may be estimated by detecting a presence of a synchronization pattern embedded in the host content. The detecting of the synchronization pattern may occur at the Watermark Extraction Device 610 and comprise:

(a) decoding individual bits of an embedded pattern in accordance with at least one watermark detection algorithm;

(b) assigning discrete bit values to decoded bits of the embedded pattern;

(c) generating likelihood measures associated with extracted bits of the embedded pattern; and (d) assessing a presence of the synchronization pattern in accordance with the bit values and associated likelihood measures.

Protection Against Differential Attacks and Analysis

Differential attacks described above are not very effective against the watermark embedding scheme of the present invention, simply because different contents have watermarks hidden in different places. Therefore, copying the transfer function from one original and watermarked content pair and applying inverse transfer function to another watermarked content would generate artifacts in the wrong places with little chance of affecting the watermarks themselves.

The content dependent stego key set is also an obstacle for an effective differential analysis, i.e. analysis of one difference signal may not be relevant for another content. However, a sophisticated attacker may combine results of many differential analysis attempts (from many different content pairs) in order to generate more or less complete picture of the embedder stego key set. Thus, in the watermarking system of the present invention, novel masking techniques are utilized to conceal the presence of the watermarks and/or the stego key space corresponding to the embedded watermarks.

Figure 19:
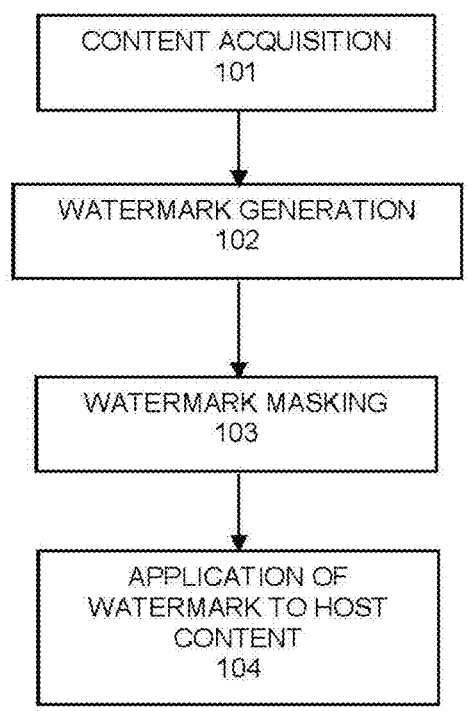
FIG. 19 is a flowchart illustrating a masking technique in accordance with an example embodiment of the invention.

Differential analysis relies on the difference signal between the watermarked and unwatermarked versions of the host content to uncover the stego key. So, one goal of the watermarking system of the present invention is to render the difference signal as ambiguous as possible. This is sometimes referred to as masking the watermark signal. Masking can be done in several ways. One method is to process the watermark signal in such a way that despite the recovery of the proper difference signal, it may not be intelligible to the attacker. This method is described in the flow diagram of FIG. 19. After content acquisition (step 101) and generation of the watermark (step 102) in normal way, the generated watermark undergoes a masking procedure (Step 103) before being applied to the host content (step 104). Watermark masking may comprise encryption of the digital watermark, scrambling of the digital watermark or linear or non-linear processing of the watermark signal, etc. An attacker, having obtained the difference signal is not able to readily decipher and interpret the true meaning of the watermark signal.

Figure 20:
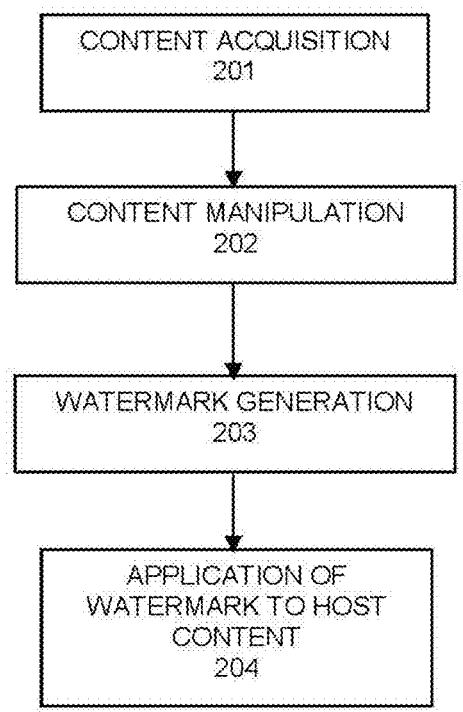
FIG. 20 is a flowchart illustrating a masking technique in accordance with a further example embodiment of the invention.

A second method of masking manipulates the host content prior to the embedding of the watermark. This method is shown in the flow diagram of FIG. 20. After content acquisition (step 201), the content is manipulated (step 202) before generation of the watermark (step 203) and application of the watermark to the host content (step 204). In this case, the difference signal is not the true representation of the watermark since the generated watermark corresponds to the manipulated version of the host content and not the host content itself. The key consideration here is to design the manipulation technique so that the perceptual quality of the host signal is maintained. Another consideration is the security of the manipulation technique. That is, the extent and details of manipulation should not be easily discerned from the analysis of the signals. The latter may be achieved by changing the nature and/or parameters of the masking technique from one embedding to the next. By the way of example and not by limitation, such manipulation techniques may comprise phase distortion, linear or non-linear distortion or non-uniform resampling of the content.

Figure 21:
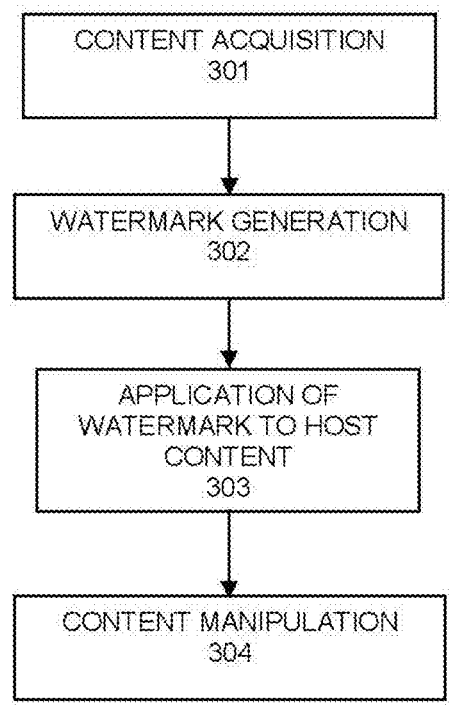
FIG. 21 is a flowchart illustrating a masking technique in accordance with a further example embodiment of the invention.

A third method of masking is shown in FIG. 21. After content acquisition (step 301), watermark generation (step 302), and application of the watermark to the host content (step 303), the content is then manipulated (step 304) in order to mask the watermark. This technique is similar to the technique described in FIG. 20 above, except in this case, masking is performed after the application of the generated watermark. It is generally assumed that watermarks themselves are immune to the masking transformation. It is further possible to combine any one of the systems described in FIGS. 19-21 to produce a system with two or more levels of watermark masking. However, in any masking configuration, two basic requirements must be met. First, the perceptual quality of the composite signal must be within acceptable limits, and second, specifics of the watermark signal must not be easily discerned from the analysis of the difference and/or the composite signal.

Aside from masking techniques, the watermarking system of the present invention renders differential analysis and/or attacks ineffective by incorporating different stego keys for each embedded content. Thus, if an attacker is successful in deciphering the stego key from one embedded content, he/she will not be able to use the recovered stego key to affect any other content.

Protection Against Collusion Attacks

Collusion attacks through differential analysis is not effective against the present invention, for the same reasons described above, providing that each embedding generates a distinct masking pattern. Further, the masking techniques described above are also effective against averaging and cut-and-splice collusion attacks. For a system that uses one of the above mentioned masking techniques, averaging and cut-and-splice attacks may only weaken the embedded watermarks, but joint extraction of multiple watermarks should result in eventual watermark extraction, as described above in the context of the Weight Accumulation Algorithm, Time Diversity decoding, and soft decision decoding.

Protection Against Oracle Attacks

Oracle attacks are generally complex, and not very effective against watermarking techniques that are signal dependent. This attack is further hindered by the uncertainty in the extractor response, i.e. no watermark extractions in a run does not necessarily mean that no watermarks were detected in the content. Other features of the present invention, such as variation of embedding algorithms, sparse embedding and joint extraction of multiple watermarks should also contribute to ineffectiveness of oracle attacks.

Protection Against Overwriting Attacks

Overwriting attacks are not effective against the present invention simply because different embedders use different stego keys for different embedding sessions. So, the extractor should have no trouble finding all watermarks even if embedded in different sessions. Reaction to the extraction of multiple watermark states is the responsibility of the application layer and may be dictated by the content owners. For example, one may decide to only react to the most restrictive watermark if multiple watermark states are extracted within the same content.

In order to prevent the denial of service attacks, described above, the watermark embedding devices of the present invention also include watermark extractors that examine the content prior to embedding. If pre-existing watermarks are detected within the content, this information is conveyed to the embedder and possibly to the application layer. Depending on the value/state of the pre-existing watermarks and the current value/state of watermarks, the embedder may decide to continue embedding or abort the entire procedure. Alternatively, or additionally, the embedding device may alert the user and/or the (legitimate) content owner regarding the discovered discrepancy. Identifying the legitimate content owner may require connectivity of the deployed embedding devices to a central database. Other safeguards could include requiring passwords, access cards or use of biometric information for enabling an embedding session.

Another method for preventing fraudulent access to the multimedia content through such overwriting attacks is to embed additional watermarks (as an independent layer) that contain ownership-related or any other additional information regarding the multimedia content. This additional layer may serve to provide a second level of authentication for the embedded content. A typical usage scenario for such system may be described as follows. A content owner embeds a multimedia content with one type of copy control watermark and an additional layer of watermarks that convey ownership information. The latter may be in the form of a serial number, which may serve as an index to a remote database. The content owner additionally registers his/her content as having one type of copy control state (i.e., the same copy control watermark that was embedded) and all this information is stored at a secure database.

In the extractor device, one of three actions may take place. First, the extractor may extract the copy control watermark only, and react according to the set of rules associated with that copy control state. Second, the extractor may only extract the second layer of watermarks containing ownership information, access the remote database of information to determine the copy control state and act according to the set of rules associated with that copy control state. Or third, the extractor may extract both watermark layers, access the remote database to ascertain copy control state information and verify it against the copy control state obtained from extraction of the watermarks. In case of a discrepancy, the extractor may decide to notify the owners, select the most restrictive copy control state, trust the information obtained from the database, etc. It should be noted that embedding of a second layer of watermarks requires re-assessment of robustness, security, transparency and computational complexity of each individual watermark layer and the system as a whole. In addition, payload requirements of the new watermarks would most likely change since a modest number of additional bits (e.g., 30 to 40 bits) may be necessary to carry the desired information within the watermark or act as a pointer to a remote location.

The above described technique provides multiple methods for checking the validity of extracted watermarks, all made possible by including two different types of information. It is similarly possible to extent this method to include three or more different layers of watermarks to provide additional protection. An attacker now has to overwrite all layers of watermarks in order to claim success. These attempts may further be discouraged by requiring all users to provide identity credentials prior to each embedding. These credentials may be verified or authenticated, and in the presence of pre-existing watermarks, verified against the credentials of prior owners. The latter credentials may be carried within the pre-existing watermarks, or acquired by accessing a remote database in accordance to the extracted information from the watermarks. In case of discrepancies between the two credentials, embedding may be disabled or both owners may be contacted to resolve the issue.

Protection Against Embedder Based Analysis Attacks

Differential analysis based on test signals is more dangerous than differential analysis based on a common content, and reliance on watermark masking techniques may not be sufficient against these attacks. However, these attacks may be thwarted by implementing test signal extraction and embedding avoidance techniques described below.

Figure 22:
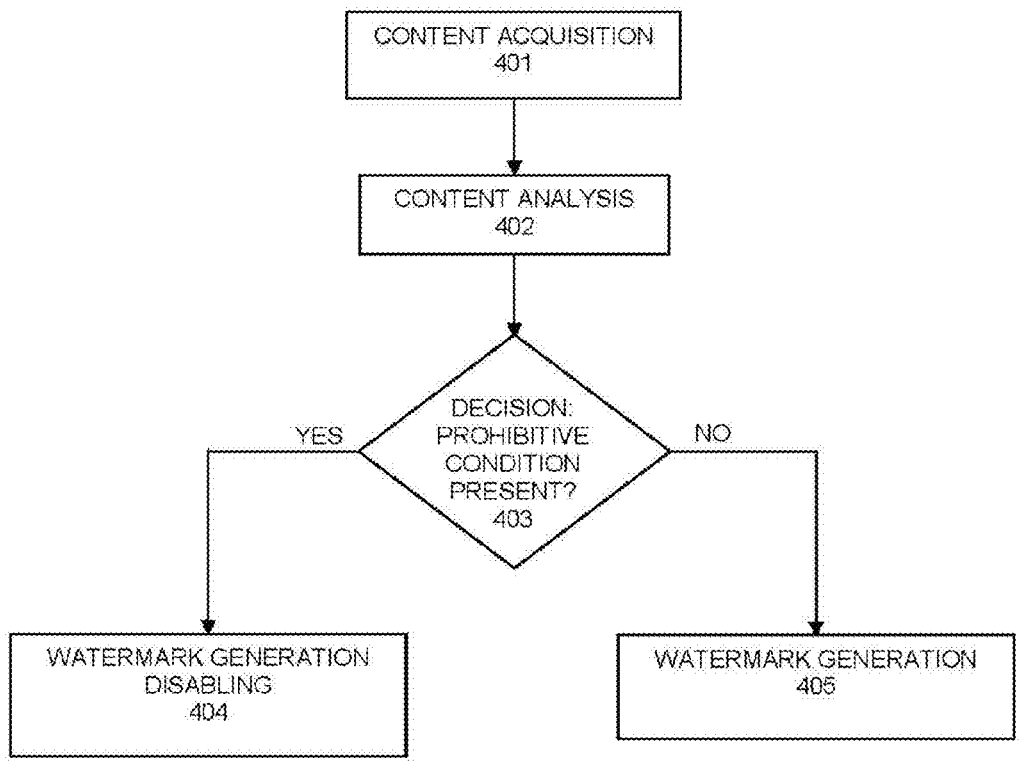
FIG. 22 is a flowchart illustrating an embedding prevention technique in accordance with an example embodiment of the invention.

Masking techniques described above are also effective against embedder-based attacks. Additionally, the watermarking system may employ embedding prevention techniques to disable watermark embedding when input signals with certain properties are extracted. This procedure is described in the flow diagram of FIG. 22. Following the Content Acquisition Step (401), the host content is analyzed in Content Analysis Step (402). Based on the result of this analysis, it is determined whether or not the input content contains a prohibitive condition at a Decision Step (403). If a prohibitive condition is discovered, then the embedding of watermarks is disabled in Watermark Generation Disabling Step (404), otherwise, normal procedures for generation and application of the watermarks are carried out in Watermark Generation Step (405). Alternatively, if the presence of such prohibitive conditions are detected, the embedder may generate a false (e.g., dummy) signal instead of the legitimate watermark signal. This technique serves to produce even more misleading results in the presence of such attacks.

An exemplary list of signals that could affect watermark generation are impulse signals, sinusoidal signals, flat image signals, edge image signals, step functions, signals with specific temporal or frequency characteristics and other custom-designed signals. These signals may be recognized in real-time by content recognition techniques. For example, the incoming signal, or its attributes, may be compared to stored signal patterns, or their attributes, residing in a memory location. Alternatively, the attributes of the incoming signal may be calculated on the fly and compared to stored versions of generated reference patterns. To illustrate further, in audio applications, an impulse response may be recognized by measuring the peak-to-average value of the incoming signal over a finite time period and comparing it to a set of reference ratios. Other waveforms may be recognized by comparing one or more of their inherent or calculated characteristics, such as their energy or correlation to reference functions and/or values stored in a look-up table. Opting for the look-up table implementation allows for periodic update of the stored waveforms and/or prohibitive conditions.

Implementation of such embedding prevention techniques reduces the overall efficiency of embedding. That is, since some of the prohibited signals may naturally occur in multimedia content, some portions of the host content may not be embedded and thus the robustness of the embedded watermarks may be reduced. By the same token, due to the fewer number of embeddings, transparency of embedded watermarks may improve. In designing watermarking system of the present invention, the number and types of prohibited signals may be adjusted, from one application to the next or from one embedding to the next, in order to fulfill the required security, robustness and transparency of the embedded watermarks.

Protection Against Protocol Attacks

Protocol attacks do not affect watermarks themselves, but still can render watermarking system ineffective. As discussed above, protocol attacks can be classified as internal and external. Internal attacks are concerned with information flow within the device, while external attacks are concerned with signal manipulation outside the device.

Internal attacks are designed to interrupt information flow within the device in order to gain access to information or to modify it. Therefore, it is essential to insist that all information flow within the device is cryptographically secure. This means that no information should be exchanged in the form of 'plain text'. Different software modules, such as extractor and application level software, should use cryptographic authentication techniques in order to prevent manipulation of the data. Those techniques are well established within those skilled in the art, and they are not subject of this disclosure.

External attacks may comprise scrambling and descrambling operations, as previously described. It may be possible to automatically detect unauthorized scrambling of the content and abort recording or playing of the content, generate warning signals, and/or notify authorized personal. This task may require analyzing certain characteristics or statistical properties of the content in order to discern whether or not they conform to the true characteristics or statistical norms of the typical content. For example, scrambling an audio signal "whitens" the frequency spectrum of the content. Detection of this condition in an input signal may trigger an extractor to generate a warning signal or initiate a restrictive action. In some ways, this technique resembles the embedding prevention techniques described above, where the incoming signals are analyzed to determine whether or not they contain special characteristics. Analogously, implementation techniques for storage and analysis of reference signals/conditions in the embedder apparatus are equally applicable to the extractor apparatus. Thus, the extractor may also look for the presence of special test signals and adapt the extraction process based on the presence of such test inputs (e.g., extraction prevention). The main goal of signal analysis may also be to recognize signal features indicative of potential scrambling.

Alternatively, in order to circumvent these types of attacks, additional signal processing steps may be carried out at the output of the device that is imperceptible for normal usage, but interferes with the descrambling operation. These signal processing steps may be considered as almost lossless signal transformations ('almost' being the key word) that, in the absence of malicious signal conversions, produce imperceptible signal degradations, but in the presence of such attacks they significantly damage the perceptual quality of the host signal. For example, the success of the signal conversion technique, described by Equations 1 and 2, and illustrated in FIG. 1, is only possible if the descrambler receives substantially the same bit stream as the one leaving the scrambler. In other words, in the absence of distortions in the "channel" depicted in FIG. 1, the descrambling operation produces an output bit stream, $b'_n$, that is identical to the input bit stream, $b_n$. However, in the presence of channel distortions, the output bit stream may look drastically different from the original bit stream. Such channel distortions may be intentionally introduced as an additional signal transformation step, such as a simple D/A followed by A/D conversion, somewhere between the scrambler output and descrambler input in the extraction process. Other substantially imperceptible processing steps include resampling, slight nonlinear distortion or all-pass filtering (in the case of audio signals). In the case of audio signals, an especially effective technique is low pass filtering with a high cutoff frequency, e.g. above 20 kHz. This is a substantially imperceptible modification of audio signals since human ear sensitivity decreases significantly with increase of audio frequency, and most of the energy of typical audio signals is concentrated around the lower frequencies. On the other hand, scrambled audio signals typically have a flat spectrum and low pass filtering of such scrambled content could remove a sizeable portion of the signal energy that, upon descrambling of the content, could produce an audio signal with significantly degraded quality. It is further possible to perform the above mentioned processing steps intermittently (e.g., randomly) or with different levels of variability. For example, the cutoff frequency of the audio filter in above example may be adjusted in a 2 KHz range around the original 20 KHz value. These variations may degrade the multimedia content to various degrees (or in some instances, not at all) but they serve to frustrate an attacker by producing inconsistent results.

There are also scrambling techniques that are not bit sensitive and can be executed in analog domain. Most of these techniques are based on signal modulation/demodulation type of attacks, as described above. Those attacks are much more limited in the number of variations as compared to digital scrambling attacks. Therefore, it is possible to anticipate some of them and prepare countermeasures in the extractors. One type of countermeasure is to insert specific descramblers prior to the regular search for watermarks. For example, it is possible to invert every other sample (which is equivalent to multiplication with $\cos(\pi f_s t)$, with $f_s$ being the sampling rate) and then conduct a search for embedded watermarks. Thus, in addition to searching the input signal in the normal way, one or more such descramblers may be utilized to examine modified versions of the input signal. Alternatively, in order to limit the computational cost of extractors, an extractor may examine the input stream in a normal way and only occasionally turn one or more such descramblers on to check for possible transformations.

Another strategy for withstanding such attacks is to deploy watermarking techniques that are invariant to typical analog scrambling techniques. For example, some distributed feature quantization techniques compare energies between two non-overlapping time intervals. This relationship is typically unaffected if the multiplier function has a period that is much shorter than the considered intervals. Other techniques include using an embedder to insert additional watermarks that are only detectable in the converted domain. For example, if an attacker develops and distributes a scramble/descramble attack that is based on spectral inversion of audio signals, such that the zero frequency component is moved to 24 kHz and the 24 kHz frequency component is moved to zero, and if the extractor searches for watermarks in the frequency band between 500 and 4000 Hz, then the embedded watermarks in the next release of the content may be inserted in the frequency range between 20,000 and 23,500 Hz. This way, the scrambler box would invert the audio spectrum and bring the watermarks from 20 to 23.5 kHz range down to 0.5 to 4 kHz range where extractor would find them. It is not necessary to hide all watermarks in the converted domain as it only suffices to produce a few detections in order to render the existing attack ineffective. In other words, it may not be necessary to burden the extractors with additional processing loads; instead, by anticipating (or knowing) the actual scrambling attacks deployed by the pirates, watermark embedding process may be modified for insertion of additional watermarks that are tailored to be detected only under specific transformations.

Finally, it should be noted that the introduction of additional signal processing operations between the scrambler and the descrambler may prevent analog scrambling attacks, as well. For example, an attack that relies on modulation and demodulation of audio signals with a frequency equal or close to $f_h$, the highest possible frequency in the analog signal, can be made ineffective by inserting a low-pass filter in between the two operations. Note that modulation of an audio signal with a carrier at frequency $f_h$, actually inverts the spectrum, so that the energy of the modulated signal is concentrated at high end of the audio spectrum, but a considerable amount of the signal may be removed if this inverted spectrum is subjected to low-pass filtering. After descrambling (i.e., demodulation), the spectrum is reversed again, but most significant, low frequency parts would be missing at the output.

Forensic Tracking

The main objective of forensic tracking (also known as transaction coding, fingerprinting, traitor tracing, copy tracing, etc.) is to embed distinct watermarks into each copy of the multimedia content in order to trace the origins and distribution paths of the pirated content and identify the participants in the piracy chain. As previously described, the forensic tracking information may be embedded as a separate watermark layer with a potentially high payload capacity. This method involves embedding each copy of the multimedia content with digital watermarks that carry identification information. Upon recovery of a pirated content, the origin of the content is revealed by extracting the identification information contained within the embedded watermarks.

Additionally, or alternatively, any set of watermarks that are embedded in accordance to the present invention may inherently carry forensic information. Thus it may not be necessary to embedded an additional layer of watermarks solely for the purpose of forensic tracking of the origin of a content. This may be accomplished by assigning a unique set of embedding stego keys to each embedding device. Upon recovery of a content under suspicion and extraction of the embedded watermarks, the pattern of embedding opportunities would identify the culprit device. In other words, each set of embedding stego keys may serve as a serial number for one embedding device. A similar method involves utilization of masking parameters as serial numbers. Different masking techniques were previously illustrated in FIGS. 19-21. In order to enable forensic tracking of the content, it suffices to assign a particular masking pattern (or masking parameters) to each embedding device. Upon recovery of a suspect content, the parameters of the masking process may be identified and traced back to the embedding device. For a masking technique with a pseudo-random phase generator, for example, this "serial number" may comprise an initial seed value that is assigned to each embedding device.

Forensic tracking of the multimedia content in the present invention is not limited to the identification of the embedding device. In fact, each embedding of the multimedia content may be identified by a unique embedding stego key and/or masking parameter. In this case, a new set of embedding/masking stego keys are issued every time a new embedding session is started. Obviously, accurate accounting of embedding/masking stego keys are required in order to keep track of the embedded content. This may be accomplished, for example, by storing pertinent information in a secure database upon completion of each embedding.

Although the invention has been described in the context of various preferred embodiments, it should be appreciated that many different adaptations of the present invention may be made without departing from the scope of the invention. For example, the techniques describes in the present invention may be readily adapted to analog, digital, optical or acoustical domains. This includes, but not limited to, the utilization of optical and acoustical techniques for manipulating the signals of present invention. Additionally, the "signals" described in the context of present invention refer to any entity that can be manipulated to effect the various embodiments of the present invention, ranging from electrical, electromagnetic or acoustic signals to the signals produced by mechanical shaping of a surface. The latter, for example, may be the plastic layer that covers optical storage media or the laminate that covers a driver's license. Furthermore, the signals of the present invention may be transmitted, displayed or broadcast or may be stored on a storage medium, such as an optical or magnetic disk, an electronic medium, a magnetic tape, an optical tape or a film.

What is claimed is:

1. A method for prevention of discovery of watermark secrets in a watermark embedding system, the method comprising:
receiving a content at a watermark embedding device, the content comprising a plurality of digital content samples;
analyzing the digital content samples using a processing device to ascertain whether one or more test features are present in at least a first portion of the received content, the test features specially designed such that when the specially designed test features are embedded with watermarks, the embedded test features enable extraction of at least one secret parameter of the embedded watermarks through analysis of the embedded test features; and
upon a determination that the one or more test features are present, disabling embedding of watermarks in at least the first portion of the received content.

2. The method of claim 1, wherein at least one test feature includes a temporal, a spatial and/or a frequency characteristic such that, when a region of the content that includes the at least one test feature is embedded with a watermark, a transfer function of the watermark embedding system is detectable upon analysis of the region.

3. The method of claim 1, further comprising embedding a dummy feature into at least the first portion of the host content, wherein the dummy feature does not represent an actual watermark.

4. The method of claim 1, wherein at least one of the test features approximates one of: an impulse signal, a step function signal or a pure sinusoidal signal.

5. The method of claim 1, further comprising embedding one or more watermarks in at least a second portion of the received content upon a determination that the at least second portion does not include the one or more test features.

6. The method of claim 5, wherein the one or more embedded watermarks include a plurality of bits that are embedded at a variable bit rate.

7. The method of claim 6, wherein the one or more watermarks are embedded with the variable bit rate in at least one of time, space and frequency domains.

8. The method of claim 6, wherein the variable bit rate is a pseudo-randomly varying bit rate.

9. The method of claim 6, wherein
each watermark is represented by a watermark packet;
at least one watermark bit within a first watermark packet is embedded at a bit rate that is different from at least another bit within the first watermark packet; and
all watermark packets are embedded at a constant rate.

10. The method of claim 6, wherein
each watermark is represented by a watermark packet;
watermark bits within a given watermark packet are embedded at a constant bit rate; and
at least a first watermark packet is embedded at a different packet rate than a second watermark packet.

11. The method of claim 6, wherein
each watermark is represented by a watermark packet;
at least one watermark bit within a first watermark packet is embedded at a bit rate that is different from at least another bit within the first watermark packet; and
at least one watermark packet is embedded at a different packet rate than another watermark packet.

12. The method of claim 1, further comprising:
embedding at least one watermark in a second portion of the received content upon a determination that the at least second portion does not include the one or more test features, wherein the at least one watermark is recoverable from the embedded second portion only upon conversion of the embedded second portion into a different domain.

13. The method of claim 12, wherein the at least one watermark is recoverable upon spectral conversion of the embedded second portion such that one or more lower spectral components of the embedded second portion are switched with one or more higher spectral components of the embedded second portion.

14. The method of claim 12, wherein the at least one watermark is recoverable upon scrambling at least the embedded second portion.

15. A device, comprising:
a receiver configured to receive a content, the content comprising a plurality of digital content samples; and
a processor configured to:
analyze the digital content samples to ascertain whether one or more test features are present in at least a first portion of the received content, the test features specially designed such that when the specially designed test features are embedded with watermarks, the embedded test features enable extraction of at least one secret parameter of the embedded watermarks through analysis of the embedded test features; and
upon a determination that the one or more test features are present, disable embedding of watermarks in at least the first portion of the received content.

16. The device of claim 15, wherein at least one test feature includes a temporal, a spatial and/or a frequency characteristic such that, when a region of the content that includes the at least one test feature is embedded with a watermark, a transfer function of watermark embedding system is detectable upon analysis of the region.

17. The device of claim 15, further comprising a watermark embedder configured to embed a dummy feature into at least the first portion of the host content, wherein the dummy feature does not represent an actual watermark.

18. The device of claim 15, wherein at least one of the test features approximates one of: an impulse signal, a step function signal or a pure sinusoidal signal.

19. The device of claim 15, further comprising a watermark embedder configured to embed one or more watermarks in at least a second portion of the received content upon a determination that the at least second portion does not include the one or more test features.

20. The device of claim 19, wherein the one or more embedded watermarks include a plurality of bits and the watermark embedder configured to embed the one or more watermarks at a variable bit rate.

21. The device of claim 20, wherein the watermark embedder configured to embed the one or more watermarks with the variable bit rate in at least one of time, space and frequency domains.

22. The device of claim 20, wherein the variable bit rate is a pseudo-randomly varying bit rate.

23. The device of claim 20, wherein
each watermark is represented by a watermark packet; and
the watermark embedder configured to:
embed at least one watermark bit within a first watermark packet at a bit rate that is different from at least another bit within the first watermark packet, and
embed all watermark packets are embedded at a constant rate.

24. The device of claim 20, wherein
each watermark is represented by a watermark packet; and
the watermark embedder configured to:
embed watermark bits within a given watermark packet at a constant bit rate, and
embed at least a first watermark packet at a different packet rate than a second watermark packet.

25. The device of claim 20, wherein
each watermark is represented by a watermark packet;
the watermark embedder configured to:
embed at least one watermark bit within a first watermark packet at a bit rate that is different from at least another bit within the first watermark packet, and
embed at least one watermark packet at a different packet rate than another watermark packet.

26. The device of claim 15, further comprising a watermark embedder configured to embed at least one watermark in a second portion of the received content upon a determination that the at least second portion does not include the one or more test features, wherein the at least one watermark is recoverable from the embedded second portion only upon conversion of the embedded second portion into a different domain.

27. The device of claim 26, wherein the at least one watermark is recoverable upon spectral conversion of the embedded second portion such that one or more lower spectral components of the embedded second portion are switched with one or more higher spectral components of the embedded second portion.

28. The device of claim 26, wherein the at least one watermark is recoverable upon scrambling at least the embedded second portion.

* * * * *